(12) United States Patent
Van Hintum et al.

(10) Patent No.: US 12,018,644 B2
(45) Date of Patent: Jun. 25, 2024

(54) WIND TURBINE INSTALLATION METHOD

(71) Applicant: Heerema Marine Contractors Nederland SE, Leiden (NL)

(72) Inventors: Erik Fredericus Maria Van Hintum, Zaltbommel (NL); Thijs Johannes Sebastianus Vervoort, Berkel en Rodenrijs (NL); Joris Van Drunen, Delft (NL); Jacob-Jan Lagerwerf, The Hague (NL); Rik Wessel Van Mierlo, Delfgauw (NL); Pieter Stammeijer, Utrecht (NL); Johan Pieter Schot, Oterleek (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 673 days.

(21) Appl. No.: 17/252,207

(22) PCT Filed: Jun. 18, 2019

(86) PCT No.: PCT/NL2019/050376
§ 371 (c)(1),
(2) Date: Dec. 14, 2020

(87) PCT Pub. No.: WO2019/245366
PCT Pub. Date: Dec. 26, 2019

(65) Prior Publication Data
US 2021/0246878 A1    Aug. 12, 2021

Related U.S. Application Data

(60) Provisional application No. 62/687,117, filed on Jun. 19, 2018.

(30) Foreign Application Priority Data

Jun. 20, 2018   (NL) .................................... 2021157

(51) Int. Cl.
*F03D 13/10*   (2016.01)
*B63B 35/00*   (2020.01)
(Continued)

(52) U.S. Cl.
CPC .............. *F03D 13/10* (2016.05); *B66C 1/108* (2013.01); *F03D 13/25* (2016.05); *B63B 35/003* (2013.01);
(Continued)

(58) Field of Classification Search
CPC .......... F03D 13/10; F03D 13/40; F03D 13/25; B66C 23/185; B66C 1/108; B66B 35/003;
(Continued)

(56) References Cited

U.S. PATENT DOCUMENTS 10,550,825 B2 * 2/2020 Borøy .................... E04H 12/344
10,781,794 B2 * 9/2020 Gil Mollà ............. F03D 1/0608
(Continued)

FOREIGN PATENT DOCUMENTS

JP   2014214748 A   11/2014
JP   2016173096 A    9/2016
(Continued)

OTHER PUBLICATIONS

International Search Report and Written Opinion dated Sep. 30, 2019, corresponding to Application No. PCT/NL2019/050376.
(Continued)

*Primary Examiner* — Andrew J Triggs
(74) *Attorney, Agent, or Firm* — Patterson + Sheridan, LLP

(57) ABSTRACT

The present invention relates to a method for installing an offshore wind turbine at a target location at sea with an installation vessel, the vessel comprising: —a nacelle support structure for temporarily supporting a nacelle compris-
(Continued)

ing a hub having a plurality of root end connectors to which the root ends of the blades are to be connected, the nacelle support structure comprising: ○a support tower extending upwardly from a deck of the installation vessel, ○a support platform configured to temporarily support the nacelle, —one or more lifting devices configured for: ○lifting the nacelle onto the support platform, ○lifting a nacelle assembly including the blades onto a wind turbine mast located adjacent the vessel, wherein the method comprises: a) lifting the nacelle onto the support platform, and securing the nacelle to the support platform, b) orienting a root end connector of the hub of the nacelle in a direction facing a guide path of the blade moving system, c) connecting the root end of the first blade to the corresponding first root end connector of the hub, d) repeating steps b) and c) for subsequent blades and root end connectors until all blades are connected to the hub of the nacelle, thereby providing a RNA, e) lifting the RNA from the nacelle support structure and positioning the RNA onto a wind turbine mast located adjacent the vessel.

18 Claims, 37 Drawing Sheets

(51) Int. Cl.
  *B66C 1/10* (2006.01)
  *B66C 23/18* (2006.01)
  *F03D 13/25* (2016.01)
  *E02B 17/00* (2006.01)
  *E02B 17/02* (2006.01)

(52) U.S. Cl.
  CPC ..... *B66C 23/185* (2013.01); *E02B 2017/0091* (2013.01); *E02B 17/021* (2013.01); *F05B 2230/6102* (2013.01); *F05B 2240/95* (2013.01)

(58) Field of Classification Search
  CPC ............ F05B 230/6102; F05B 2240/95; F05B 2230/6102; Y02E 10/72; Y02E 10/727
  See application file for complete search history.

(56) References Cited

U.S. PATENT DOCUMENTS

| | | | |
|---|---|---|---|
| 11,073,134 B2 * | 7/2021 | Gomez | ................... F03D 80/00 |
| 2010/0293781 A1 | 11/2010 | Foo et al. | |
| 2011/0056168 A1 | 3/2011 | Springett et al. | |
| 2011/0219615 A1 * | 9/2011 | Van Der Bos | ........ B66C 23/185 |
| | | | 29/889 |
| 2014/0317927 A1 | 10/2014 | Westergaard | |
| 2015/0028608 A1 * | 1/2015 | Wubbelmann | .......... B66C 1/108 |
| | | | 294/81.61 |
| 2021/0246878 A1 * | 8/2021 | Van Hintum | ........... F03D 13/10 |

FOREIGN PATENT DOCUMENTS

| | | | |
|---|---|---|---|
| WO | 2009068038 A1 | 6/2009 | |
| WO | 2013/093614 A1 | 6/2013 | |
| WO | 2013/095136 A1 | 6/2013 | |
| WO | WO-2013095136 A1 * | 6/2013 | ........... B63B 35/003 |

OTHER PUBLICATIONS

Netherlands Search Report dated Mar. 6, 2019, corresponding to Application No. 2021157.
EPO Communication Pursuant to Rule 114(2) EPC dated Apr. 14, 2023 (with Third Party Observation) for European Application No. 19743069.7.
Japanese Office Action dated Mar. 27, 2023, for Japanese Patent Application No. 2021-520900 (English translation).

* cited by examiner

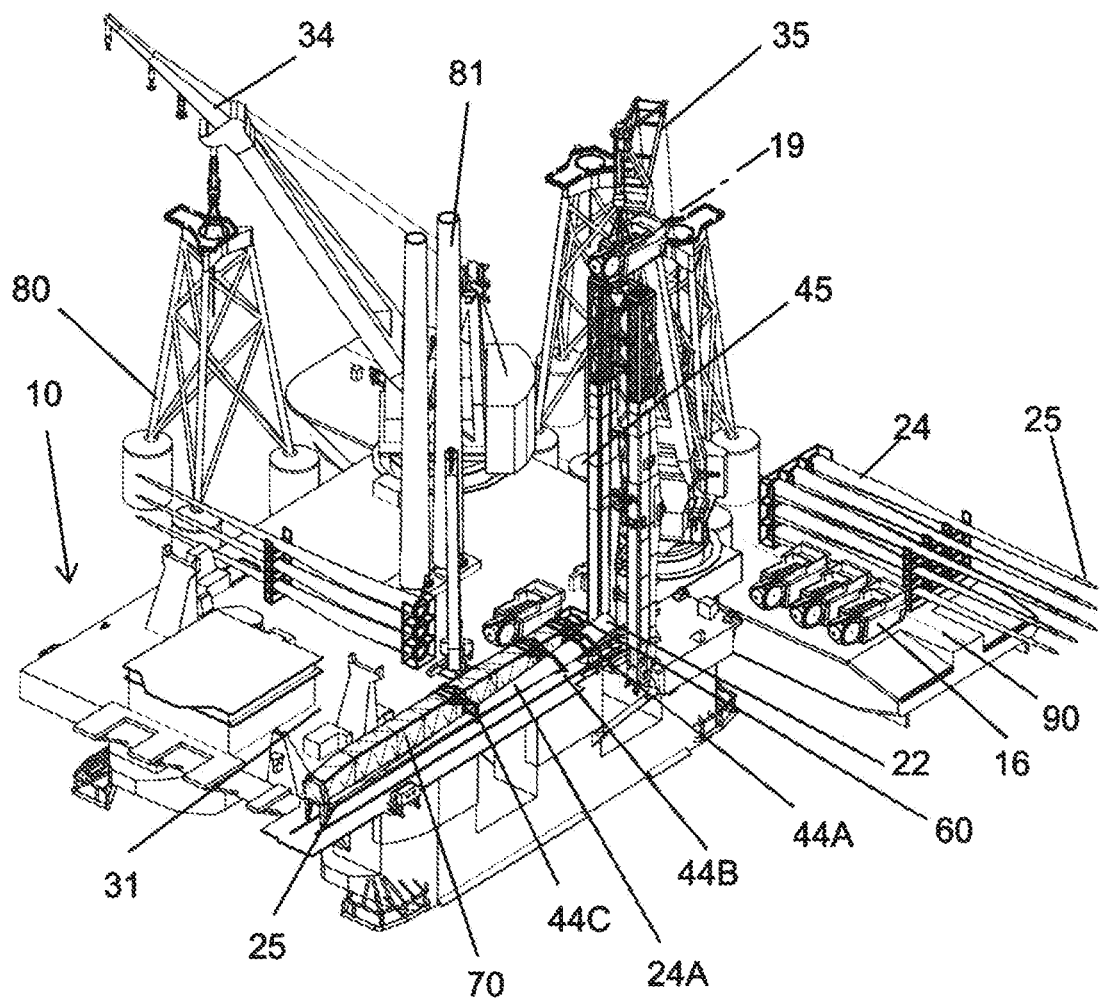

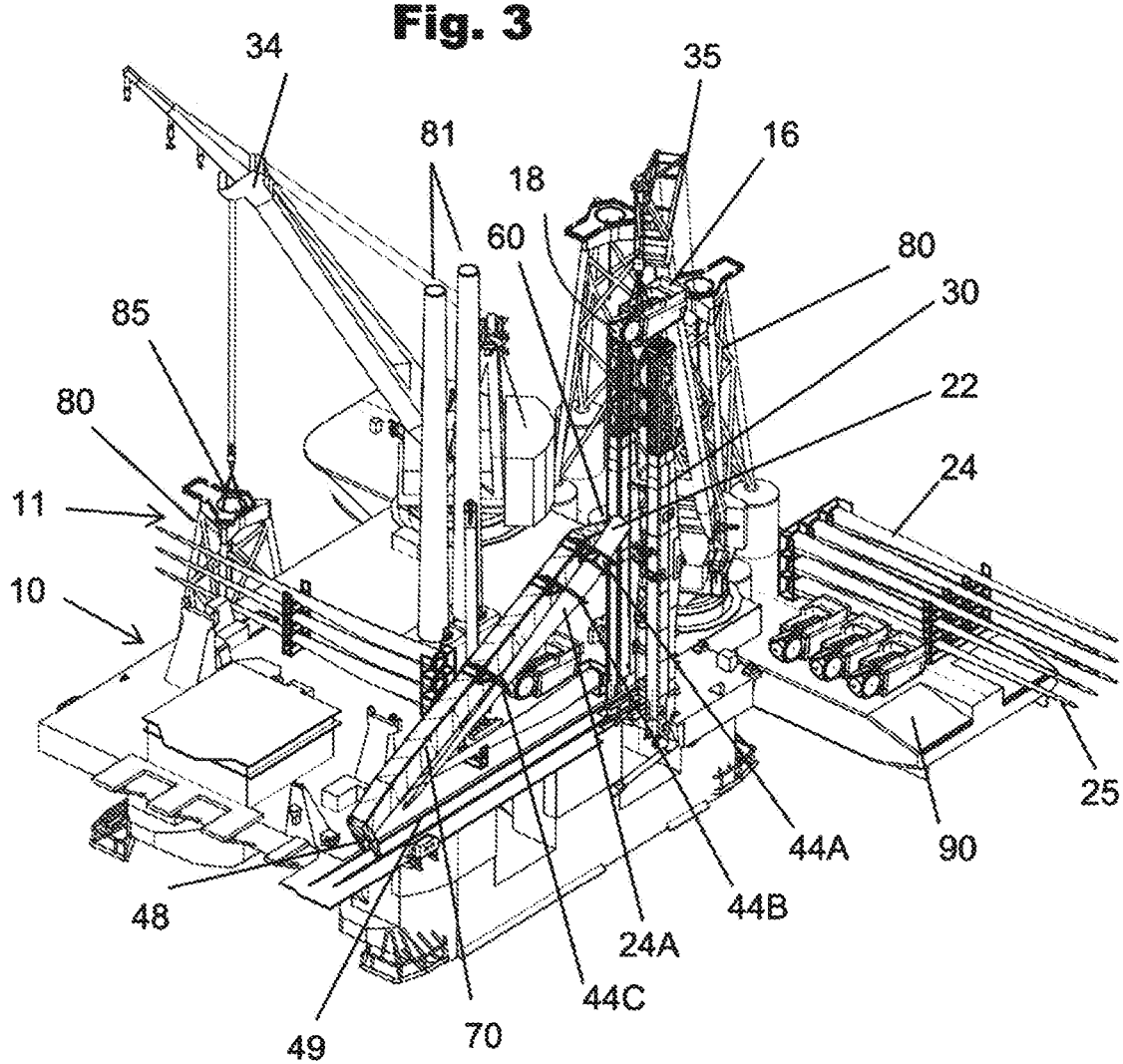

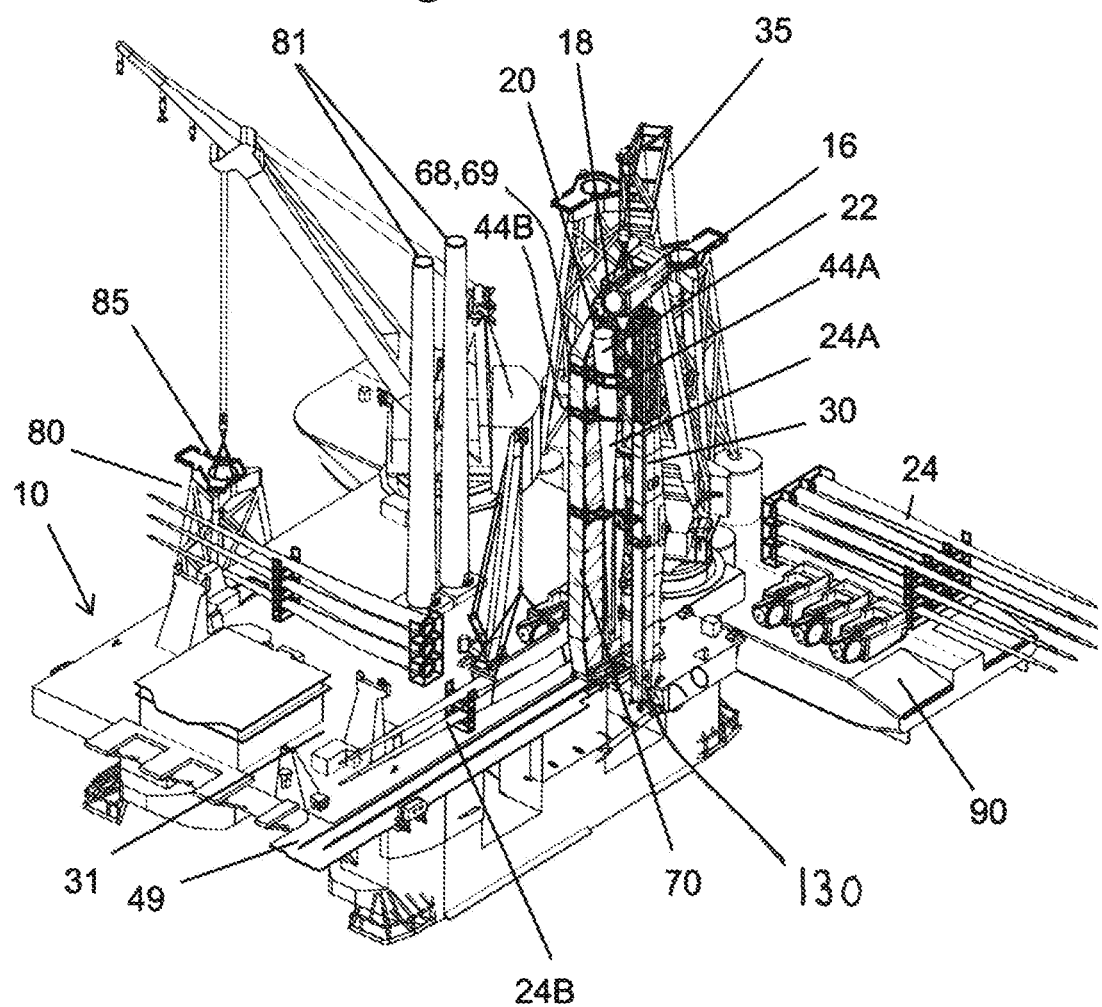

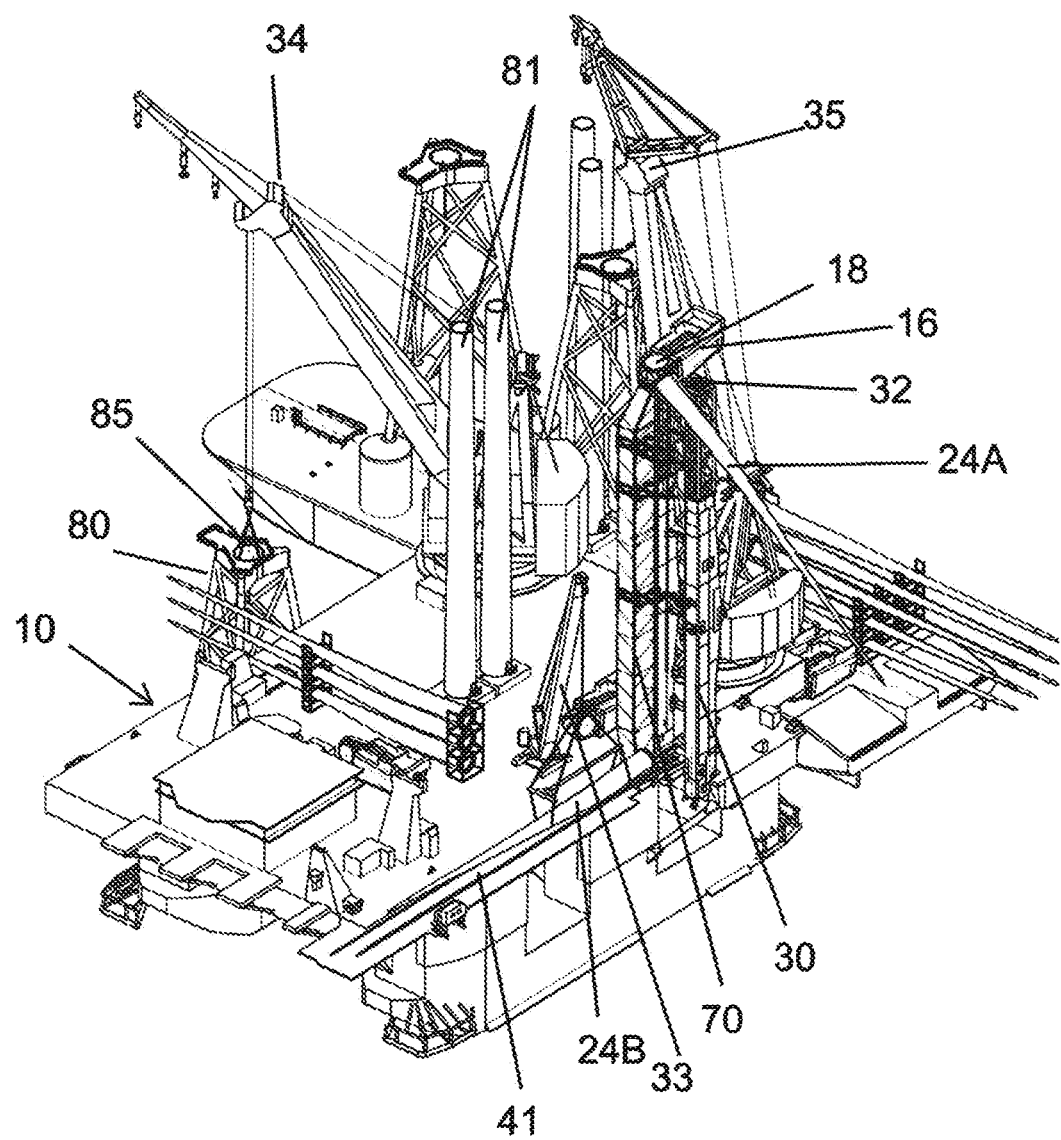

WIND TURBINE INSTALLATION METHOD

FIELD OF THE INVENTION

The invention relates to a method for installing an offshore wind turbine with an installation vessel, in particular a floating installation vessel. The present also relates to the installation vessel.

BACKGROUND OF THE INVENTION

In the field of offshore wind turbine installation, various methods of installation exist.

Many requirements and considerations apply to methods of installing offshore wind turbines. For instance, the total installation time is an important factor in the cost of installation. Further, weather conditions may impede the installation, and for this reason the installation time should be short.

Furthermore, safety issues are important. Offshore installation methods generally carry a certain risk for personnel, and this risk should be minimized.

Furthermore, many different installation steps need to be carried out. As a whole, the installation of wind turbines at sea is quite complex, and reducing the complexity can result in a reduction of costs and an increase in safety. The complexity also has implications for the deck layout of an installation vessel. For any vessel, the available deck space is limited.

Further, the vessel is typically positioned adjacent the target area where the wind turbine is to be installed. This implies that one part of the deck is close to the target area whereas other parts of the deck are further away from the target area. It is generally advantageous to perform the lifting operations from a part of the deck which is close to the target area. This implies that it is also advantageous to assemble the parts at this deck area close to the target area adjacent the vessel. At the same time it is generally undesirable to change the deck layout during the operation.

If the parts of the wind turbine need to be moved many times during installation, and the deck layout of the installation vessel needs to be changed for this reason, this in itself result in complexity, which in turn may result in increased costs and possibly reduced safety for personnel. Therefore, there is a general need for a simple and orderly deck layout which does not need to be changed and which results in an efficient installation process.

Furthermore, there is a general tendency that wind turbines have ever increasing dimensions. The total power of a single wind turbine has increased from 1 megawatt to 10 megawatts in recent years, with associated increasing dimensions. A further increase in size to 12 MW is under development, and further increases are to be expected.

This development also means that the length of the blades increases. For the largest wind turbines (12 MW) which are currently installed or being developed, the blades may have a length greater than 100 m. The handling of blades become increasingly difficult with increasing lengths.

Also, the water depth at which wind turbines at sea are installed has increased over the years. Jack-up rigs have limitations when it comes to water depth and an increase in water depth requires larger jack-up rigs in order to maintain stability. The jack-up time of a jack-up rig will also increase with increasing water depths, resulting in higher costs. Further, the increased water depth results in larger foundations which are more difficult to install.

Furthermore, there is an important logistic aspect to wind turbine installation methods at sea. The installation vessel itself is generally quite large and expensive in operation. For this reason it is generally required that the installation vessel remains at the target location and is in operation continuously, with little or no downtime. Nonetheless, since in most projects multiple wind turbines need to be installed, the transport vessel needs to move from one target location to the next each time. Therefore there will always be a certain transport time required between subsequent installations. Jack-up rigs often sail to marshalling yards to load components, and this takes time and results in higher costs. Alternatively, components may be loaded onto the jack-up rig at sea, but this often requires a jack-down/jack-up cycle, which takes time and also results in higher costs.

Furthermore there is a general consideration of which parts of the wind turbine should be assembled on shore, and which parts should be assembled at sea. Many different combinations are possible.

All these considerations make it quite difficult to create an installation method which is simple, fast, safe and at the same time cost-efficient.

WO2013/095136A1 discloses an installation method in which a jack-up rig is used. The jack-up rig comprises a deck on which an installation structure is arranged. In the method, a hub-nacelle assembly is positioned on the installation structure. This lifting operation is carried out with a main crane. The hub-nacelle assembly comprises the nacelle and the hub.

Next, the blades are connected to the hub. This operation is carried out with a secondary crane. The blades are connected to the hub in an inclined orientation, at about 30° to the horizontal.

During the connecting of the blades to the hub, several mast segments 11 of the wind turbine are installed onto the foundation, see in particular FIG. 1g of WO2013/095136A1.

When the mast has been completed and the blades have been connected to the up-nacelle assembly, the crane lifts the completed hub-nacelle assembly including the blades onto the mast.

Although this method appears to work, it was recognized in the present invention that this method has a number of drawbacks.

First, the handling of the blades is quite cumbersome and lacks control and precision. This may not be a problem in case of relatively small blades, but wind turbines become larger and larger and the degree of control during the manipulation of the blades is not sufficient for modern blades which may have a length of greater than 90 m. In particular the outer tip of the blade may sway back and forth, for instance due to wind forces acting on the blades. Although this problem can be solved with separate tugger lines, the fastening of the tugger lines takes time and the control of the tugger lines may be complex.

Furthermore, the root ends of the blades generally have a large number of threaded ends which need to be inserted into corresponding holes in the hub. This requires precise positioning of the threaded ends. When the blade is carried by a crane and controlled with tugger lines, such precise positioning can be difficult, and collisions may occur, resulting in damage to the threaded ends, the holes, or more in general damage to the hub, nacelle or blade. These issues may be acceptable on a jack-up rig, because a jack-up rig is substantially motionless during the installation procedure. However, on a floating vessel these issues become more important and pose serious problems.

Further, this method of installation requires that the foundation of the wind turbine is installed on the seabed in a separate operation. For this part of the installation, another vessel is required because it is generally not efficient to install such a foundation with a jack-up rig. Since the installation of the foundation lies on the critical path, the total installation time becomes quite long.

Furthermore, jack-up rigs have an inherent disadvantage that the jack-up legs need to be positioned on the seabed each time the jack-up rig arrived at a target location. This takes time and results in relatively high costs.

In addition, Jack-up legs are not suitable for every soil condition, with the legs and spud cans having the chance of getting stuck in the soil or punch-through during operation or the jack-up/jack-down process. Also in areas with seismic activities, the use of a jack-up is a risk.

Besides that, the cable arrangement and the jack-up location need to be such that there is no clash with the legs and cables.

EP2275340A1 (also published as US2010/0293781A1) discloses a number of different installation methods for installing a wind turbine at sea with a jack-up rig. In the method which is disclosed in relation to FIGS. 1-3E, a cantilever mast is positioned on the deck 13 of the jack-up rig. The cantilever mast is movable relative to the deck 13. An intermediate platform is mounted to the cantilever mast. The intermediate platform can support a hub-nacelle assembly.

During the installation, the blades are connected to the hub-nacelle assembly, see in particular FIGS. 3C and 3D. At the same time, mast segments 15, 16 are positioned on the foundation 17. When the blades are connected to the hub-nacelle assembly, the cantilever mast is moved toward the completed mast of the wind turbine, see FIG. 3E. The completed Rotor Nacelle Assembly (RNA) is then positioned on top of the mass of the wind turbine.

Although it appears that this method works, it was recognized in the present invention that the cantilever mast in itself is quite complex. Furthermore, the cantilever mast may work in combination with a jack-up rig, but probably would not work in combination with a floating installation vessel, because the relative movements between the floating installation vessel and the foundation of the wind turbine would make it impossible in most weather conditions to install the completed Rotor Nacelle Assembly (RNA) onto the mast of the wind turbine.

Furthermore, the method of EP2275340A1 has similar disadvantages as the method according to WO2013/095136A1. A separate installation vessel for installing the foundation is required, which is expensive. Furthermore, the handling of the blades is quite cumbersome and lacks sufficient control, in particular for very large blades. It is in particular difficult to insert the multiple threaded ends of the root end of the blade in the corresponding holes of the root tend connector on the hub.

EP2275340A1 discloses a further installation method, see in particular FIGS. 4A-4D which show the installation of the mast and nacelle (without rotor) and wherein the installation of a rotor-blade assembly onto the nacelle is performed afterwards. Although it appears that this method works, it requires that the RNA is picked up from a barge in a horizontal orientation and subsequently rotated to a vertical orientation. In particular for large RNA's this is quite a complex lifting operation with associated risks of failure. Because the foundation is located between the jack-up rig and the barge, it also requires that the cantilever tower is positioned outboard of the jack-up rig over a considerable distance, in particular over and beyond the foundation. This is not very practical.

EP2275340A1 discloses another installation method, see FIGS. 5A-5D, which involves connecting the blades to a hub-nacelle assembly which has previously been positioned on a completed foundation-mast-nacelle assembly. It was recognized that this method is also quite costly and can only be used with a jack-up rig. With a floating installation vessel the relative movements between the floating installation vessel and the foundation-mast-nacelle assembly would make this a risky procedure, lacking the precision required to insert the threaded ends of the root end into the associated holes of the root end connector on the hub.

EP2275340A1 discloses another installation method, see FIGS. 6A-6D, in which complete wind turbines including the completed Rotor Nacelle Assembly (RNA) and the mast are lifted from a barge onto a foundation in a single lift operation with the cantilever mast. This method requires that the cantilever mast slides over a considerable distance outboard of the jack-up rig. The cantilever mast must slide over and beyond the foundation to pick up the RNA-mast assembly from the barge. The barge should stay clear of the foundation in order to prevent collisions, which adds to the distance over which the cantilever mast must slide. Furthermore, this lifting operation requires an intermediate position see FIG. 6C, in which the RNA-mast assembly is positioned on the jack-up rig. All in all, this lifting operation is quite complex. For large RNA-mast assemblies, it either requires a large jack-up rig or the stability of the jack-up rig may be compromised.

EP2275340A1 discloses another installation method, see FIGS. 7A-7E. In this method, a hub-nacelle assembly is positioned on a support structure on the deck of the jack-up rig. The blades are subsequently mounted to the hub-nacelle assembly, see in particular FIG. 7B. At the same time or prior to this operation, mast segments are installed on the foundation with a crane and a guide arm 720, see FIG. 7A. A so-called tower trolley 730 is then mounted to the mast of the wind turbine. The completed Rotor Nacelle Assembly (RNA) is then placed on a support platform 734 of the tower trolley. See paragraph 53 of EP2275340A1. The support platform 734 is movable and subsequently moves the Rotor Nacelle Assembly (RNA) on the installed mast, see FIGS. 7C, 7D and 7E. It was recognized in the present invention that the transfer operation of the RNA onto the mast with the help of the tower trolley is quite complex. It requires a specially adapted mast. Furthermore, if the installation vessel is a floating vessel, relative movements of the wind turbine will occur and these movements may impede such a transfer operation or a risk of collision between the RNA and the mast may occur, because the RNA is at the level of the mast and may hit the mast when swaying back and forth.

EP2354537A1 discloses an installation method for assembling a wind turbine at sea in which the hub-nacelle assembly is oriented vertically, with the main rotation axis being oriented vertically the blades are mounted to the hub-nacelle assembly in a horizontal orientation. When the completed RNA is positioned on the mast, it is rotated about a horizontal rotation axis, see in particular FIG. 9. This step involves a complex lifting operation.

KR101435376B1 discloses a method of installation connecting blades to a previously installed assembly of a mast and a nacelle at sea. A jack-up rig is used for the installation method. A hoist block is connected to the mast and can be hoisted upward toward the nacelle. An arm is connected at one end to the hoist block and is configured to slide over a support construction positioned on the deck of the jack-up rig. A blade can be supported by the arm. During installation of the blade, the hoist block is hoisted upward and moves one end of the arm upward. At the same time, the opposite end of the arm moves towards the wind turbine. The blade is pivoted from a substantial horizontal orientation to a near vertical orientation. When the hoist block has reached the nacelle, the root and of the blade is connected to the hub.

It was recognized in the present invention that this method has several disadvantages. A first disadvantage is that additional equipment is required on the mast of the wind turbine to lift the blade. This additional equipment needs to be installed and removed, which adds to expensive critical time.

Furthermore, this method can only be carried out with the jack-up rig because relative movements between a floating installation vessel and the wind turbine will prevent this method from being carried out from a floating installation vessel. A jack-up rig has inherent disadvantages in terms of speed, because the legs need to be positioned on the seabed before any insulation operation can start.

US2011/9956168A1 discloses a system and method for installing a wind turbine at sea. US2011/9956168A1 discloses three separate embodiments of a method of installing a wind turbine.

The first embodiment is disclosed and explained in FIGS. 1 through 19. A nacelle 22 is positioned on a platform 26. The nacelle 22 already has two blades 32 two out of three blades mounted to the hub before it is positioned on the platform 26. The third blade 32 is temporarily mounted to a section 30 of the mast of the wind turbine. See for instance FIG. 2. These mast sections are positioned horizontally on the deck of the installation vessel. The installation vessel is of a jack up type and comprises a base 10. It is not a floating installation vessel in the sense that it floats during the installation of the wind turbines.

The installation vessel is positioned near a lower part 31 of a wind turbine which has previously been installed. The section of the mast is then lifted and rotated to a vertical orientation, see FIG. 10A. Subsequently, this section including the third blade is positioned on the lower part 31, see FIG. 11. Next the nacelle with the two blades is positioned on top of the mast 30, see FIG. 13. Subsequently, the third blade 32 is mounted to the hub.

In US2011/9956168A1, the first two blades are already mounted to the nacelle before it is positioned on the platform 26. The third blade is mounted after the nacelle has been positioned on the wind turbine mast. At this time the nacelle is still supported by the platform 26. Therefore, arguably one blade is mounted on the hub when the nacelle is positioned on the platform, but this is done after the RNA has been positioned on the wind turbine mast, not before. No blades are mounted to the nacelle on the support platform before the lifting operation, The first embodiment is quite a complex procedure and it requires that a blade is pre-connected to the section 30 of the mast.

The second embodiment is disclosed and explained in FIGS. 20-24 of US2011/9956168A1. In this embodiment, the wind turbine is assembled on the lower part 31, see in particular FIG. 20. Therefore is no step of lifting a completed RNA onto the mast. The second embodiment therefore is quite cumbersome and difficult of not impossible to carry out from a floating installation vessel. It is clearly performed from a jack-up rig.

The third embodiment is disclosed in FIGS. 25 and further. This is quite a complex method, because it involves two separate jack-up rigs. For this reason alone it is expensive and prone to error. The nacelle 22 already has two out of three blades mounted to it at the beginning of the installation method. The third blade is mounted to the mast, similar to the first embodiment. See FIG. 27. It appears that the nacelle and the mast are first transferred from the small jack-up rig to the large jack-up rig. See FIGS. 34 to 36. From this moment onward, the installation method appears to be the same as the first embodiment. The third embodiment is not described as an installation method, but as a conveyance system 200, see paragraph 97.

US2014/0317927A1 relates to a method of assembling and transporting an offshore wind turbine. In US2014/0317927A1 the nacelles are provided with partial blades 4 on deck of the installation vessel. The second part 15 of the blades is installed on board, see FIG. 4. During this installation, the nacelle 3 is not raised above the deck level and for this reason, this installation method can only be used for wind turbines having two blades, not three. This is a disadvantage of the method of US2014/0317927A1.

Another disadvantage of US2014/0317927A1 is that it requires a different production method for the blades. The customary method is to produce the blades in one piece, but the method of US2014/0317927A1 requires that the blades are produced in two separate pieces. This is not efficient, and results in an extra point of failure.

OBJECT OF THE INVENTION

It is an object of the invention to provide an installation method and an installation vessel for installing wind turbines at sea which is fast, safe, structured, reliable and cost-effective.

It is a further object of the invention to provide an installation method and an installation vessel with which a complete wind turbine can be installed at sea, particular including the foundation of the wind turbine.

SUMMARY OF THE INVENTION

In order to achieve at least one object, the present invention provides a method for installing an offshore wind turbine at a target location at sea with an installation vessel, wherein the installation vessel floats during the installation of the wind turbine, the installation vessel comprising:
  a nacelle support structure for temporarily supporting a nacelle comprising a hub having a plurality of root end connectors to which the root ends of the blades are to be connected, the nacelle support structure comprising:
    a support tower extending upwardly from a deck of the installation vessel, wherein a base of the support tower remains at a fixed position relative to the deck during the installation of the wind turbine,
    a support platform connected to the support tower, the support platform being configured to temporarily support the nacelle during the connecting of one or more blades thereto,
  one or more lifting devices configured for:
    lifting the nacelle onto the support platform,
    lifting a nacelle assembly including the blades onto a wind turbine mast located adjacent the vessel,
  wherein the lifting device for lifting the completed nacelle assembly is a crane which is separate from the support tower,
  wherein the method comprises:
    a) lifting the nacelle onto the support platform, and securing the nacelle to the support platform, b) orienting a root end connector of the hub of the nacelle in a direction facing a guide path of the blade moving system,
c) connecting the root end of the first blade to the corresponding first root end connector of the hub,
d) repeating steps b) and c) for subsequent blades and root end connectors until all blades are connected to the hub of the nacelle, thereby providing a RNA,
e) suspending the RNA from the crane, lifting the RNA from the support platform of the nacelle support structure with the crane, subsequently moving the RNA with the crane away from the support platform and positioning the RNA onto a wind turbine mast located adjacent the vessel.

The present invention advantageously allows a structured and safe installation procedure from a floating vessel in particular for large wind turbines. The procedure is also relatively fast, safe and cost-effective. Until now, such a procedure was not available. Given the ever increasing size of wind turbines at sea and the increasing depths at which wind turbines at sea are installed, the present installation procedure is a valuable contribution to this field of technology.

The lifting device for lifting the completed nacelle assembly is a crane which is separate from the support tower. This makes the transfer operation simpler and more reliable. A base of the crane is provided at a different location on a deck of the installation vessel than the base of the support tower.

The blades may be installed in one piece, in other words do not need to be installed in two halves as in US2014/0317927A1.

In an embodiment, during the installation of the blades onto the hub the one or more lifting devices may simultaneously install the foundation by lowering the foundation onto the seabed and/or lifts the wind turbine mast or parts thereof onto the foundation. The simultaneous operations of installing the foundation and/or mast (or segments) and installing the blades onto the hub of the nacelle allows for a reduction in overall installation time.

This may in particular be carried out with an installation vessel comprising at least a first lifting device and a second lifting device, wherein the first lifting device is a first crane and the second lifting device is a second crane, wherein the first crane is used to install the foundation by lowering the foundation onto the seabed, followed by the installation of the mast, while the second crane simultaneously performs lifting operations for the assembly of the RNA (Rotor Nacelle Assembly).

In an embodiment, the installation vessel comprises a blade moving system configured for moving a blade from a pickup location to an installation position in which the root end is positioned at the root end connector, the blade moving system comprising at least one movable blade support configured for supporting the blade and a drive system for moving the movable blade support, the method comprising between steps b) and c):
  supporting the root end of a blade with the movable blade support,
  moving the root end of the first blade along the guide path to the root end connector on the hub by moving the movable blade support with the drive system, aligning the root end with the root end connector and engaging the root end of the blade with the root end connector on the hub.

With the present invention, the relative motion between the blade, especially the root end of the blade, and the hub is taken out, which makes the blade installation feasible in a larger weather window, i.e. in rougher weather conditions (seastate and wind for a floating vessel and wind for a jack-up rig).

The invention increases the workability and reduces the movement and difficulty of blade installation. Speed is increased by the fact that during the assembly of an RNA, the tower is installed and the jacket/transition piece/mast is prepared in parallel.

It is estimated that with the present invention, the total installation time of the wind turbine, including the foundation, mast and RNA will be less than 20 hours, possibly less than 17 hours. This is a significant improvement over available methods.

The nacelle support structure provides a stable platform for the installation of the blades onto the hub. Such a nacelle support structure in itself is known from the prior art.

In an embodiment, a further advantage is that the present method can be used with a single vessel. Furthermore, the present invention is very suitable for floating installation vessels. A floating installation vessel has a significant advantage over a jack-up rig, because it does not need to be jacked up and down, which saves time. Beside the Jacking process, a floating vessel can weather vane to find optimum installation heading to decrease motions and create good workability. The floating vessel can work at shallow and deep water depths without any restrictions. There is only a physical draft limitation by means of minimum waterdepth, where a jack-up is restricted by a minimum AND maximum waterdepth.

The installation vessel may be a floating installation vessel, in particular a semi-submersible vessel. In another embodiment of the invention, the installation vessel may be a jack-up rig.

A typical time period required for the installation method according to the present invention when the installation vessel has two cranes and when the foundation is a jacket having suction buckets may be 10.5 hours. This is very short in comparison with known methods which may take several hours more.

In case the foundation is a monopile, the slip joint is integrated into/replaces the transition piece. Installation is such that first the monopile is driven into the seabed, followed by transition piece/slip joint installation and subsequently the installation of the mast, and nacelle assembly. The total installation time may be approximately 17 hours. A conventional method would take several hours more.

In case the foundation has already been pre-installed and only the mast and RNA need to be installed, the required time for the installation method can be approximately nine hours. A conventional method may take several hours more.

In an embodiment, wherein the blade moving system may comprise:
  a loading rail which is connected, in particular fixed, to the nacelle support structure, the loading rail having a first end located at the support platform and a opposite second end located further away from the support platform than the first end, the loading rail defining a loading path, and
  a trolley which rolls or slides along the loading rail between an installation position at the support platform and a remote position which is further away from the support platform than the installation position, wherein at least one blade support is directly or indirectly connected to the trolley and is moved by the trolley,
wherein the method comprises:
  engaging at least a part of the blade, in particular the root end, with the blade support when the trolley is in the remote position and supporting said part of the blade with the blade support, moving the trolley from the remote position toward the installation position at the support platform along the loading rail, thereby moving the root end of the blade toward the root end connector of the hub.

The loading rail provides a very fast and reliable path of the blade toward the root end connector of the hub. In an embodiment, this obviates a crane lift operation for the blade which is quite risky for large blades. The loading rail results in a significant reduction of the weather down time, wherein rough weather may cause relative movement of the blade and the nacelle hub assembly in methods according to the prior art.

In an embodiment, the loading rail may extend over a vertical distance along the support tower, and wherein the remote position is a lower position and the installation position is an upper position of the trolley, wherein the trolley moves the root end upward along the support tower toward the hub of the nacelle. This movement was found to be reliable, fast and safe for the installation of the blades.

In an embodiment, during the upward movement the blade may be pivoted between a pickup orientation in which the blade extends at a pickup angle to the vertical and an installation orientation in which the blade extends at an installation angle to the vertical, wherein the installation angle is smaller than the pickup angle. This is also called up-ending of the blade. The up-ending operation results in a faster, more reliable and safer procedure.

In an embodiment, the blade moving system may comprise a loader arm to which a one blade support or a plurality of blade supports are connected for holding the blade at multiple positions spaced along a length of the blade, the loader arm having a length which is at least half the length of the blade, wherein the loader arm is:
  a) pivotably connected to the trolley via a trolley hinge, or
  b) pivotably connected to the deck or to the support tower via at least one hinge, wherein the hinge is located at a base of the tower or at a distance from the base of the tower,
  wherein the loader arm is pivotable about the hinge and movable between the pickup orientation in which the loader arm extends at a pickup angle to the vertical for picking up the blade and an installation orientation in which the loader arm extends at an installation angle to the vertical, wherein the installation angle is smaller than the pickup angle,
  the method comprising:
    connecting the blade to the loader arm via the blade supports when the blade is in the pickup orientation, and
    pivoting the blade to the installation orientation with the loader arm.

The loader arm allows an effective pickup operation and a fast and safe positioning of the blade relative to the hub.

In an embodiment, the loader arm is pivotably connected to the trolley via the trolley hinge, the method comprising:
  holding the blade with the loader arm via the blade supports, wherein the root end of the blade is directed toward the trolley and the free end is directed away from the trolley,
  moving the trolley upward along the support tower, thereby moving the root end of the blade upward along the support tower towards the hub of the nacelle and pivoting the blade to the installation orientation.

This embodiment further increases the overall speed, reliability and safety.

In an alternative embodiment, the loader arm may be pivotably connected to the deck or to the support tower via at least one hinge, wherein:
  a) the hinge is located at a base of the tower wherein the opposite end of the loader arm follows the path of a part of a circle, wherein the blade is held by the loader arm with the root end of the blade directed away from the hinge and the free end of the blade directed toward the hinge, wherein the blade remains substantially aligned with the support tower during the upward movement,
  b) wherein the hinge s located at a base of the tower wherein the opposite end of the loader arm follows the path of a part of a circle, wherein a blade support is pivotably connected to the opposite end, wherein the blade is pivoted relative to the loader arm during the upward movement toward the hub on the support platform, or
  c) wherein the hinge is located at a distance from the base of the tower, wherein the blade is held by the loader arm with the free end of the blade directed toward the hinge, wherein the blade remains substantially aligned with the support tower during the upward movement,
  the method comprising:
    pivoting the loader arm upward, thereby moving the root end of the blade toward the nacelle.

This is an alternative version of the upending operation, which is simpler in view of the fact that it does not need a trolley and the loader arm makes a simpler, pivoting movement.

In an embodiment, the blade moving system is configured to lift the root end of each blade to the level of the support platform while a free end of the blade remains at the deck level or at least is not raised to the same level before connecting the root end to the hub, wherein during the lifting of the root end the blade is pivoted and the free end is moved toward the support tower. The free end can be supported at the deck level by the loader arm, may move upward over a smaller distance or may even move downward during the upending, in case the loader arm is shorter than the blade and the free end of the blade protrudes beyond the end of the loader arm which is directed away from the support tower.

In an embodiment, the blade is picked up with the at least one blade support while the blade is substantially horizontal. This allows the blade to be picked up from the deck, which is efficient.

In an embodiment, wherein the blade is pivoted to an installation orientation which is substantially aligned with the support tower, in particular vertical. The aligning with the support tower creates an efficient control of the position and orientation of the blade and facilitates the required fine positioning of the root end of the blade relative to the root end connector of the hub.

In an embodiment, the support tower is oriented substantially vertical, or at least at an angle of less than +/−5 degrees to the vertical. In this way, the force of gravity pulling on the blade is aligned with the direction in which the root end is moved toward the root end connector of the hub.

In an embodiment, wherein the blade moving system comprises actuators for aligning of the root end relative to the root end connector in a Y and Z direction which are orthogonal to a longitudinal direction of the blade, the longitudinal direction being the X-direction, wherein the actuators move at least one blade support in the Y and Z direction relative to the trolley or loader arm to which the blade support is connected, wherein the actuators in particular align the multiple threaded ends of the root end with associated multiple holes in the root end connector. The actuators allow precise aligning of the root end with the root end connector.

In an alternative embodiment, the blade is pivoted to an installation orientation which is at an angle of 50-70 degrees to the vertical. This embodiment provides an advantage in that the blade does not need to be completely oriented parallel to the support tower. This saves time. The blade can in particularly be oriented at an angle of 60 degrees to the vertical.

In an embodiment, the main rotation axis of the hub is oriented substantially horizontal In an embodiment, the main rotation axis of the hub is oriented substantially parallel to or substantially orthogonal to a longitudinal direction of the vessel. It was found that this allows a simple construction of the support tower and support platform and improves several logistic aspects of the installation method.

It is noted that the blades are not inserted at exactly 90 degrees angle to the hub axis. This is due to the clearance requirement between the blades and the mast of the wind turbine when subjected to high wind loads. Therefore: the axis of the hub is horizontal +/−x degrees (for adjustment to hub-blade angle). The direction can be any direction, but likely either longitudinal or perpendicular +/−x degrees (for adjustment to hub-blade angle).

In an embodiment, the support tower and the pickup location of the blades are positioned at a side of the installation vessel, and the pickup location extends parallel to a longitudinal direction of the installation vessel. It was found that this improves the overall deck layout. A central portion of the deck can be used for storage and handling of the nacelle, hub (if not pre-assembled to the nacelle) and blades, which improves the safety.

In an embodiment, the support tower has a height which is at least 70 percent, in particular at least 90 percent, more in particular at least 100 percent of a length of the blade.

This allows the blade to be aligned with the support tower. The maximum height of the support tower is determined by the maximum crane lifting height. The minimum height of the support tower is determined by the blade length with regard to the sea level where the blade(s) at an angle (just) do/does not touch the water. The blade angle may be between 50-90 degrees to the horizontal, and the minimum height of tower with regard to the sea level (at nominal draught) is approximately: Length of blade x cos (blade angle).

In an embodiment, the blade moving system comprises a hoisting system comprising a traveling block, wherein at least one blade support is mounted directly or indirectly to the travelling block for hoisting the root end of the blade to the support platform while pivoting the blade upward, wherein in particular the traveling block and the trolley are integrated. The hoisting system was found to be a simple and reliable method of moving the root end of the blade toward the root end connector on the hub.

In an alternative embodiment, the loading rail extends over a horizontal distance away from the support platform and the trolley rolls or slides along the loading rail toward said support platform over said horizontal distance from the remote position to the installation position, wherein a blade support is provided on the trolley. In this embodiment, the blade and in particular the root end thereof is moved toward the root end connector over a horizontal distance. It was found that this also allows a fast, reliable and safe positioning and connecting procedure.

In this embodiment, the one or more lifting devices may comprise a crane, wherein the blade may be lifted from the deck with the crane and wherein the root end of the blade is positioned on the trolley, and wherein the blade is supported by both the trolley and the crane during the movement of the trolley toward the nacelle. This is a simple and safe procedure of positioning the blade and connecting the blade to the root end connector.

In this embodiment, the loading rail may extend horizontally. This allows a horizontal positioning of the root end relative to the root end connector.

The loading rail may also be inclined to the horizontal. In an embodiment, the loading rail may extends at an angle of 0-70 degrees, preferably 50-70 degrees to the vertical and wherein the blade is connected to the root end connecter at an angle of 0-70 degrees, preferably 50-70 degrees to the vertical. The root end is moved upward along the rail. The root end connector is aligned with the rail, allowing the root end of the blade to be inserted into the root end connector in a simple movement.

In an embodiment, the foundation and the wind turbine mast or mast segments are installed from a first side of the installation vessel by the first crane, and the RNA is assembled on a second, different side of the vessel, and wherein during the installation of the foundation and the connecting of the blades to the hub the installation vessel is positioned with the first side at the target location, and wherein after the installation of the foundation and the wind turbine mast, the vessel is repositioned with the second side at the target location in order to transfer the RNA (36) from the vessel onto the wind turbine mast This allows the deck space to be divided in two dedicated deck areas. A first deck area is dedicated for the installation of the foundation and mast, and a second, different deck area is dedicated for the assembly of the RNA.

This also allows separate teams to work on:
1) the installation of the foundation and mast in the first deck area, and
2) the assembly and installation of the RNA in the second deck area.

During the installation of the foundation and the connecting of the blades to the hub the installation vessel may be positioned with the starboard side at the target location. After the installation of the foundation and the wind turbine mast, the vessel may be repositioned with the side on which the RNA is assembled at the target location in order to transfer the nacelle with the blades from the vessel onto the wind turbine mast. This allows parallel operations throughout the installation process.

Alternatively, the installation vessel is positioned relative to the target area in a vessel position in which:
1) the target area lies within the reach of the crane which lifts the foundation and masts to the target area and
2) the target area lies within reach of the crane which lifts the RNA onto the mast.

This obviates a repositioning of the installation vessel. If two cranes are used, the target area should be located in an area of overlap of the two cranes. If the cranes are positioned at the stern, the vessel would then be positioned with the stern at the target area. If the cranes are positioned at the bow, the vessel would be positioned with the bow at the target area. If the cranes are positioned at the starboard or port side the vessel would be positioned with the starboard respectively the port side at the target area.

If only a single crane is used for both the installation of the foundation and mast and for the lifting of the RNA onto the mast, the first deck area, the vessel is positioned such that the second deck area and the target location are within reach of the single crane.

If the installation vessel is repositioned, the installation vessel may be repositioned during the installation of the blades on the hub. This further saves installation time.

The individual blades may be installed on the hub in a vertical orientation.

Alternatively, the individual blades may be installed on the hub in an inclined orientation, the root end of the blade being located higher than the free end of the blade.

The present invention further relates to an installation vessel configured for offshore installation of wind turbines at a target location, the vessel comprising:
- a nacelle support structure for temporarily supporting a nacelle comprising a hub having a plurality of root end connectors to which the root ends of the blades are to be connected, the nacelle support structure comprising:
  - a support tower extending upwardly from a deck of the installation vessel,
  - a support platform connected to the support tower, the support platform being configured to temporarily support the nacelle during the connecting of one or more blades thereto,
- one or more lifting devices configured for:
  - lifting the nacelle onto the support platform,
  - lifting a completed nacelle assembly onto a wind turbine mast located adjacent the vessel.

The installation vessel according to the invention provides the same advantages as the method according to the invention.

In an embodiment, the Installation vessel comprises a blade moving system configured for moving a blade from a pickup location to an installation position in which the root end is positioned at the root end connector, the blade moving system comprising at least one movable blade support configured for supporting the blade and a drive system for moving the movable blade support.

In an embodiment, the blade moving system comprises:
- a loading rail which is connected, in particular fixed, to the nacelle support structure, the loading rail having a first end located at the support platform and a opposite second end located further away from the support platform than the first end, the loading rail defining a loading path, and
- a trolley which rolls or slides along the loading rail between an installation position at the support platform and a remote position which is further away from the support platform than the installation position, wherein at least one blade support is directly or indirectly connected to the trolley and is moved by the trolley.

In an embodiment, the loading rail extends over a vertical distance along the support tower, and wherein the remote position is a lower position and the installation position is an upper position of the trolley, wherein the trolley is configured to move the root end upward along the support tower toward the nacelle.

In an embodiment, the blade moving system comprises a loader arm to which a plurality of blade supports are connected for holding the blade at multiple positions spaced along a length of the blade, wherein the loader arm is:
a) pivotably connected to the trolley via a trolley hinge, or
b) pivotably connected to the deck or to the support tower via at least one hinge, wherein the hinge is in particular located at a base of the tower,
wherein the loader arm is pivotable about the hinge and movable between the pickup orientation in which the loader arm extends at a pickup angle to the vertical for picking up the blade and an installation orientation in which the loader arm extends at an installation angle to the vertical, wherein the installation angle is smaller than the pickup angle.

In an embodiment, one end of the loader arm is pivotably connected to the trolley via the trolley hinge, and wherein an opposite end of the loader arm is supported by a deck trolley which is movable over a deck rail which extends between a first location on deck and a second location on deck, the second location being closer to a base of the support tower then the first location, wherein the blade moving system is configured to lift the root end of each blade to the level of the support platform while a free end of the blade remains at the deck level or at least is not raised to the same level before connecting the root end to the hub, wherein during the lifting of the root end the blade is pivoted over an angle and the free end is moved toward the support tower.

In an embodiment, the loader arm is pivotably connected at one end to a hinge which is located at a base of the support tower, wherein the loader arm is configured to pivot about the hinge between a substantially horizontal orientation and an installation orientation in which the loader arm is substantially aligned with the support tower, wherein the opposite end of the loader arm follows the path of a part of a circle, wherein the loader arm is configured to hold the blade with the root end of the blade directed away from the support tower and the free end of the blade directed toward the support tower.

In an embodiment, the support tower is oriented substantially vertical, or at least at an angle greater than 85 degrees to the horizontal.

In an embodiment, the main rotation axis of the hub is oriented parallel to a longitudinal direction of the vessel.

In an embodiment, the support tower and the pickup location of the blades are positioned at a side of the installation vessel, and wherein the pickup location extends parallel to a longitudinal direction of the installation vessel.

In an embodiment, the support tower has a height which is at least 70 percent, in particular at least 90 percent, more in particular at least 100 percent of a length of the blade.

In an embodiment, the blade moving system comprises a hoisting system comprising a traveling block, the blade support being mounted to the travelling block for hoisting the root end of the blade to the support platform while pivoting the blade upward, wherein in particular the traveling block and the trolley are integrated.

In an embodiment, the loading rail extends over a horizontal distance away from the support platform and the trolley is configured to roll or slide along the loading rail toward said support platform over said horizontal distance from the remote position to the installation position.

In an embodiment, the one or more lifting devices comprises a crane configured to lift the blade from the deck and to position the root end of the blade on the trolley while continuing to support the blade during the movement of the trolley toward the nacelle.

In an embodiment, the loading rail extends horizontally. In an alternative embodiment, the loading rail extends at an angle of 0-70 degrees, preferably 40-80 degrees, more preferably 50-70 degrees to the vertical.

In an embodiment, the installation vessel comprises at least a first lifting device and a second lifting device, wherein the first lifting device is a first crane and the second lifting device is a second crane, wherein the first crane is configured to install the foundation by lowering the foundation onto the seabed, wherein the second crane is configured to simultaneously perform lifting operations for the assembly of the RNA.

In an embodiment, the first crane is positioned on the starboard side of the installation vessel, and the second crane is positioned on the port side of the installation vessel, or vice versa, and wherein both the first crane and the second crane are positioned at the bow or at the stern of the vessel.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIGS. 1 through 13 show steps in a wind turbine installation method according to an embodiment of the invention.

DETAILED DESCRIPTION OF THE FIGURES

Figure 1A:
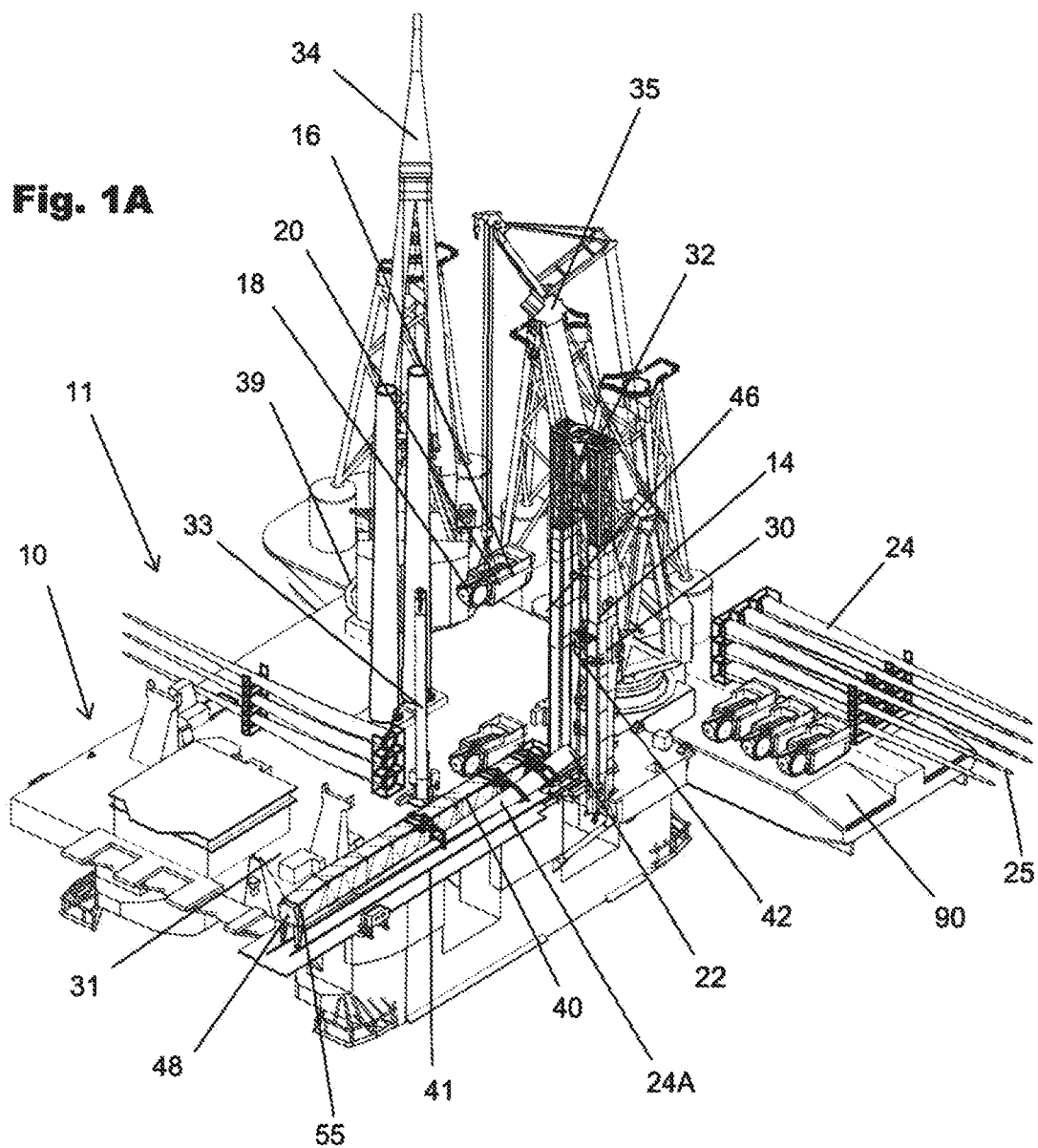
Figure 1B:
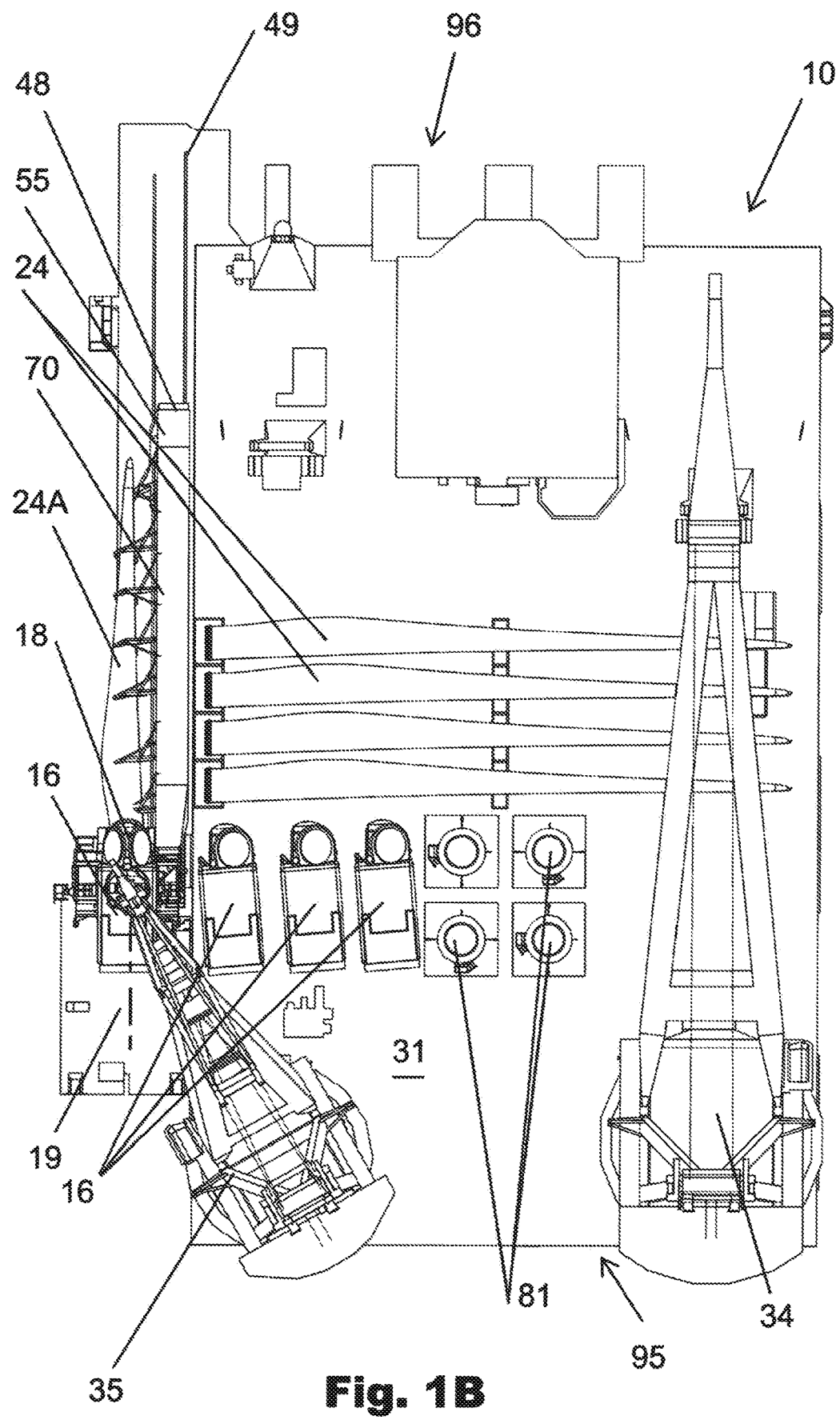

Turning to FIGS. 1A and 1B, one embodiment of the method for installing an offshore wind turbine at a target location 11 at sea with an installation vessel 10 is shown. The method is in particular intended to be carried out with a floating installation vessel.

The installation vessel 10 comprises a nacelle support structure 14 for temporarily supporting a nacelle 16 comprising a hub 18 having a plurality of root end connectors 20 to which the root ends 22 of the blades 24 are to be connected.

The nacelle support structure 14 comprises a support tower 30 extending upwardly from a deck 31 of the installation vessel 10. The support tower comprises a base 130. In this embodiment, the support tower is oriented substantially vertical, or at least at an angle of less than 5 degrees to the vertical, but obviously the support tower may be inclined at a different angle. In this embodiment, the base 130 of the support tower comprises a hinge which allows the support tower to pivot relative to the deck and hull of the floating installation vessel. The hinge is fixed to the deck or hull. Therefore the position of the base 130 is also fixed, even though the orientation of the tower relative to the deck or hull is adjustable. Normally the support tower 130 will be oriented vertically.

The nacelle support structure 14 further comprises a support platform 32 connected to the support tower 30, in particular at the top end of the support tower. The support platform 32 is configured to temporarily support the nacelle 16 during the connecting of one or more blades 24 thereto.

The installation vessel 10 comprises one or more lifting devices 34, 35 configured for:
lifting the nacelle 16 onto the support platform,
lifting a nacelle assembly 36 including the blades 24 (also referred to as a RNA 36) onto a wind turbine mast located adjacent the vessel.

The lifting device may be cranes 34, 35. Each crane 34, 35 comprises a base 39, in particular a turret base, which is mounted to the deck or hull of the vessel. The turret base allows rotation of the crane about a vertical axis. Each crane further comprises a pivotable boom 131 which is connected to the turret base, in particular via a hinge 132 defining a horizontal hinge axis. The boom is supported with support cables 133 which are connected to a rear side of the turret base 39, extend over a support frame 134 and to an upper portion 135 of the boom 131. The support cable 133 are operable by a winch to raise and lower the pivotable boom 131 as desired.

The installation vessel 10 comprises a large portside crane 35 and a starboard crane 34. The installation vessel 10 further comprises an auxiliary crane 33. The first crane 34 is positioned on the starboard side of the installation vessel 10 and has an associated first deck area located substantially on a starboard of the deck 31. The second crane 35 is positioned on the port side of the installation vessel and has an associated second deck area located substantially on a port side of the deck 31. The first deck area is used for the installation of the foundation and mast. The second deck area is used for the installation of the nacelle and blades.

Both the first crane 34 and the second crane 35 are positioned at the stern 95 of the vessel 10. Alternatively, the cranes may be positioned at the bow 96. It was found that this improves the overall efficiency of the installation procedure.

The installation vessel 10 further comprises a blade moving system 40 configured for moving a blade 24 from a pickup location 41 to an installation position 42 in which the root end 22 is positioned at the root end connector 20 of the hub. The blades are installed in one piece, contrary to US2014/0317927. Each root end 22 comprises multiple threaded ends which need to be inserted into corresponding holes or the root end connector 22 of the hub.

The blade moving system 40 comprises a loading rail 46 which is connected, in particular fixed, to the nacelle support structure. In this embodiment, the loading rail 46 is fixed to the support tower 30 and extends along the support tower.

The loading rail 46 has a first, upper end located at the support platform and an opposite, second, lower end located further away from the support platform than the first end. The loading rail defines a loading path. In FIG. 1, the loading rail is located on the other side of the support tower 30.

The blade moving system 40 further comprises a trolley 60 which rolls or slides along the loading rail 46 between an installation position at the support platform and a remote position which is further away from the support platform than the installation position, in particular at the deck level.

The blade moving system 40 further comprises a loader arm 70 to which a plurality of blade supports 44 are connected for holding the blade at multiple positions spaced along a length of the blade. Alternatively, a single blade support may be connected to the loader arm. Typically, the loader arm has a length which is at least half the length of the blade. The blade 24 is connected to the loader arm 70 via the blade supports 44 when the blade is in the pickup orientation. In this embodiment, the blade 24 is picked up with the at least one blade support while the blade is substantially horizontal. The blade supports may comprise grippers which pick up the blade from above. The gripper may work on clamping, friction or suction. In this, way, when the loader arm is aligned with the tower, the blade supports are on the side of the blades which faces away from the tower.

The end 55 of the loader arm which is opposite to the trolley 60 is pivotably supported by a deck trolley 48 which rolls or slides over a deck rail 49. The opposite end moves in a horizontal direction. The deck rail extends between a first location on deck and a second location on deck, the second location being closer to a base of the support tower then the first location. The deck rail 49 may extend lengthwise of the installation vessel and extend adjacent the pickup location 41.

The blade 24 is held by the loader arm 70 via the blade supports 44, wherein the root end 22 of the blade is directed toward the trolley and the free end 25 is directed away from the trolley. The blade supports 44 are connected to the loading rail 46 via the loader arm and the trolley.

In the embodiment of FIGS. 1-12, the loader arm is pivotably connected to the trolley via a trolley hinge 71. (As will be explainer further below, in another embodiment the loader arm may be pivotably connected to the deck or to the support tower via at least one hinge, wherein the hinge is in particular located at a base of the tower. This embodiment may function without a loading rail or a trolley.) The loader arm 70 is pivotable about the trolley hinge 71 relative to the trolley and movable between the pickup orientation in which the loader arm extends at a pickup angle, in particular at about 90 degrees, to the vertical for picking up the blade and an installation orientation in which the loader arm extends at an installation angle to the vertical, wherein the installation angle is smaller than the pickup angle.

The method comprises engaging at least a part of the blade, in particular the root end 22, with the blade support 44 when the trolley is in the remote position and supporting said part of the blade with the blade support.

The blade moving system 40 comprises at least one movable blade support 44 and a drive system 45 for moving the movable blade support, see FIG. 2. The blade moving system 40 is configured to move the blade support in an X, Y and Z-direction relative to the root end connector of the hub of the nacelle on the support platform. Alternatively or additionally, the support platform 32 may comprise actuators for moving the nacelle 16 including the hub 18 in a X,Y and Z-direction for precise positioning. This is discussed in connection with FIGS. 33-36.

The support tower 30 and the pickup location of the blades are positioned at a side of the installation vessel, in this case the port side. The nacelle 16 is lifted toward the support platform 32 by the portside crane 35.

The pickup location 41 for the blades 24 is elongate and extends parallel to a longitudinal direction of the installation vessel. The pickup location is forward of the support tower 30. The portside crane 35 is positioned behind the support tower 30.

A barge 90 or other type of support vessel can be positioned alongside the installation vessel throughout the installation process or at required time periods during the installation process. The barge may hold parts of the wind turbine, i.e. extra foundations, masts or mast segments, nacelles or blades. The blades may be packaged in a set of three or four blades, typically three. Throughout the installation process, the parts may be transferred from the barge 90 onto the installation vessel 10. The parts, such as the foundation 80, transition piece 85, mast 81, blades 24 and/or the nacelles 16, may additionally or alternatively be stored on the deck 31 of the installation vessel. The nacelle storage location may be located centrally on the deck. The blade storage location may also be located centrally on the deck.

FIG. 2 shows the nacelle on top of the support platform 32. Next, the nacelle is secured to the support platform. The main rotation axis 19 of the hub is oriented substantially horizontal, at least at an angle of +/−5 degrees to the horizontal. In this embodiment, the main rotation axis 19 of the hub is oriented parallel to a longitudinal direction of the vessel. Next, a root end connector 20 of the hub of the nacelle is oriented in a direction facing a guide path 43 of the blade moving system.

At the same time, the root end 22 of a blade 24 is supported by the movable blade support 44 of the loader arm 70. The loader arm 70 is in the pickup orientation and aligned with the deck. The loader arm comprises three movable blade supports 44A, 44B, 44C which are spaced apart. Obviously, the pickup orientation need not be entirely horizontal. The movable blade supports 44A, 44B, 44C comprise grippers which are configured to extend over the blade and to grip the blades from above. Each movable blade support 44A, 44B, 44C comprises controlled actuators to control the grippers. Furthermore, each movable blade support 44A, 44B, 44C comprises actuators to accurately control the positon of the grippers in a X, Y and Z-direction relative to the loader arm 70. This is required for the fine positioning to insert the multiple threaded ends of the root end 22 into the corresponding holes of the root end connector.

The blade moving system 40 is configured to lift the root end 22 of each blade to the level of the support platform while a free end 25 of the blade remains at the deck level or at least is not raised to the same level before connecting the root end to the hub. During the lifting of the root end the blade the free end 25 is moved toward the support tower.

Simultaneous with the assembly of blades onto the hub, the first crane 34 is used to install the foundation 80 by lowering the foundation onto the seabed while the second crane 35 performs lifting operations for the assembly of the nacelle. The foundation may be anchored to the seabed with suction buckets. Alternatively, the foundation may be anchored with piles. The foundation is shown to be a jacket, but the foundation may also be a monopile and the invention provides substantially the same advantages in case of a mono-pile.

In case of a monopile, the slip joint is integrated into/replaces the transition piece. Installation is such that first the monopile is driven into the seabed, followed by the installation of the transition piece/slip joint. Subsequently the installation of the mast, and nacelle assembly is carried out.

The present invention also works with other types of foundations, such as a gravity based structure.

The foundation 80 and the wind turbine mast 81 or mast segments are installed from the starboard side of the installation vessel by the first crane, and the nacelle 16 is assembled on the port side of the vessel, or vice versa.

During the installation of the foundation and the connecting of the blades 24 to the hub, the installation vessel may be positioned with the starboard side at the target location 11. Obviously the vessel may also be mirrored and in that configuration the installation vessel would be positioned at the target location with the port side. In an alternative method, the installation may be positioned with the stern or bow at the target location.

After the installation of the foundation 80 and the wind turbine mast 81, the vessel 10 may be repositioned with the other side at the target location, i.e. with the side on which the nacelle is assembled at the target location, in order to transfer the nacelle with the blades from the vessel onto the wind turbine mast.

If the vessel is repositioned, the repositioning of the vessel may be carried out during the installation of the blades on the hub.

Turning to FIG. 3, the trolley 60 is moved upward along the support tower 30 by the drive system 45, thereby moving the root end 22 of the blade upward along the support tower toward the nacelle and pivoting the blade to the installation orientation. The drive system may comprise hoist block connected to the trolley and a winch for hoisting the trolley upward.

The root end 22 of the first blade 24A is moved along the guide path to the root end connector 20 on the hub. The blade 24 is pivoted to the installation orientation with the loader arm 70.

During the upward movement the blade 24 is pivoted between a pickup orientation in which the blade extends at a pickup angle to the vertical and an installation orientation in which the blade extends at an installation angle to the vertical, wherein the installation angle is smaller than the pickup angle.

Turning to FIG. 4, the root end 20 of the blade 24 is engaged with the root end connector 20 on the hub 18, and the root end 20 of the first blade is connected to the corresponding first root end connector of the hub. This generally involves the mounting of a number of bolts. During the connecting operation, the blade is held by the blade supports 44 of the blade moving system.

Figure 17A:
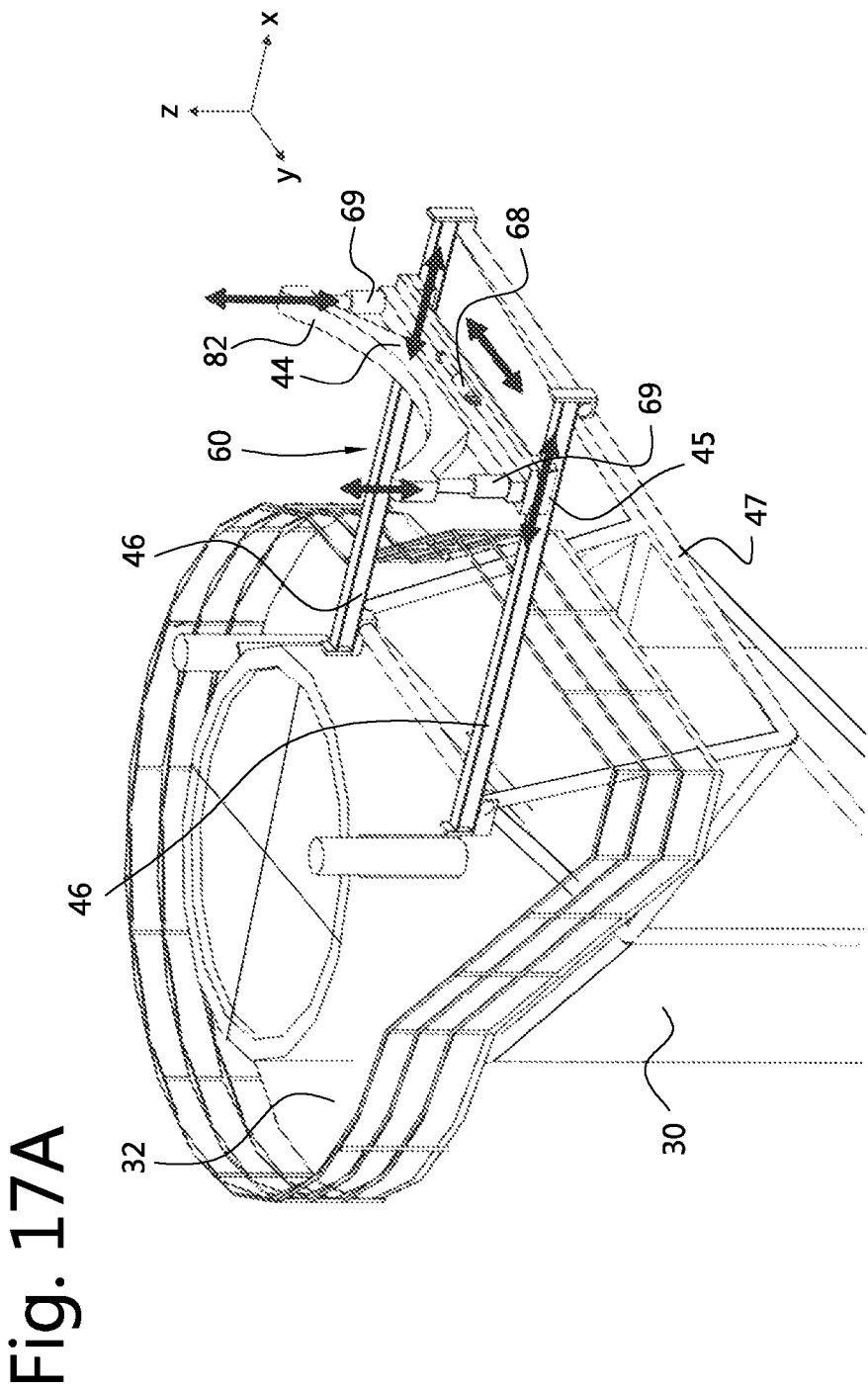
Figure 17B:
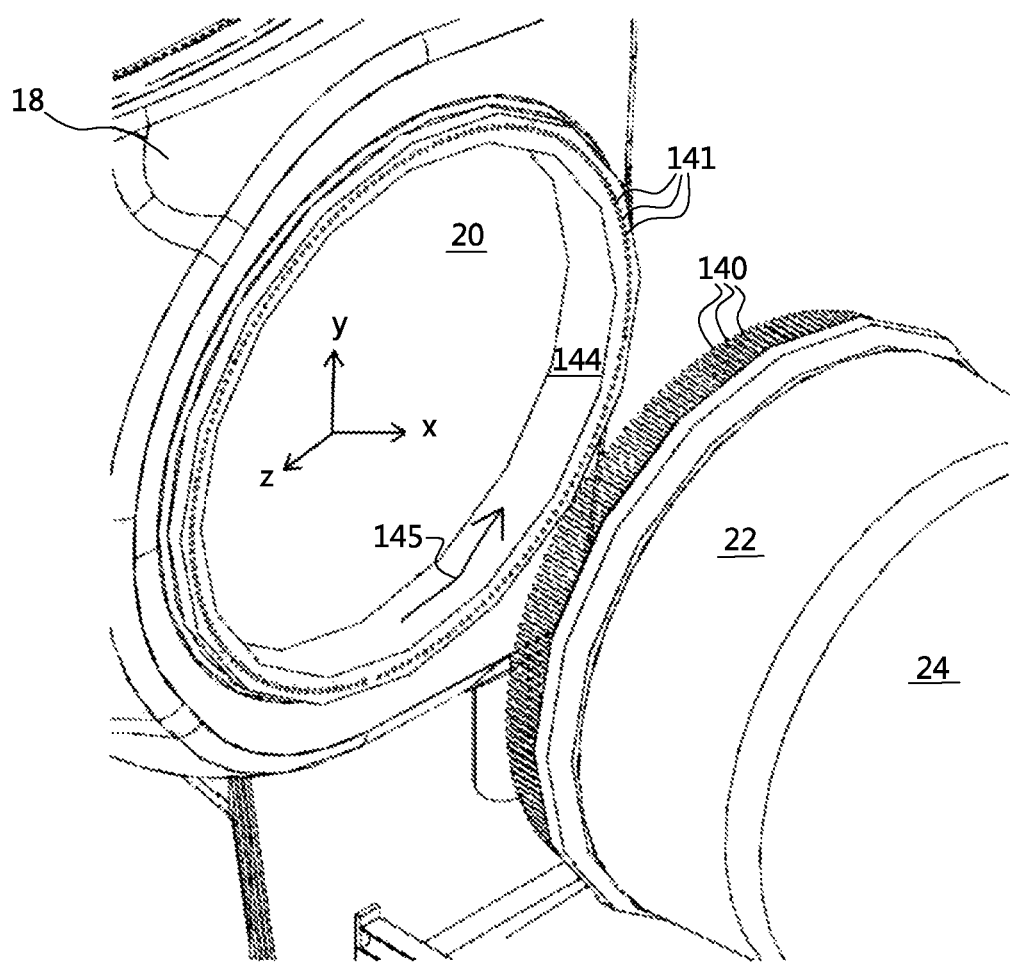
Figure 18:
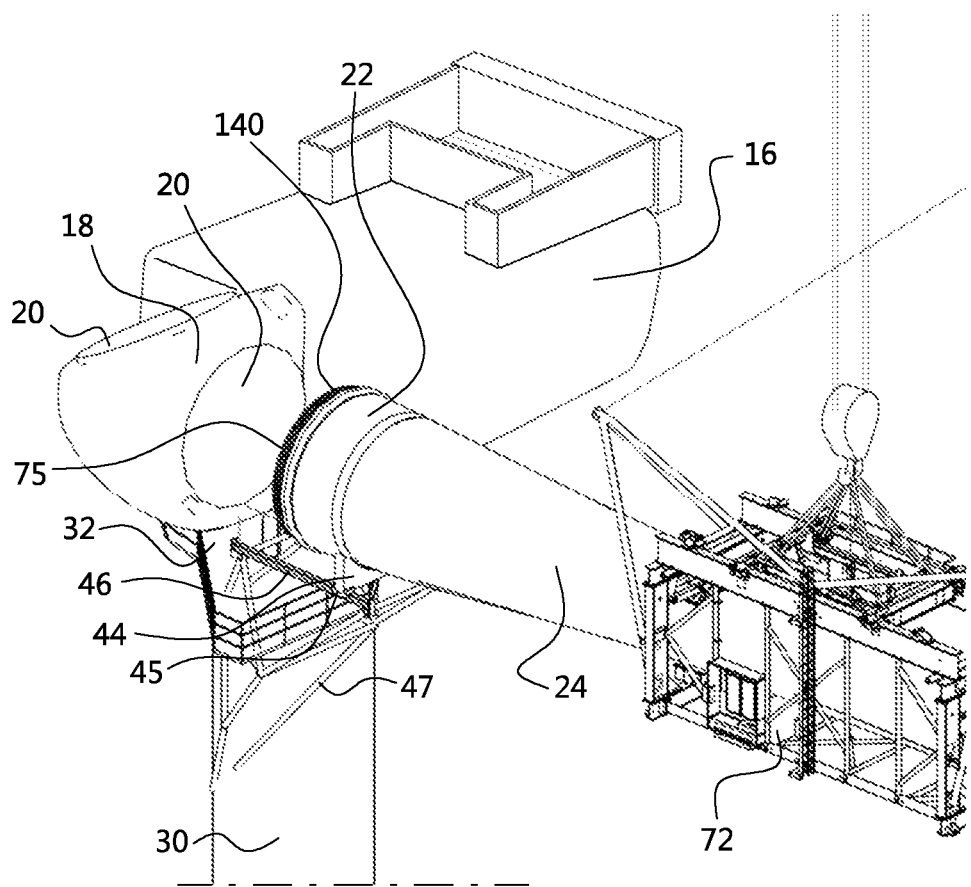
Figure 19:
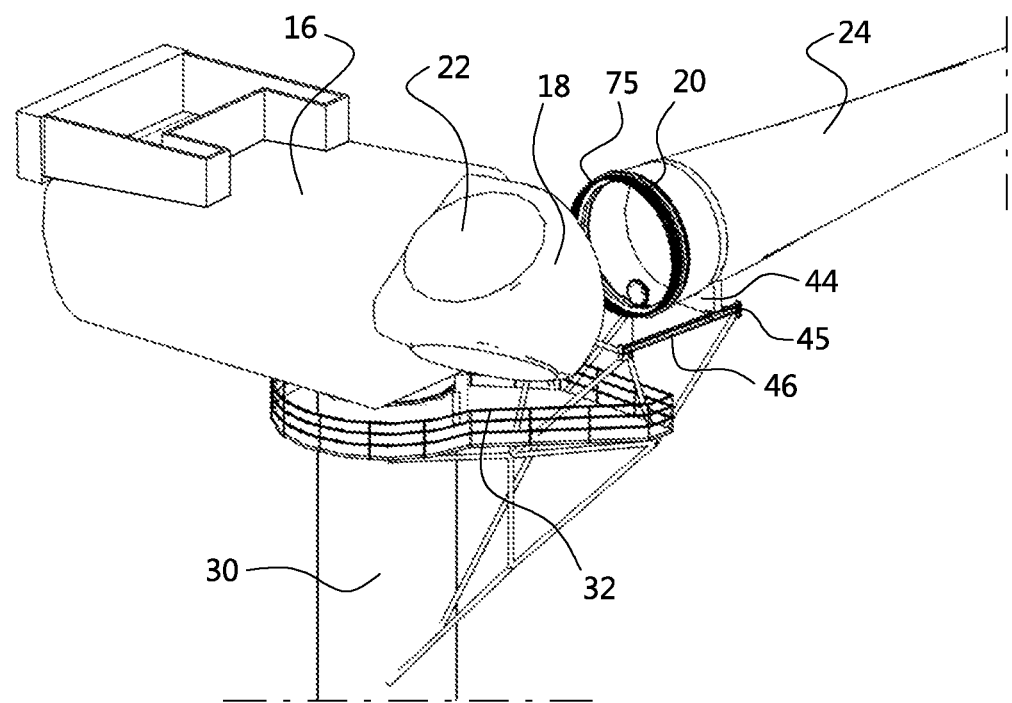

The trolley 60 may be used to move the blade in the X-direction, the longitudinal direction of the blade. An actuator 68 is provided to move the blade support 44 in the Y-direction. A further actuator 69 is provided to move the blade support 44 in the vertical direction (Z-direction). The actuators align the threaded ends 140 of the root end 22 with corresponding holes 141 in the root end connector. FIG. 17B shows the threaded ends and the holes. There may be more than 100 threaded ends 140 and a same number of holes 141. The holes are provided in a ring 144. The ring 144 is rotatable relative to the hub in a circumferential direction, i.e. about the X-axis as indicated with the arrow 145. Therefore, the blade itself generally does not need to be rotated about its X-axis to align the threaded ends 140 with the holes 144.

Returning to FIG. 4, the blade 24 is pivoted to an installation orientation which is substantially aligned with the support tower 30. The individual blades are installed on the hub in a vertical orientation.

Alternatively, or additionally, the support platform 32 may comprises actuators for moving the nacelle 16 including the hub 18 in at least a Y-direction and a Z-direction relative to the blade which is held by the at least one blade support (44). This variant is discussed further below in connection with FIGS. 33-36.

In the embodiment in which the blade is aligned with the support tower 30, the support tower 30 has a height which is at least 70 percent, in particular at least 90 percent, more in particular at least 100 percent of a length of the blade. In an embodiment in which the support tower has a height which is smaller than a length of the blade 24, it may still be possible to align the blade 24 with the support tower, by letting the free end of the blade protrude beneath the support tower at the side of the vessel. The free end of the blade may even enter the water during installation. The height of the crane should be higher than the height of the support tower, to allow the crane to lift the completed RNA 36 from the support tower.

In an embodiment in which the blade is not aligned with the support tower, but installed at an angle of for instance 60 degrees to the vertical, the height of the tower above the sea level should be at least blade length times cos 60 degrees. Such an embodiment is discussed further below.

Figure 6:
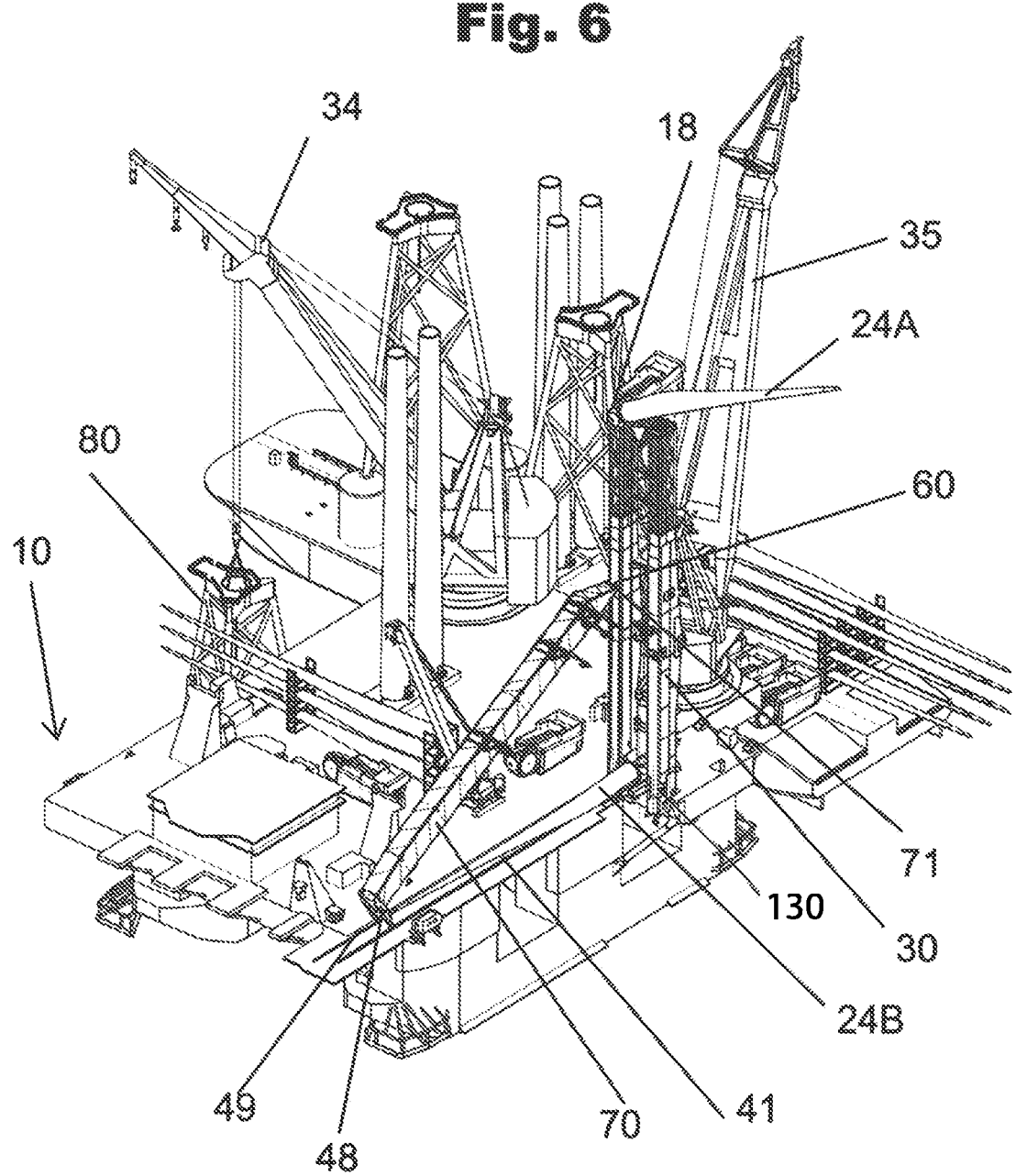

Turning to FIG. 5, the first blade 24A is subsequently rotated over an angle of 120 degrees to orient the second root connector 20 in the downward direction. Simultaneously, a second blade 24B is positioned at the pickup location 41. Turning to FIG. 6, the loader arm is moved downward to pick up the second blade 24B.

Figure 7:
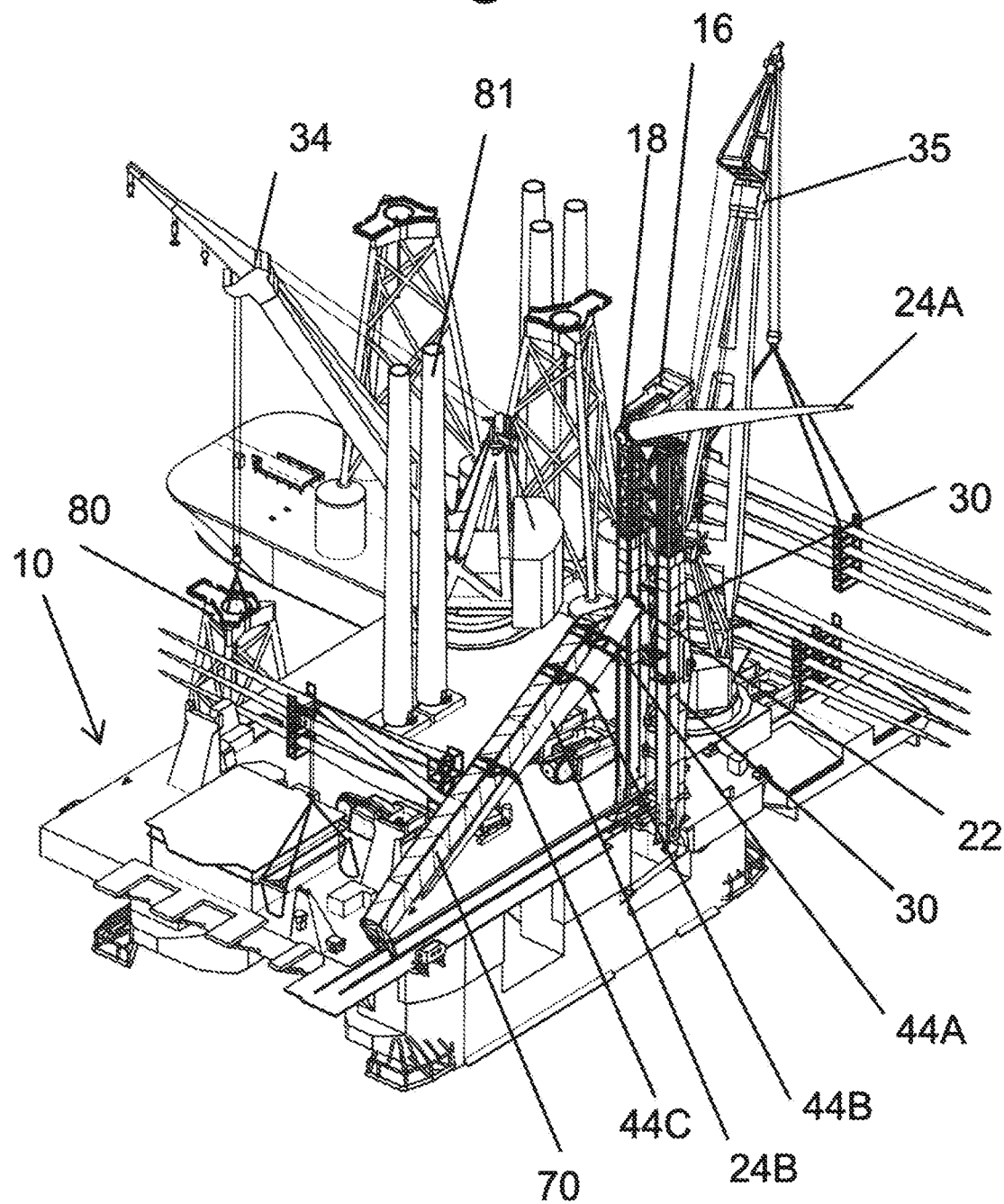

Turning to FIG. 7, the second blade 24B is moved upward by the blade moving system.

Figure 8:
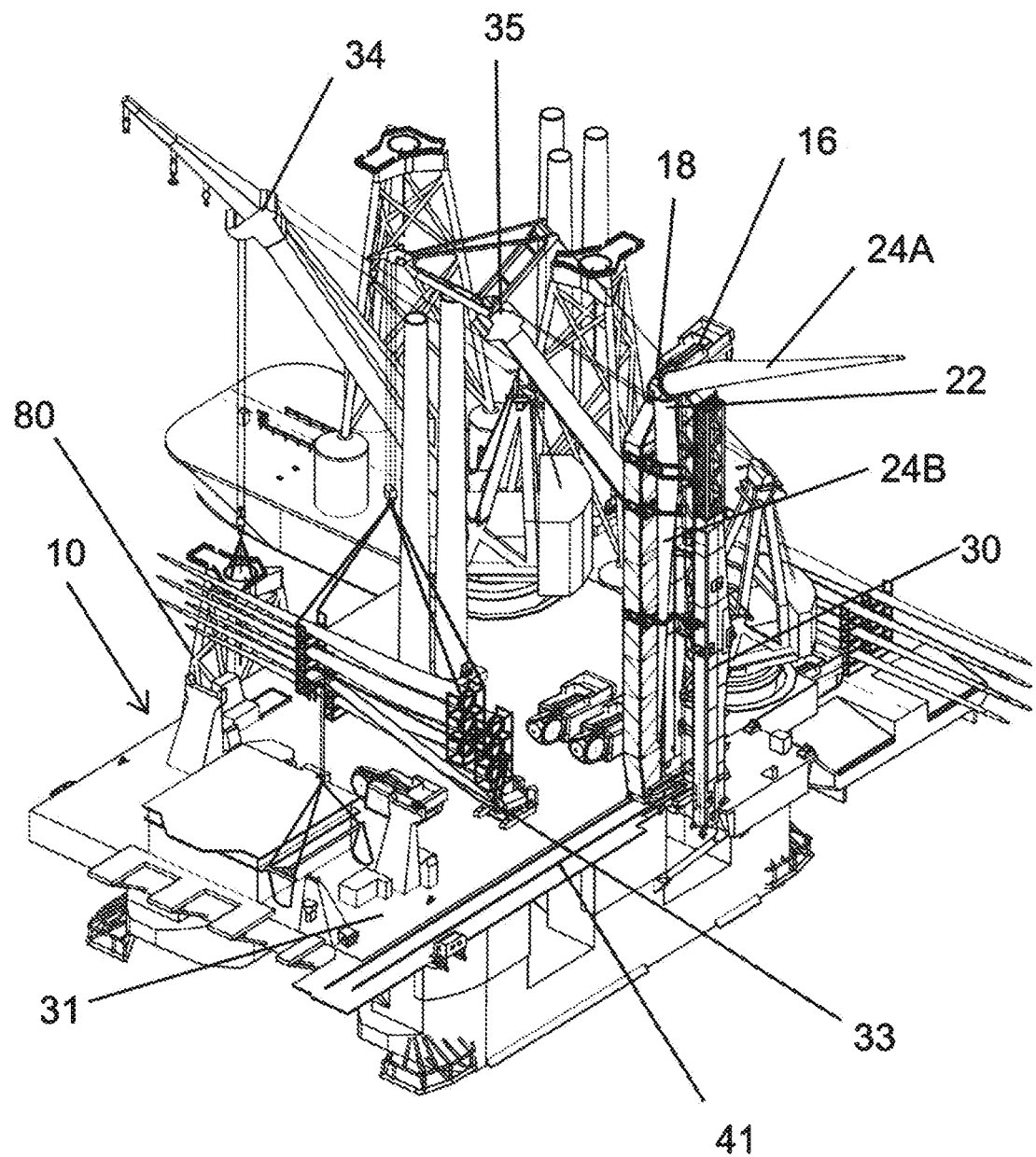
Figure 9:
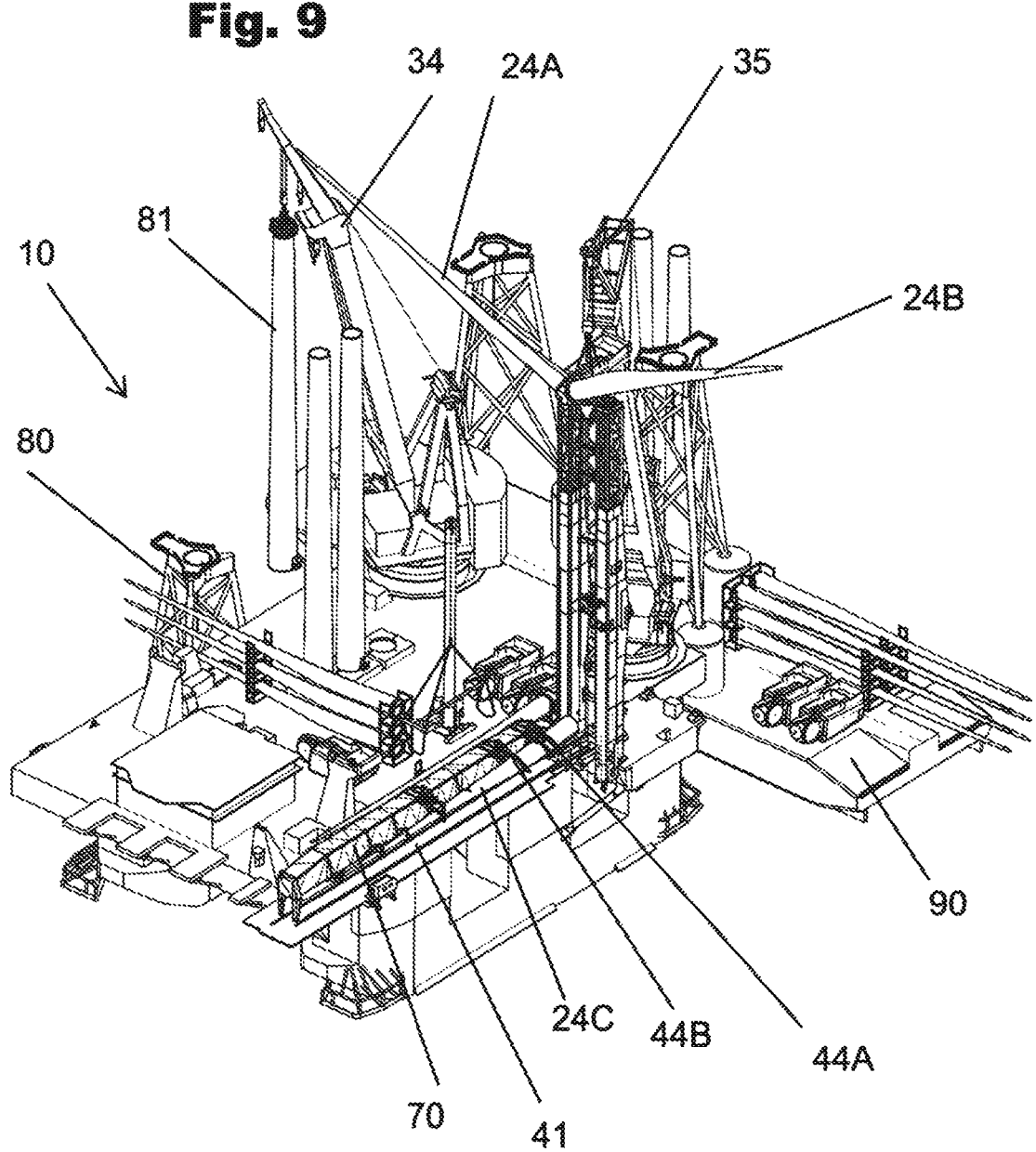

Turning to FIG. 8, the root end of the second blade is connected to the root end connector 20 of the hub 18.

Turning to FIG. 9 the hub is again rotated over 120 degrees. The third blade 24C is positioned at the pickup location. The loader arm is at the pickup location and the blade supports engage the third blade 24C.

During the installation of the third blade 24C, the first crane 34 simultaneously installs the wind turbine mast 81 onto the foundation 80 by lifting the wind turbine mast 81 from the installation vessel or from a barge and lowering the wind turbine mast onto the foundation 80. The mast may be connected to the foundation via slip-joints. These are conical connectors inside a transition tube of the foundation. Typically slip joints are used with monopoles as foundation. The transition tube may be installed as part of the installation method in a similar way as the masts 81. The tube has an open upper end. The lower end of the mast comprises mating conical connectors on its outer circumference. The lower end of the mast 81 is simply lowered into the open upper end of the tube of the foundation. The connectors mate and provide a secure connection.

Figure 10:
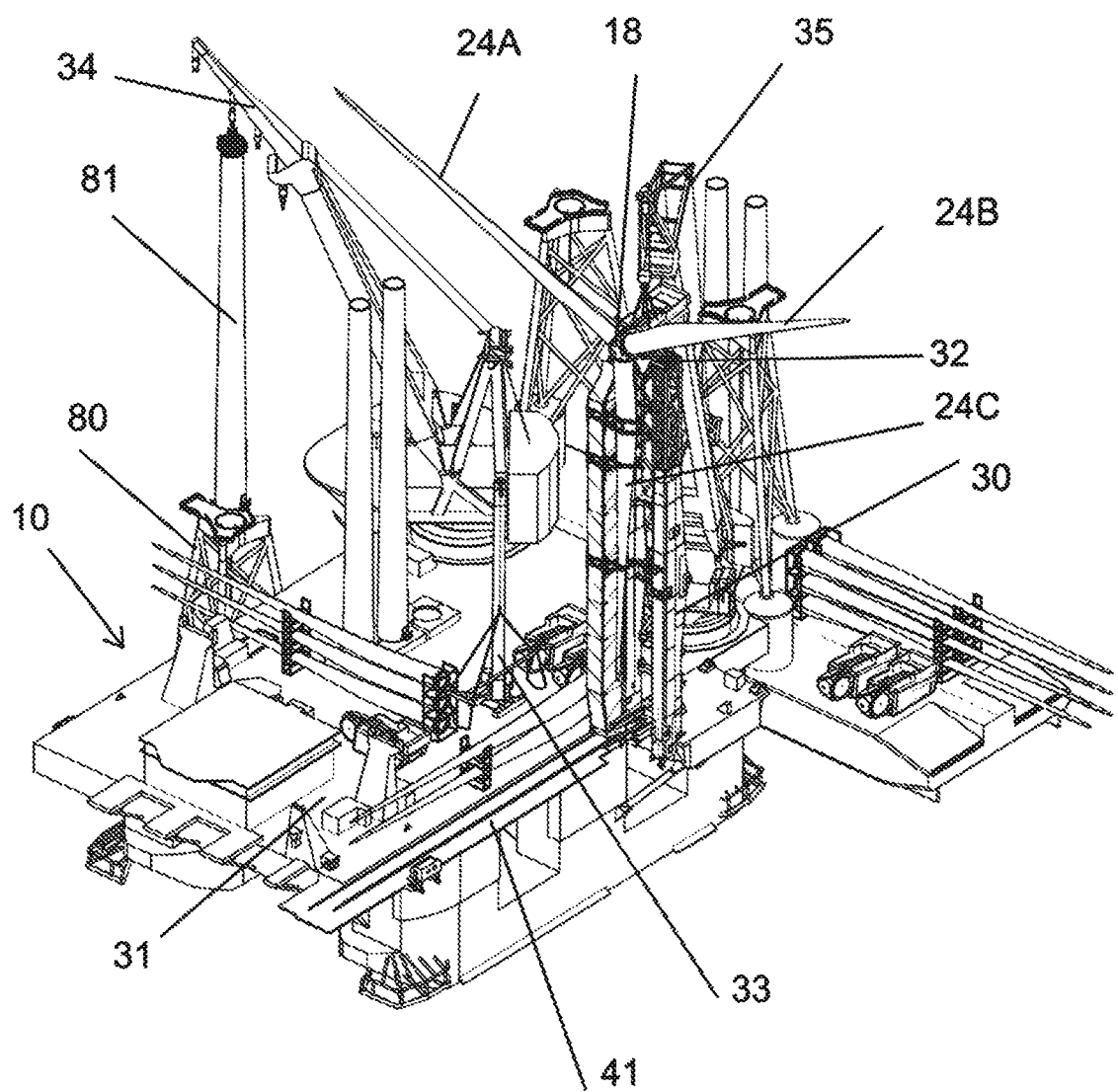

Turning to FIG. 10, the third blade 24C is connected to the hub.

The step of moving the blade to the hub and connecting the blade to the hub are repeated for subsequent blades and root end connectors until all blades 24A, 24B, 24C are connected to the hub 18 of the nacelle, thereby providing a nacelle assembly 36 (including the blades).

Figure 11:
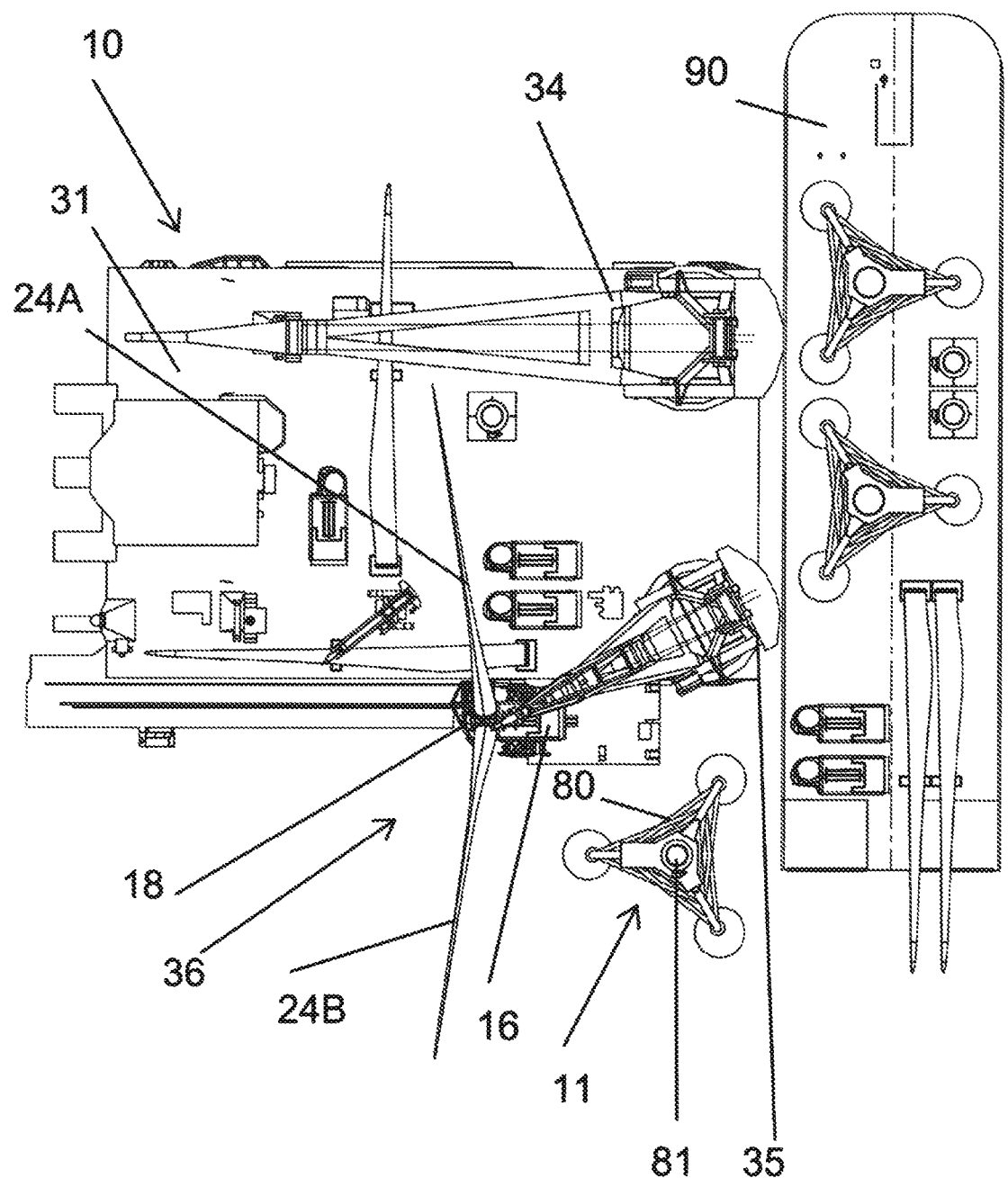

Turning to FIG. 11, the installation vessel is repositioned to turn the side of the installation vessel on which the nacelle is located towards the target location.

Figure 12:
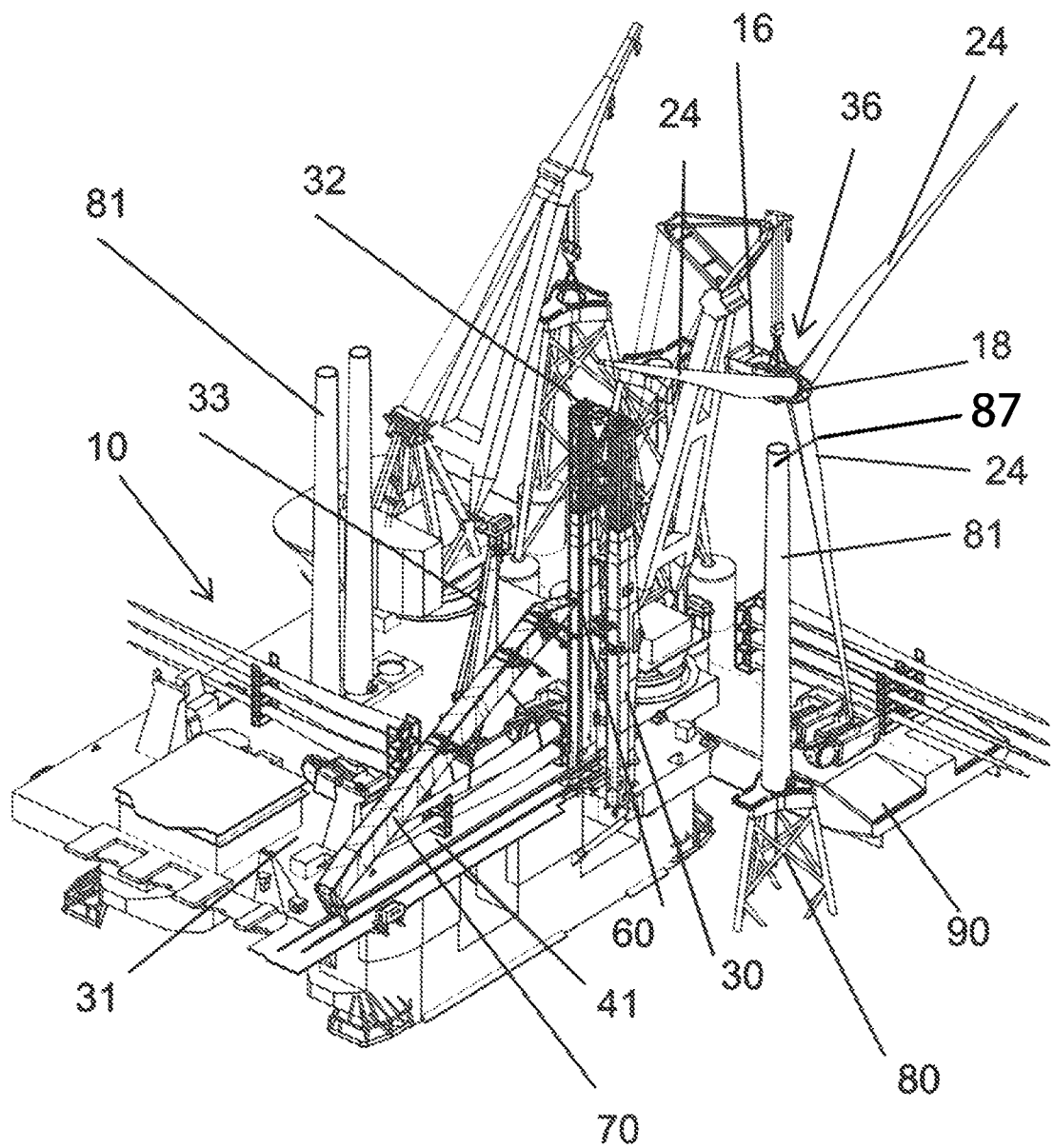

Turning to FIG. 12, the nacelle assembly 36 is lifted from the nacelle support structure with the crane 35, subsequently moved from the support tower to the wind turbine mast 81 and positioned onto the wind turbine mast 81 which is located adjacent the vessel. The nacelle assembly is secured to the wind turbine mast, typically with bolts.

Unlike the system according to US2010/0293781, the support tower 30 does not need to move outwardly away from the vessel and cantilever above the sea water because the crane 35 performs the transfer operation of the nacelle assembly 36. Hence, a base of the support tower can remain at a fixed position relative to the deck during the installation of the wind turbine. The support tower including the base of the support tower will be at a horizontal distance from the crane. It is noted that the words "in a fixed position" do not exclude a support tower which is hinged to the deck (or the hull) via a hinge and which may have an adjustable orientation by means of one or more actuators, for instance to keep the support tower vertical in swell.

The nacelle assembly 36 may be positioned directly on the upper end 87 of the wind turbine mast 81. This further simplifies the procedure. There is no need for any further transfer operation or transport operation.

Figure 13:
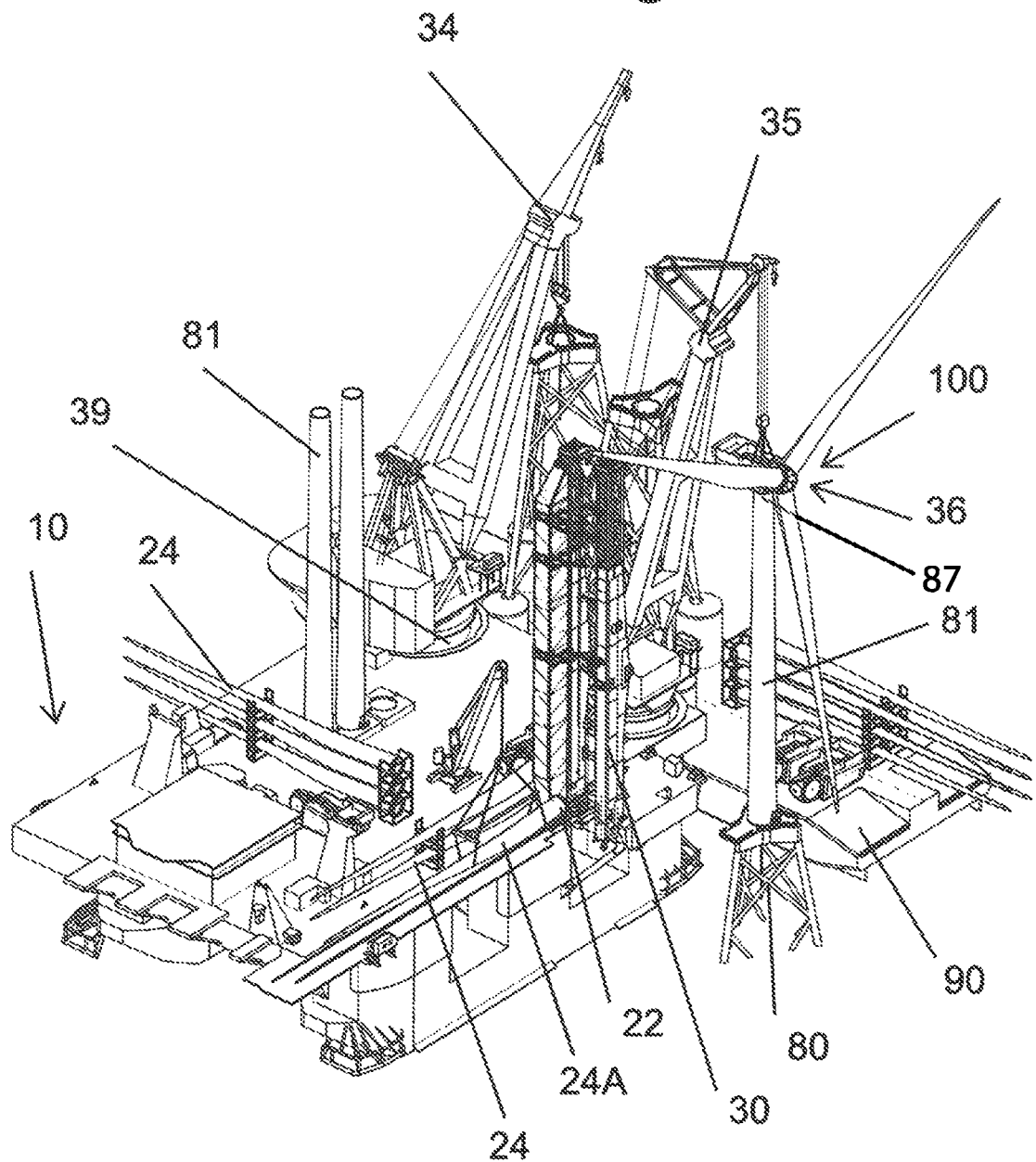

Turning to FIG. 13, the installation is completed and the installation vessel is ready to commence a second installation.

Figure 14:
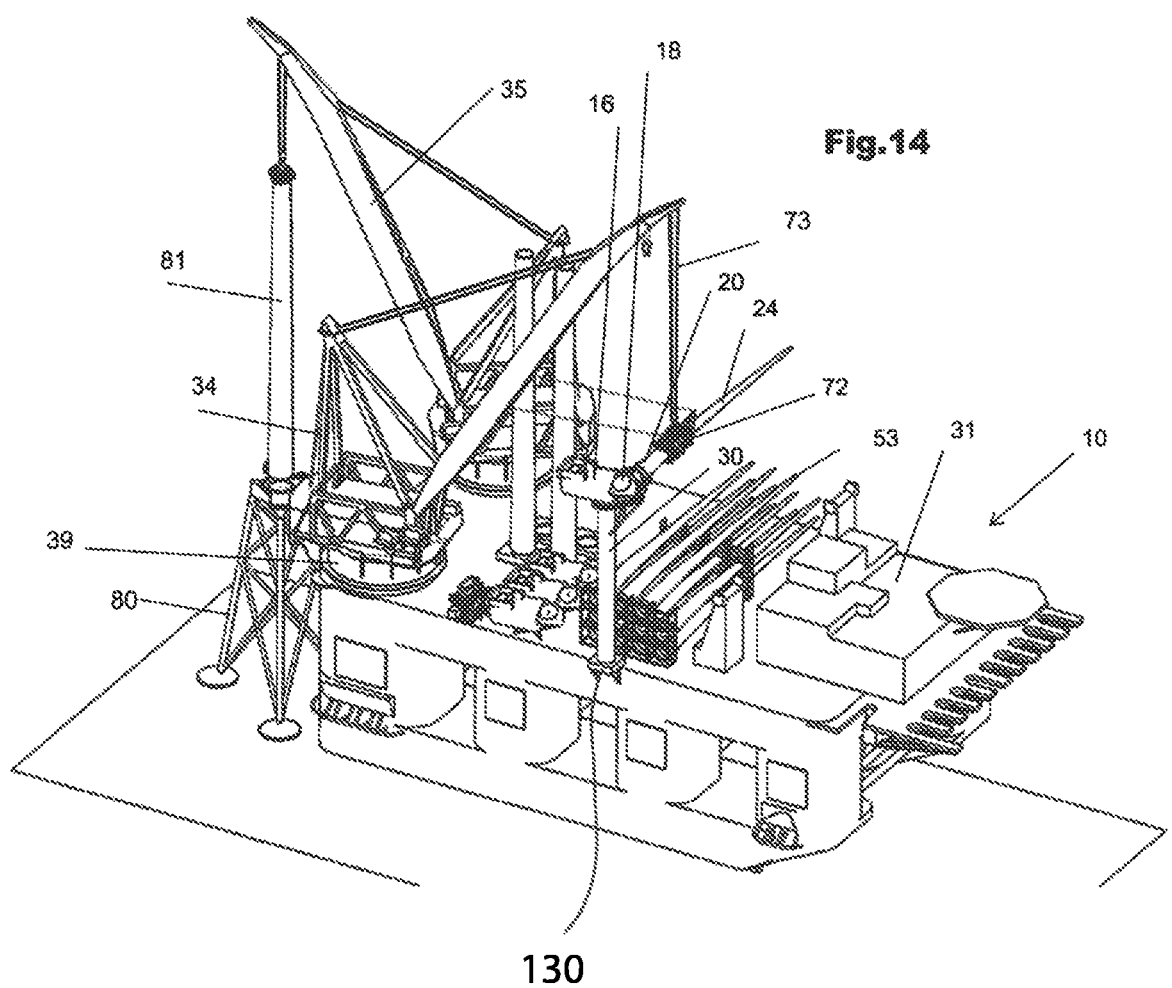
FIGS. 14-20 show a second embodiment of the installation method according to the invention.
Figure 15:
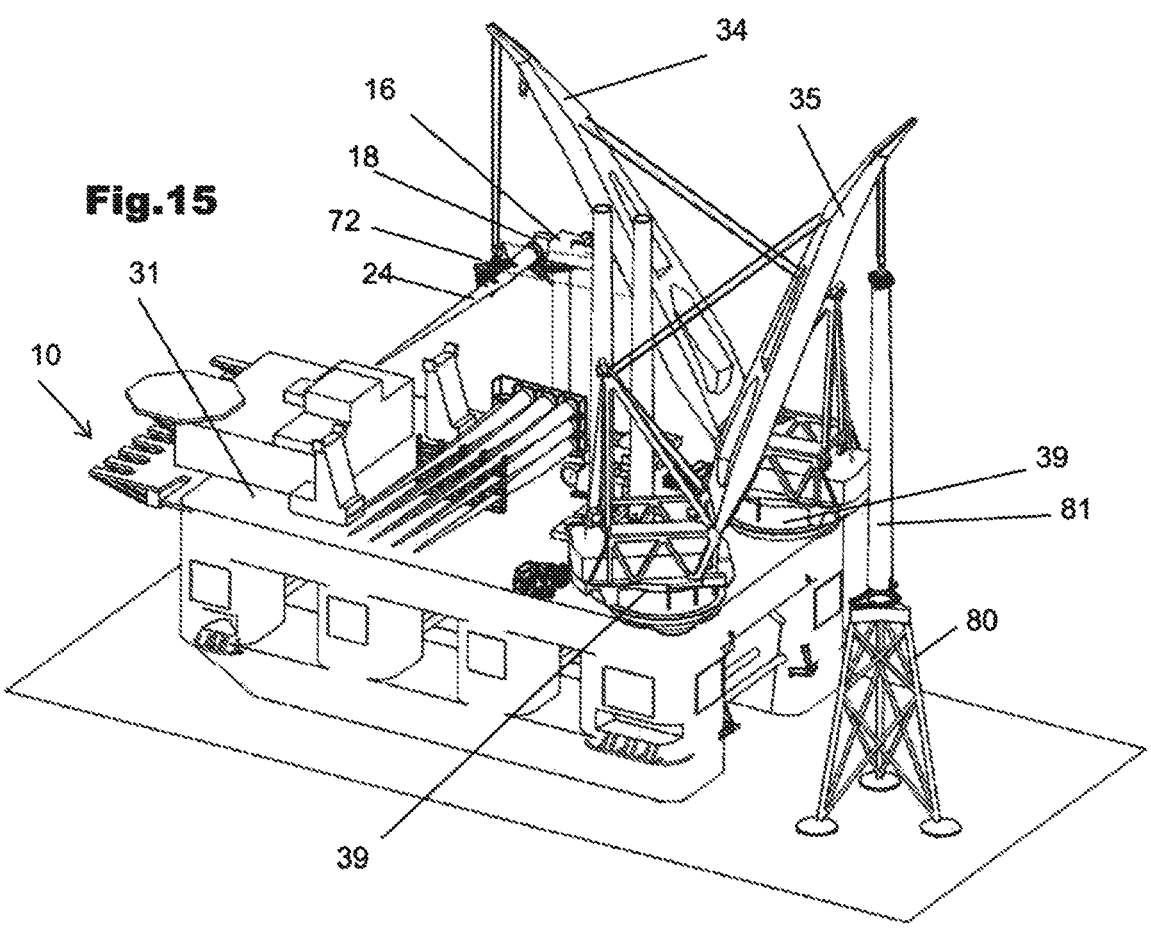

Turning to FIGS. 14-20, a second embodiment is shown. As is shown in FIGS. 14 and 15, in this embodiment, the support tower 30 is positioned on the starboard side.

Instead of a loader arm 70, one of the cranes 34, 35 is used to lift the blades 24 from the deck 31 or from a rack 53 positioned on deck. A lifting frame 72 is connected to the hoist lines 73 at the centre of gravity of the blade. The blades are lifted and installed with one crane, in particular the crane on the side of the support tower 30 which in this case is the starboard crane. The blades may be raised in a horizontal orientation.

Simultaneously, the other crane 35 may install the foundation and the mast or mast segments.

Turning specifically to FIGS. 16-19, in this embodiment the loading rail 46 extends over a horizontal distance and is shorter than in the embodiment of FIGS. 1-13. There are in fact two loading rails 46 which are spaced apart over a horizontal distance. The loading rail 46 are in particular horizontal. The loading rails 46 are connected to the support platform 32 or to the support tower 30. The loading rails 46 extend over a horizontal distance away from the support platform. The loading rails cantilever from the support tower 30 and are supported by support beams 47.

This embodiment may not have a loader arm.

The trolley 60 is driven with a drive 45 in the X-direction. The drive may be hydraulic or electric. The trolley 60 comprises a blade support 44 which comprises a curved, concave member 82. The member 82 may be configured to support the underside of the root end. The trolley is supported by the two loader rails 46 and spans the distance between the two rails 46. In this embodiment the blade support 44 is connected directly to the trolley 60.

Figure 16:
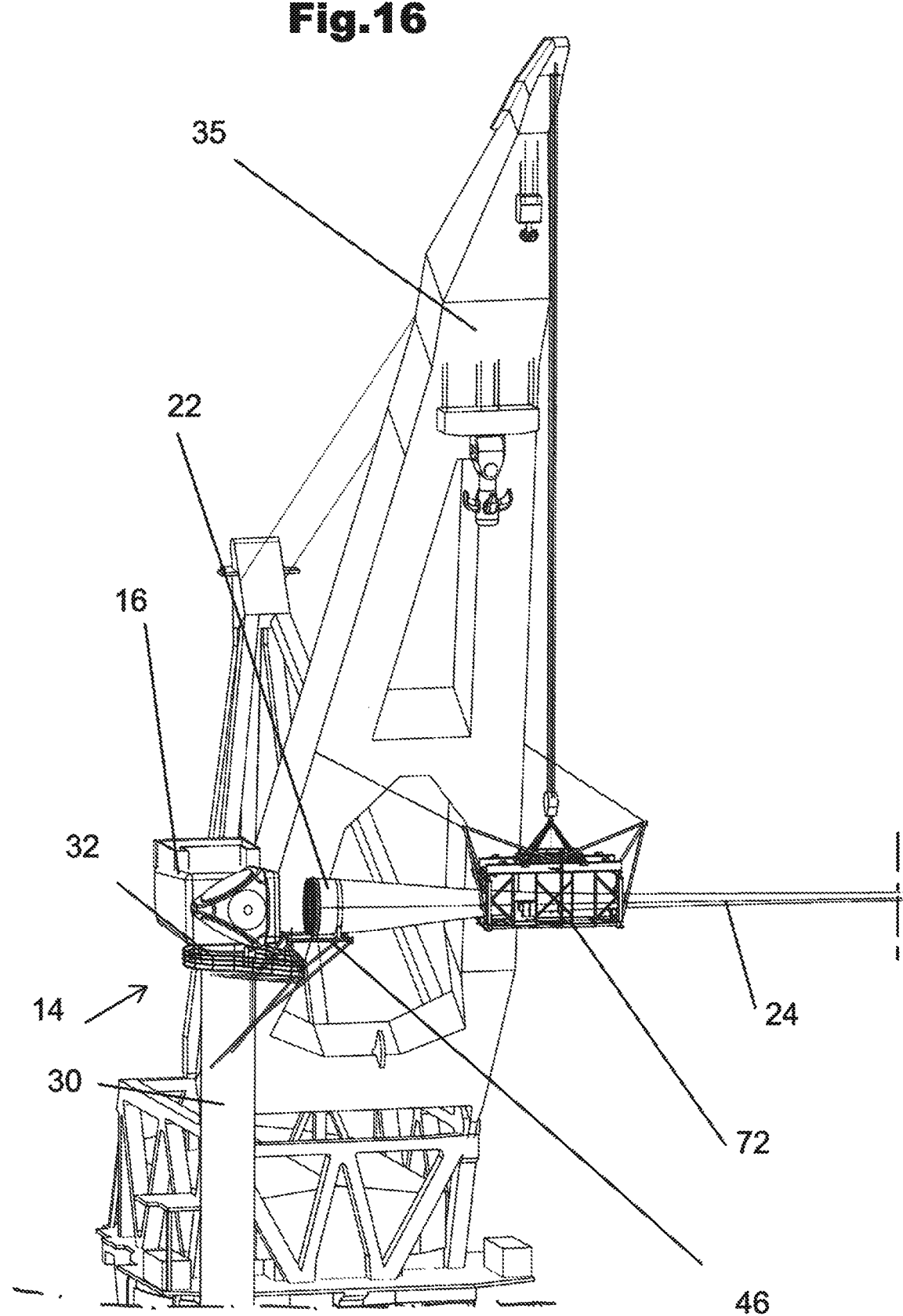

Turning in particular to FIG. 16, the crane, in particular the starboard crane 34 can be used to lift blades 24 from the deck and to position the root end 20 of each blade on the trolley 60. The trolley 60 comprises a blade support 44 which comprises a curved, concave member 82. In this embodiment the blade support is connected directly to the trolley 60.

First the crane 34 positions the root end 20 of the blade 24 on the blade support 44 of the trolley. The crane continues to hold the blade after the root end has engaged the blade support 44. The trolley 60 then rolls or slides along the loading rail 46 in an X-direction toward said support platform 32 over said horizontal distance from the remote position to the installation position. An actuator 68 is provided to move the blade support in the Y-direction. A further actuator 69 is provided to move the blade support 44 in the vertical direction (Z-direction). The actuators 68, 69 may be provided on both sides of the blade support. This allows for precise positioning to insert the threaded ends 75 of the root end 22 into the corresponding holes of the root end connector 20.

In this way, the root end is inserted into the root end connector of the hub. The blade 24 is supported by both the trolley and the crane during the movement of the trolley toward the nacelle.

The loading rail 46 can have a limited length of for instance 2-5 meter, because the greater part of the movement of the blade toward the hub is carried out by the crane 35.

This embodiment is simpler than the embodiment of FIGS. 1-13, but has a disadvantage in that the blade may still sway back and forth when suspended from the crane 35.

Figure 20:
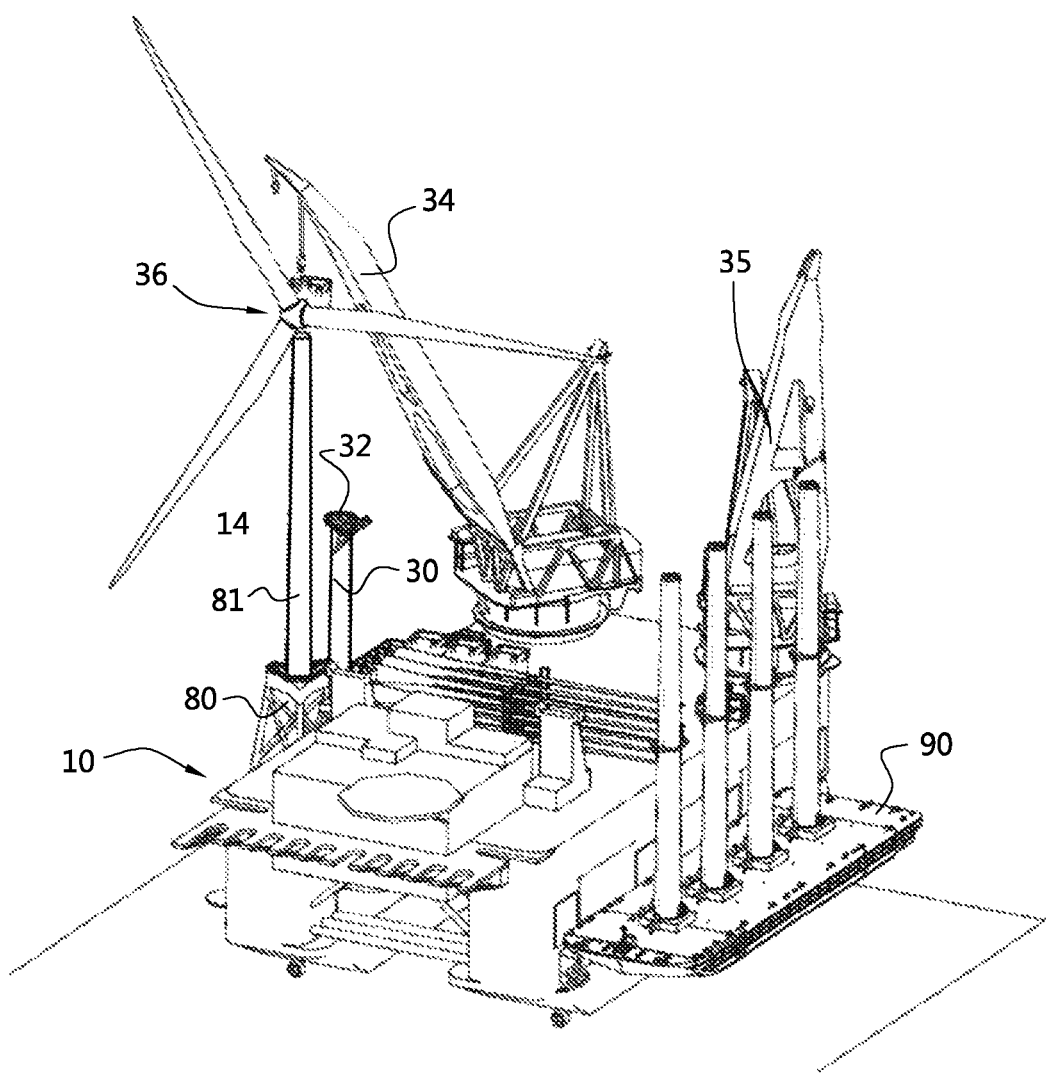

Turning to FIG. 20, when the RNA 36 is finished it is lifted from the support platform and positioned onto the mast 81. This may be done after repositioning the vessel 10. Simultaneously, the other crane 35 may load new parts for a consecutive wind turbine onto the vessel from a barge 90.

Figure 21:
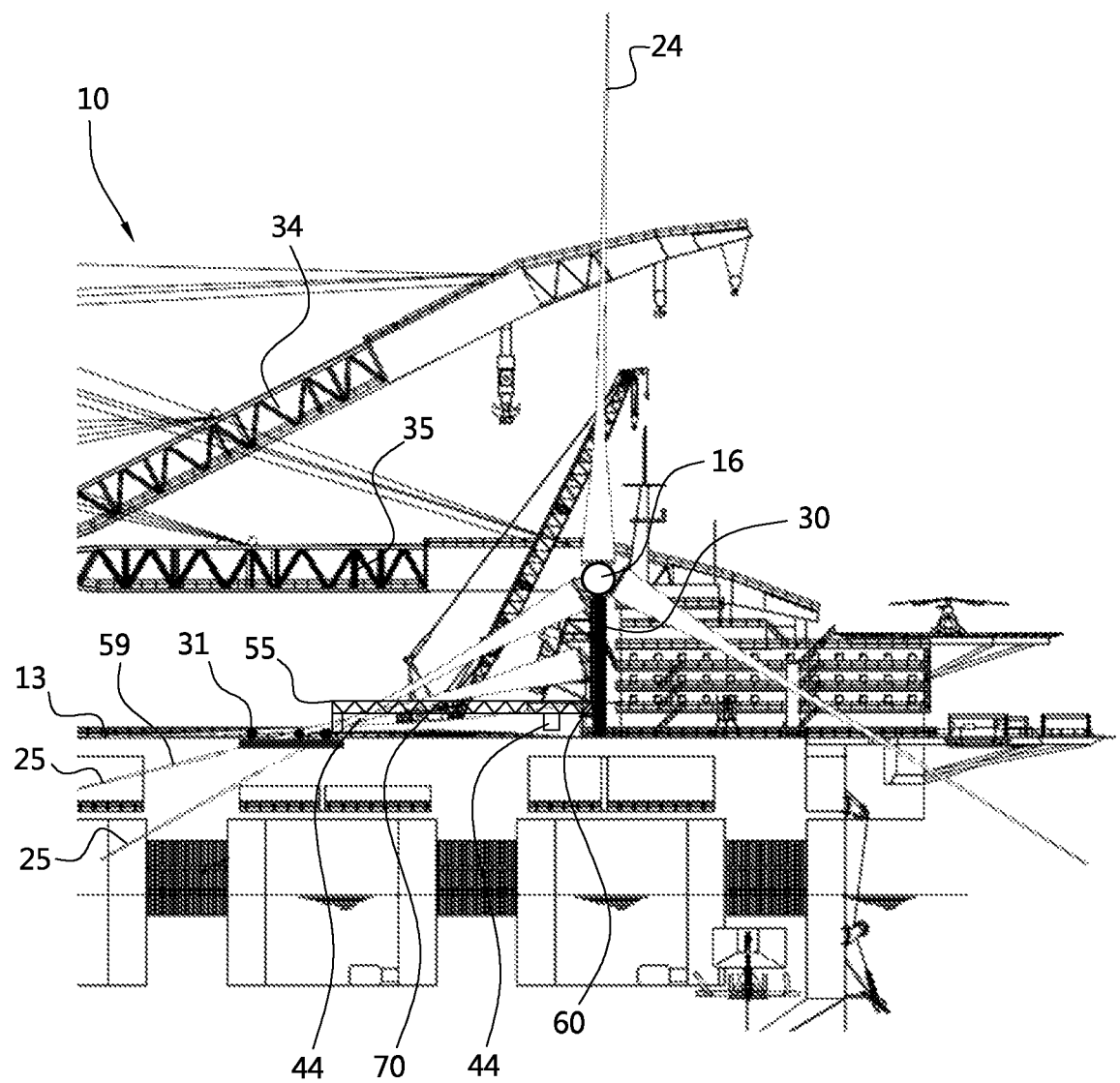
FIG. 21 provides a third embodiment of the installation method according to the invention.
Figure 22:
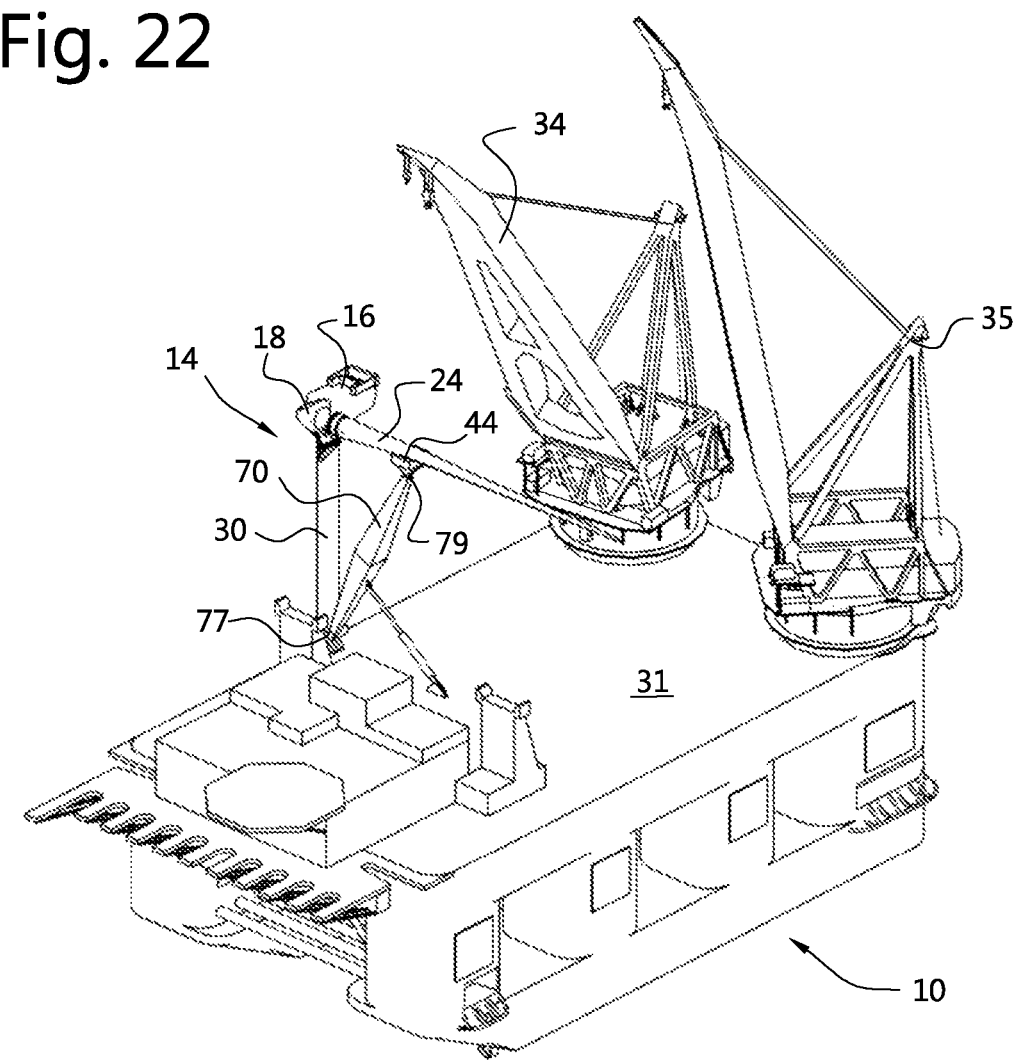
FIGS. 22-25 show a further embodiment of the invention.
Figure 23:
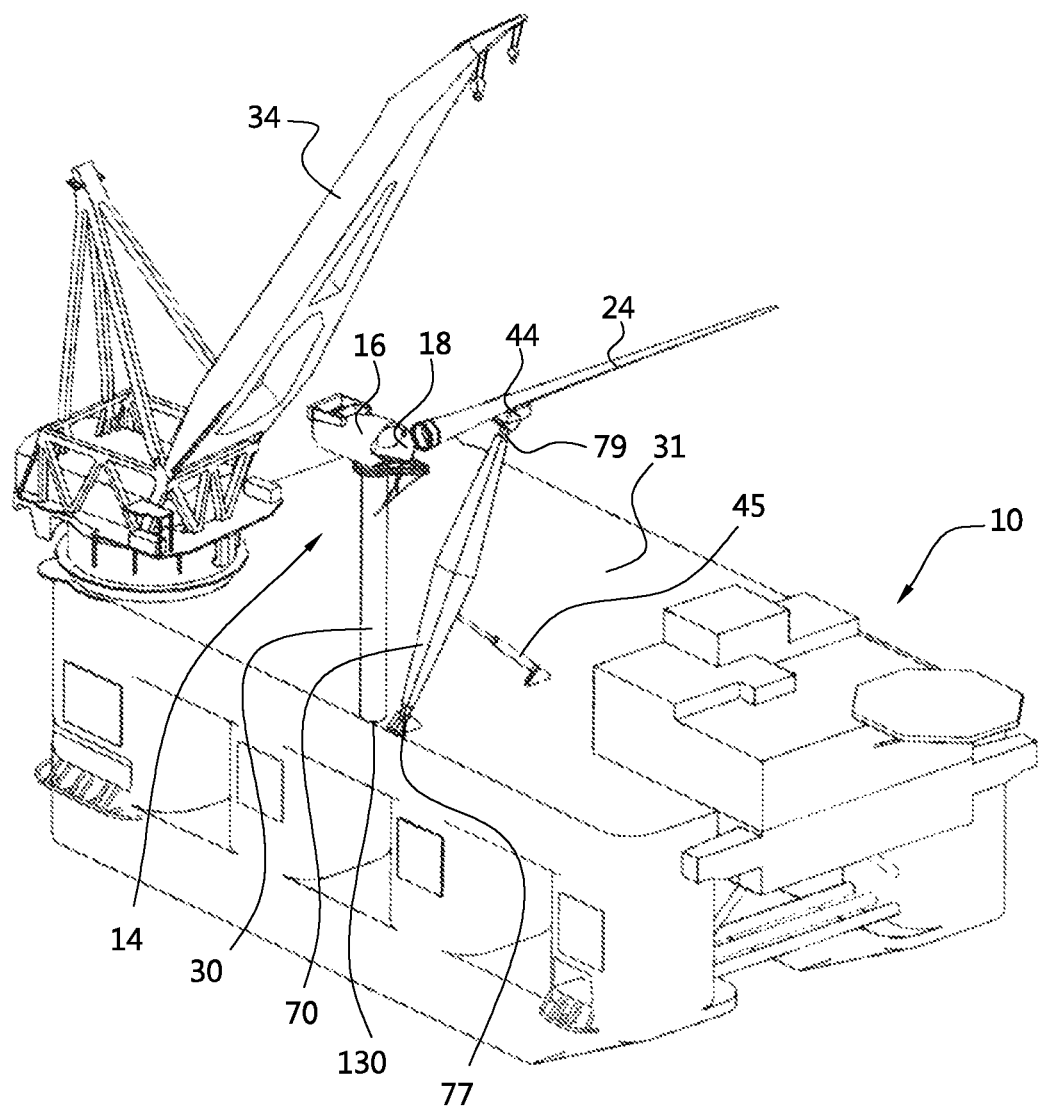
Figure 24:
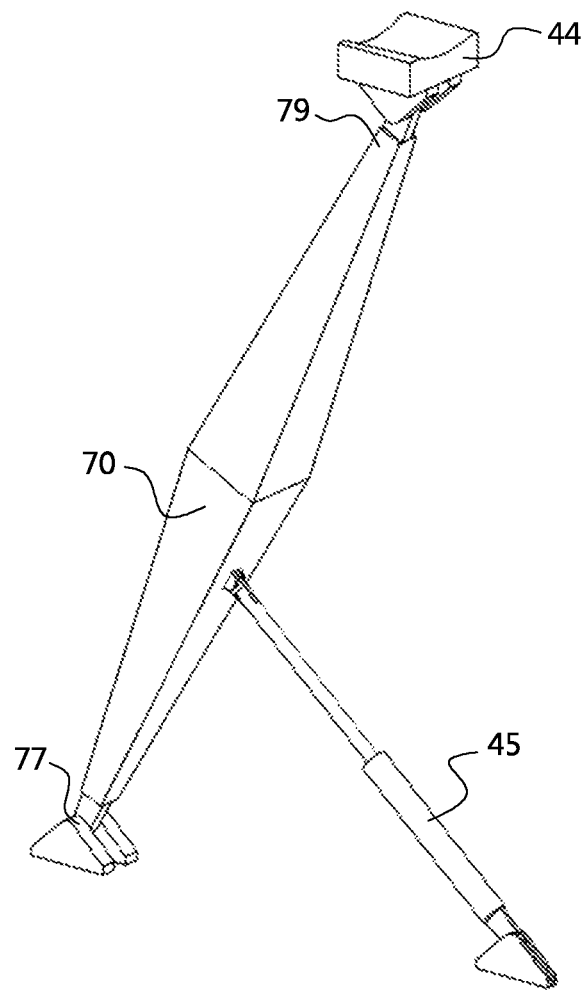
Figure 25:
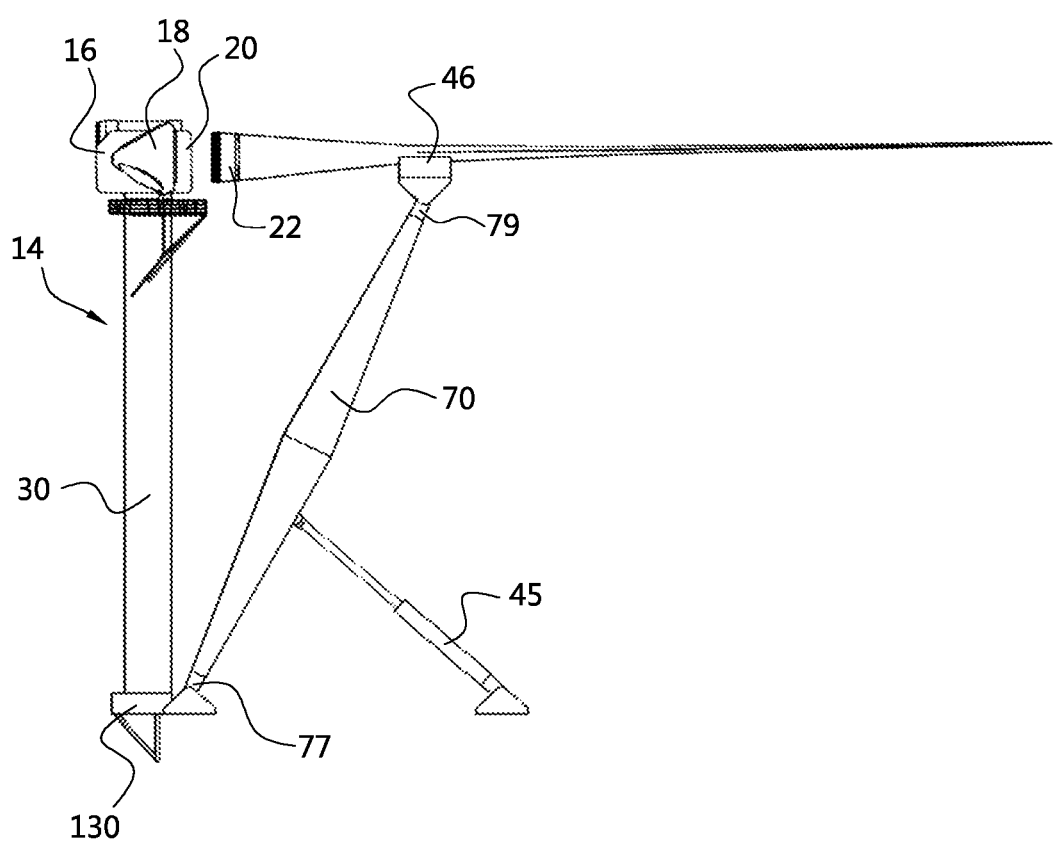

Turning to FIG. 21 another embodiment is shown in which the blades 24 are pivoted upward when the root end is moved toward the root end connector on the hub, but the blades are not pivoted to a vertical orientation. Instead, the blades 24 are pivoted to an angle of about 30 degrees (25-35 degrees) with the horizontal, 60 degrees with the vertical (55-65 degrees).

The same loading rail, trolley 60 and loader arm as disclosed for the embodiment of FIGS. 1-13 can be used, with a difference that the support tower 30 is shorter, shorter than a length of the blade.

This embodiment has an advantage in that the root end does not need to be raised as high as in the embodiment of FIGS. 1-13. This saves time. Furthermore, the mounting of the root end to the root end connector does not need a vertical insertion movement, but an insertion movement at an angle of for instance 30 degrees to the horizontal. If the wind turbine has three blades, then 30 degrees to the horizontal would allow a previously connected blade to extend vertically.

During the upward movement of the blade, the free end 25 the blade 24 can be moved to below the level of the deck 13. The deck is generally quite high above the water (10-20 m), so there is sufficient height available.

Turning to FIG. 20, the installation of the foundation and the turbine mast which is carried out simultaneously with the assembling of the blades to the nacelle can be the same as for the embodiment of FIGS. 1-13. The completed RNA 36 is transferred from the support platform 32 to the installed mast 81 by one of the cranes 34, 35.

Turning to FIG. 21, in this embodiment the support tower 30 is substantially lower than the length of the blades 24, for instance 20-40 percent of the length of the blades.

This embodiment may have a loader arm 70 which has a length which is considerably shorter than the length of the blades 24. The blades are supported by the loader arm with the root end 22 directed at the support tower. A free end 59 of the blade 24 cantilevers beyond the opposite end of the loader arm 70. When the trolley 60 moves upward along the support tower, the opposite end of the loader arm moves toward the support tower. The blade is pivoted and the tip 25 of the blade moves downward to below the deck of the vessel. The blade may be installed onto the hub at an angle of 40-80 degrees to the vertical.

Turning to FIGS. 22-25, in a further embodiment, the loader arm 70 is pivotably connected to the deck or to the support tower via at least one hinge 77, in particular located at a base 78 of the tower. The opposite end 79 of the loader arm follows the path of a part of a circle. The blade support 44 is connected to the opposite end 79 via a hinge and supports the blade. A drive system 45 in the form of a cylinder pivots the loader arm 70 from a pickup orientation (which may substantial horizontal) to an installation orientation, which may be anywhere between 30 and 80 degrees, preferably about 40-70 degrees, to the horizontal. The vessel may have one (FIG. 23) or two cranes (FIG. 22), or more.

The blade support 44 is pivotable relative to the loader arm 70 in order to maintain the blade 24 in a required orientation during the pivoting of the loader arm. For instance the blade may be kept horizontal during the upward movement, but another orientation is also possible.

This embodiment also comprises the loading rail 46 and trolley 60 of the embodiment of FIGS. 14-20. When the loader arm 70 swings upward, the root end 20 of the blade 24 is positioned on the blade support 44 on the trolley 60 which slides ro rolls over the loading rails. The actuators 68, 69 allow precis positioning in the Y and Z direction when the trolley 60 moves toward the root end connector 20.

Figure 26:
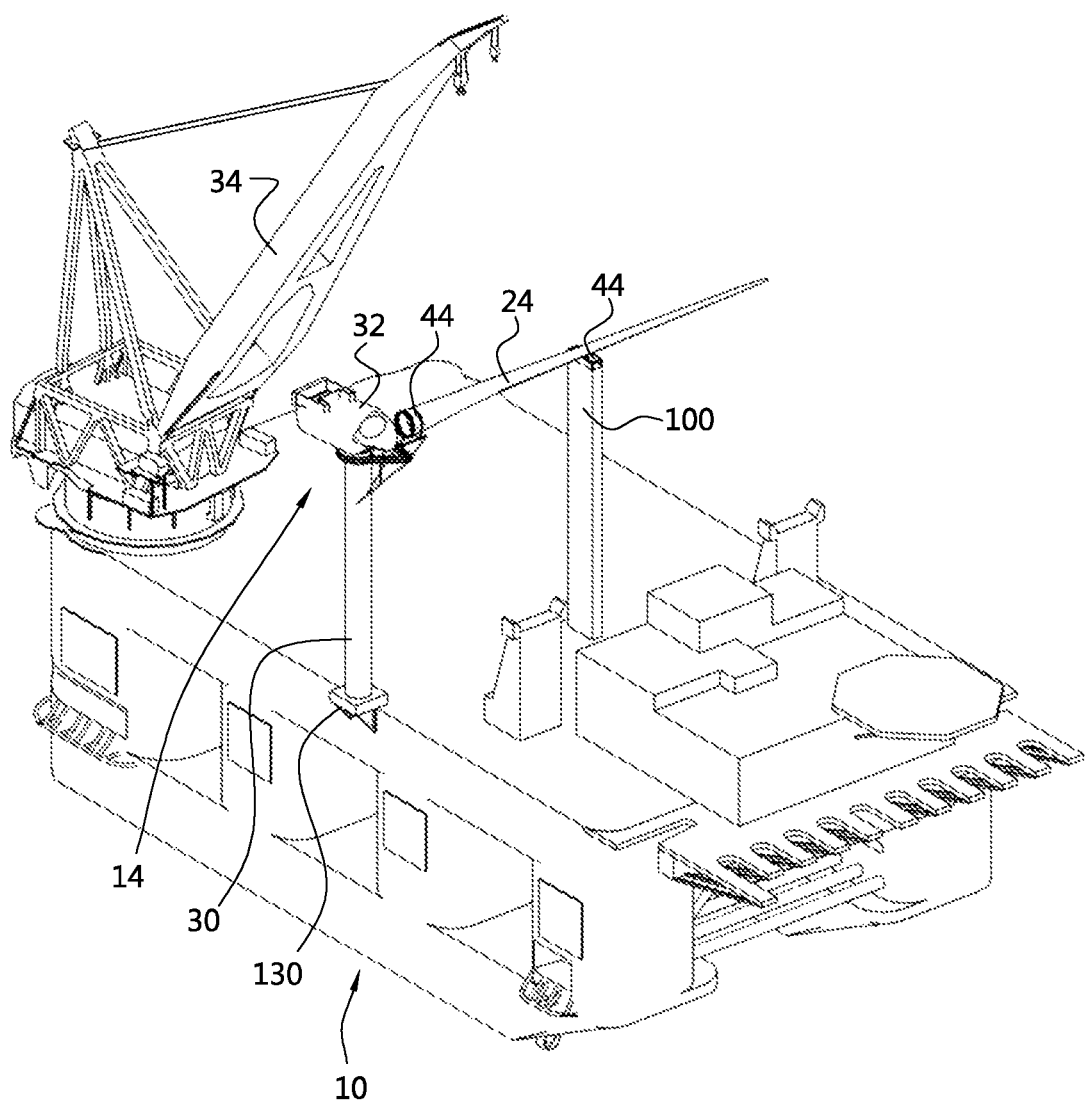
FIG. 26 shows a further embodiment of the invention.

Turning to FIG. 26, in another embodiment. which is a variant of the embodiment of FIGS. 14-20, a second support tower 100 is provided at a distance from the first support tower 30. The crane may position the blade on the first blade support on the trolley 60 on the rail 46 which extends from the support platform 32 on the first support tower 30 and on a second blade support 44 on the second support tower 100.

Figure 30:
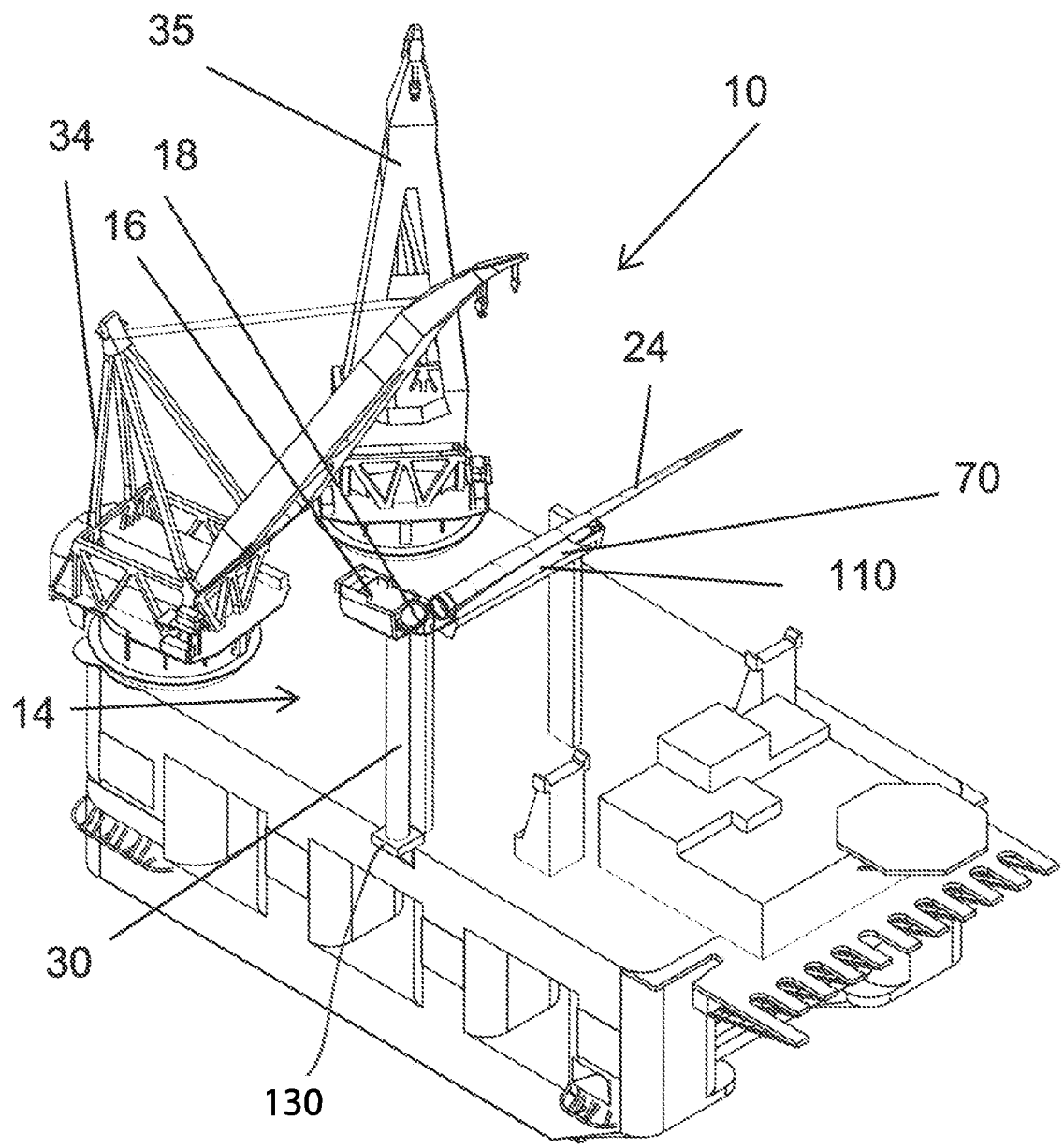
FIGS. 30 and 31 show another embodiment according to the invention.
Figure 31:
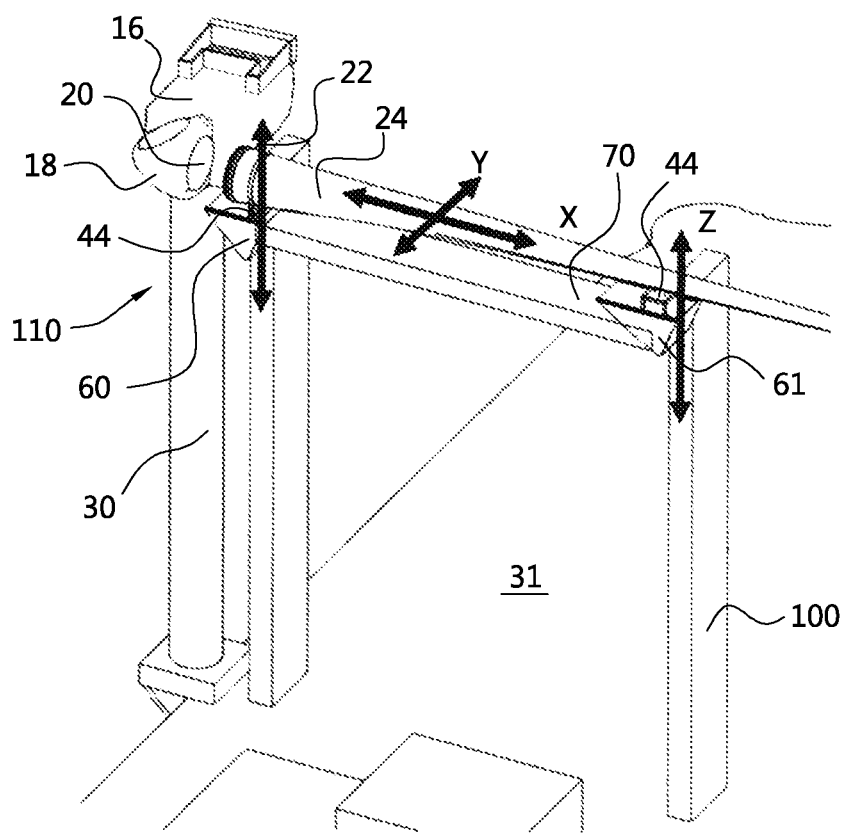

Turning to FIGS. 30 and 31, alternatively, a blade lift 110 may be provided for raising the blade 24 to the level of the support platform 32 in a horizontal orientation. The blade lift may comprise a loader arm 70 having one or more blade supports 44, wherein the loader arm is supported by:
 a first trolley 60 travelling up and down along the first support tower 30, and
 a second trolley 61 travelling up and down along the second support tower 100.

Figure 27:
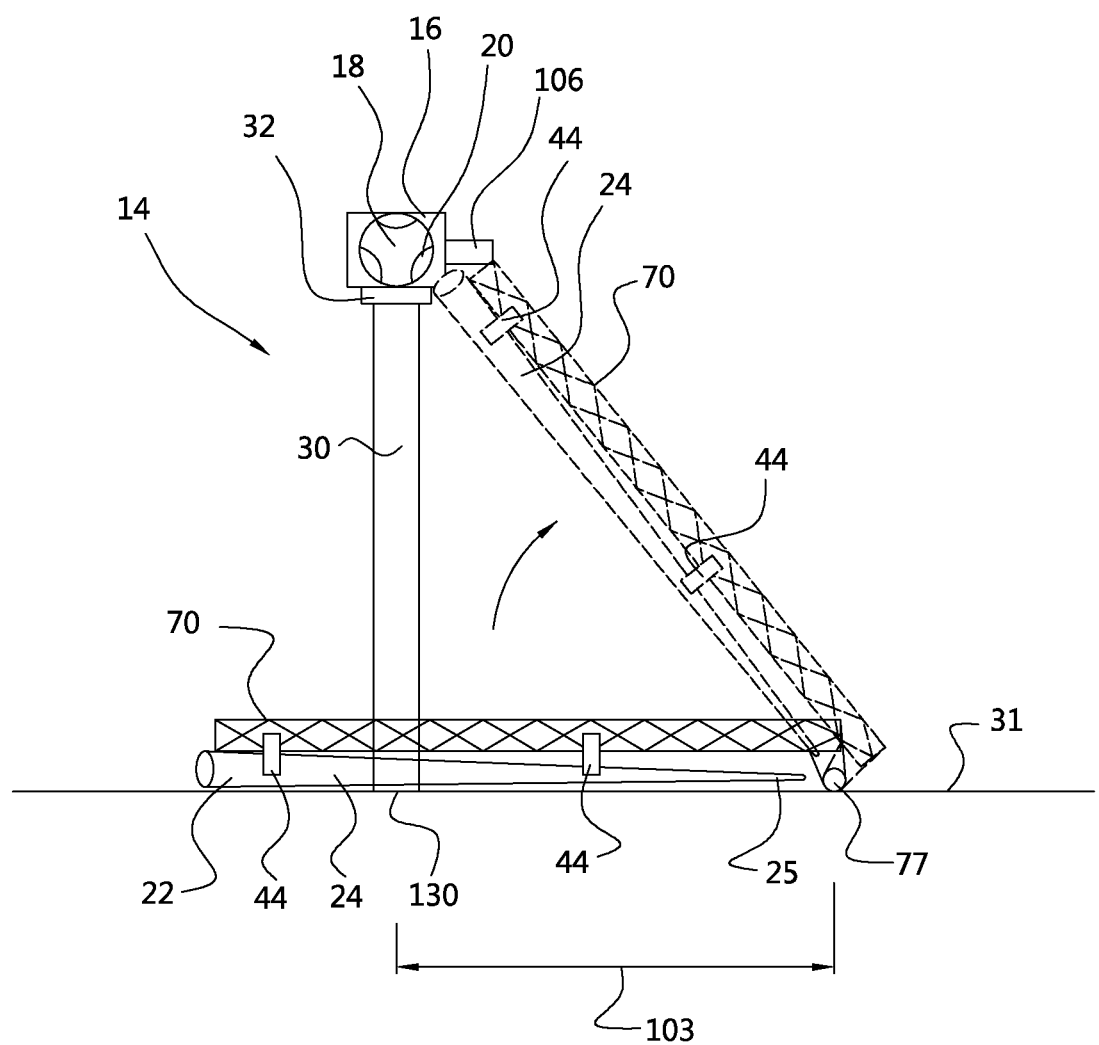
FIG. 27 shows a side view of another embodiment according to the invention.

Turning to FIG. 27, another embodiment is shown in which the blade 24 is not aligned with the tower, but installed at an angle. In this embodiment, the loader arm 70 is connected to the deck or hull of the vessel via a hinge 77. The hinge 77 is located at a distance 103 from the tower, wherein the distance may be smaller than the length of the loader arm 70 and smaller than the length of the blade 24. The loader arm is pivotable from a pickup orientation, which may be horizontal, and an installation orientation, which may be 30-80 degrees to the vertical. In case the wind turbine has three blades, the installation orientation may be 60 degrees to the vertical.

The loader arm picks up the blade with the blade supports 44. The loader arm then pivots upward (see the dashed lines) until the loader arm meets a stop 106 which may be near the support platform. Next, the root end 22 of the blade 24 may be inserted into the root end connector by precise positioning with actuators 68, 69.

Figure 28:
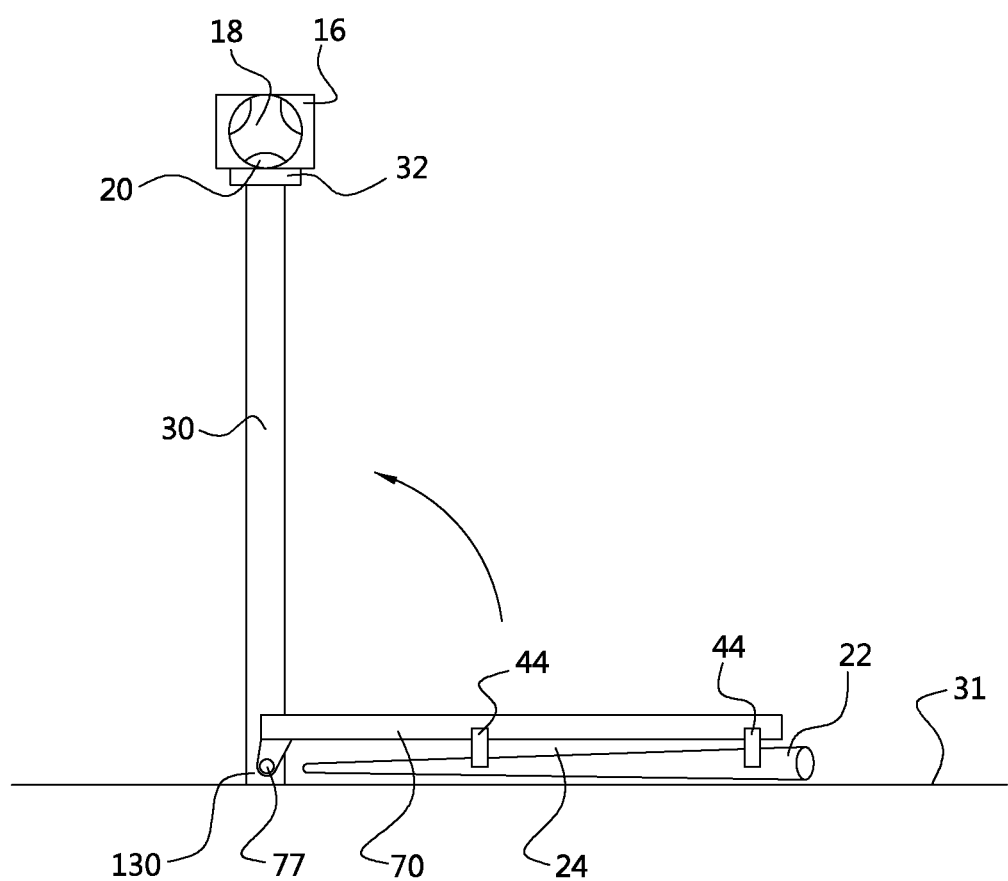
FIGS. 28 and 29 show another embodiment according to the invention.
Figure 29:
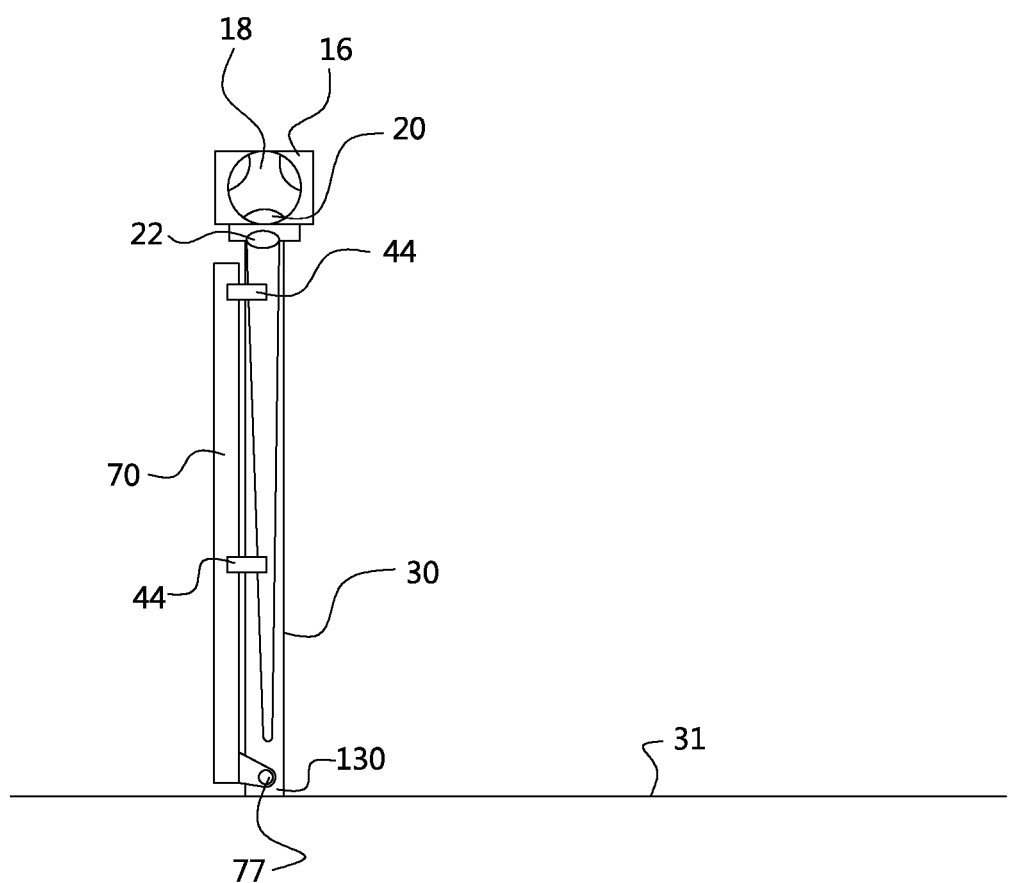

Turning to FIGS. 28 and 29, another embodiment is shown. The hinge 77 is located at the base of the support tower. The loader arm 70 pivots about the hinge from the pickup orientation which may be horizontal to the installation orientation which is aligned with the support tower. The blade 24 is held by the loader arm 70 with the root end 22 of the blade directed away from the hinge 77 and the free end 25 of the blade directed toward the hinge.

The method comprises pivoting the loader arm upward, thereby moving the root end of the blade toward the nacelle 16.

In this embodiment, the blade 24 is pivoted to an installation orientation which is at an angle of 0-70 degrees, in particular 50-70 degrees to the vertical.

Figure 32:
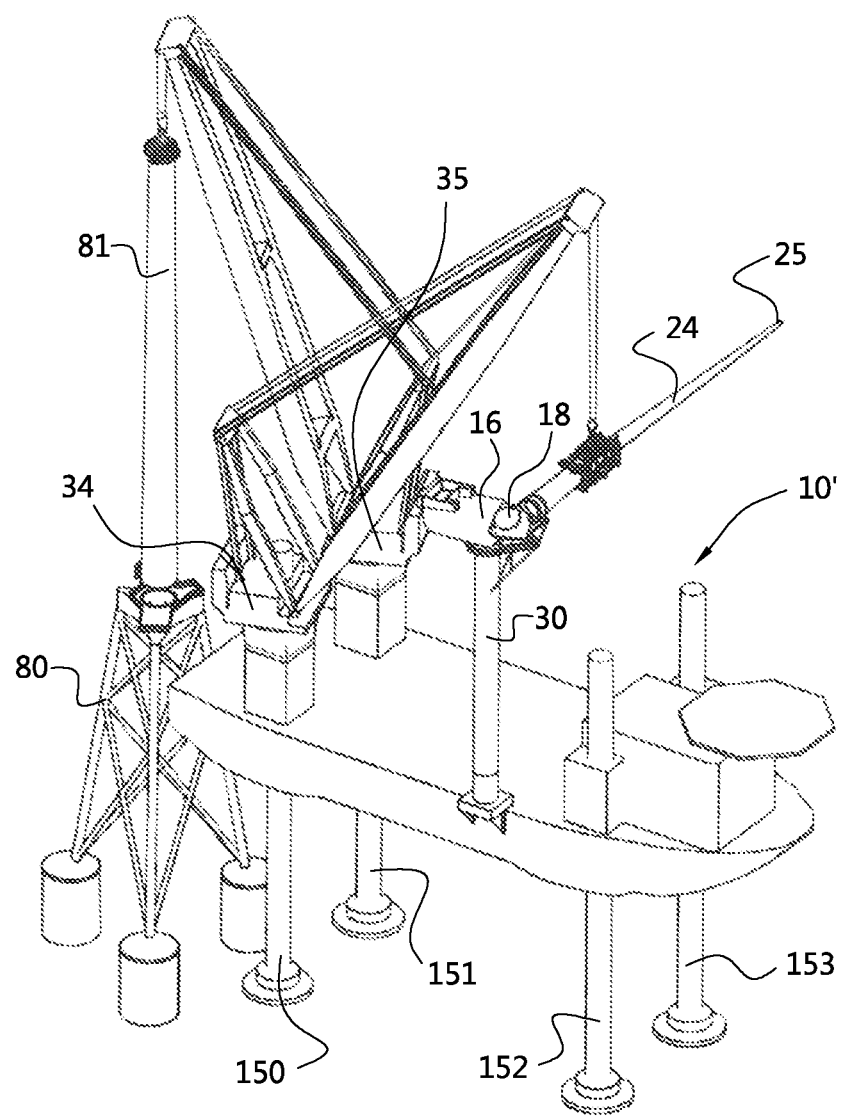
FIG. 32 shows another embodiment according to the invention.
Figure 33:
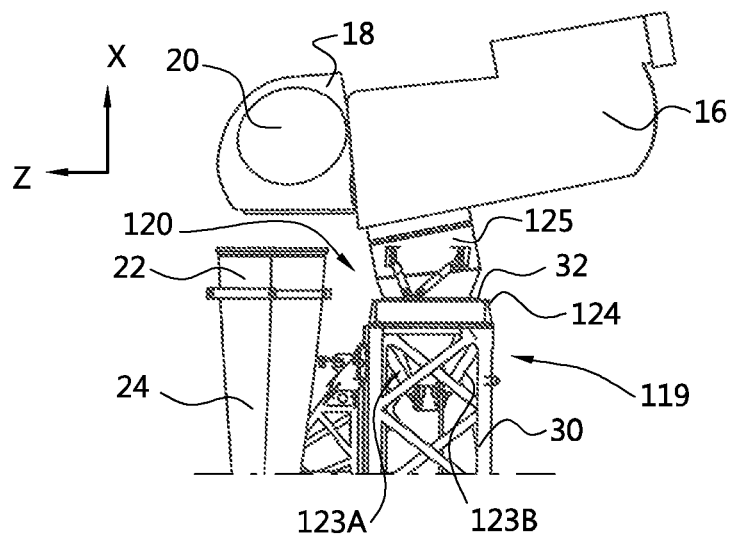
FIGS. 33-37 show another embodiment according to the invention.
Figure 34:
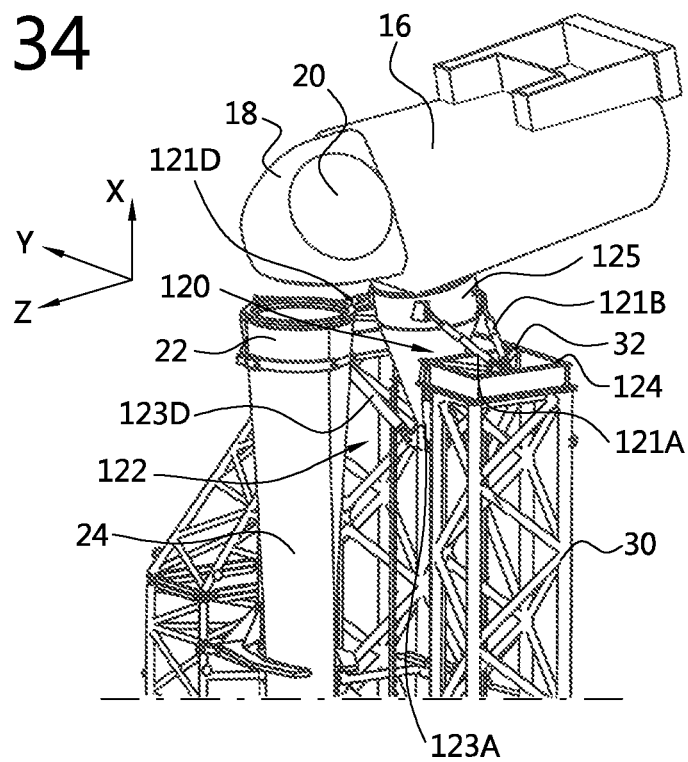
Figure 35:
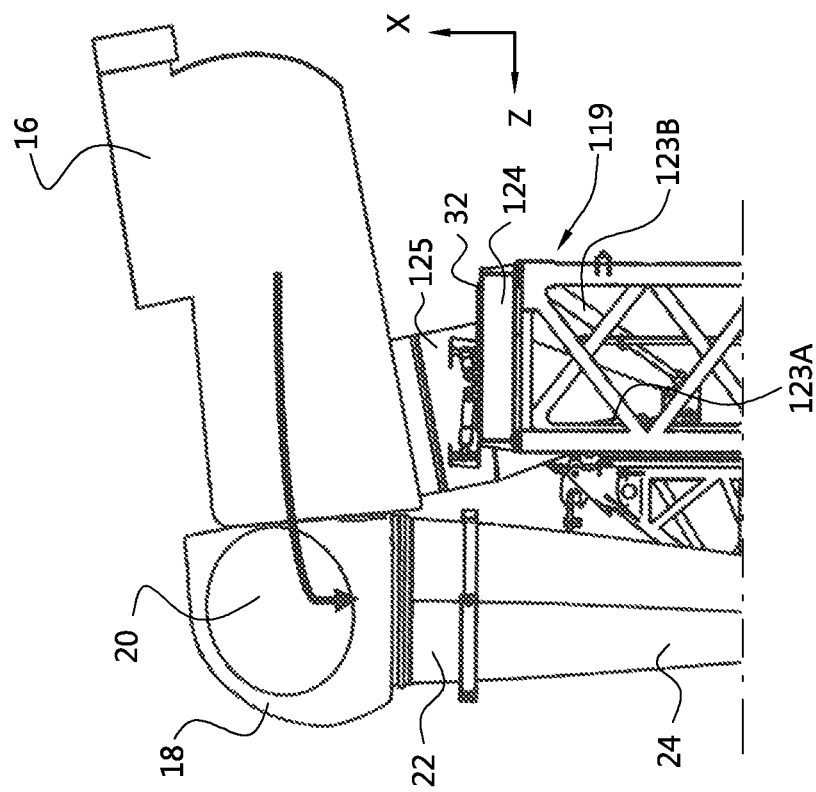
Figure 36:
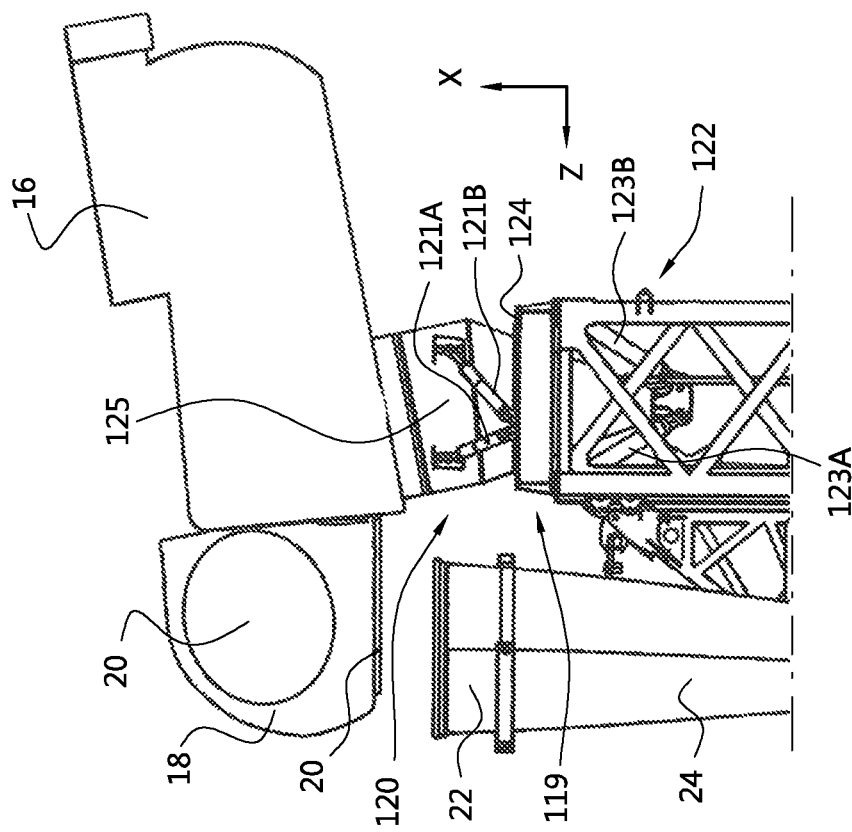
Figure 37:
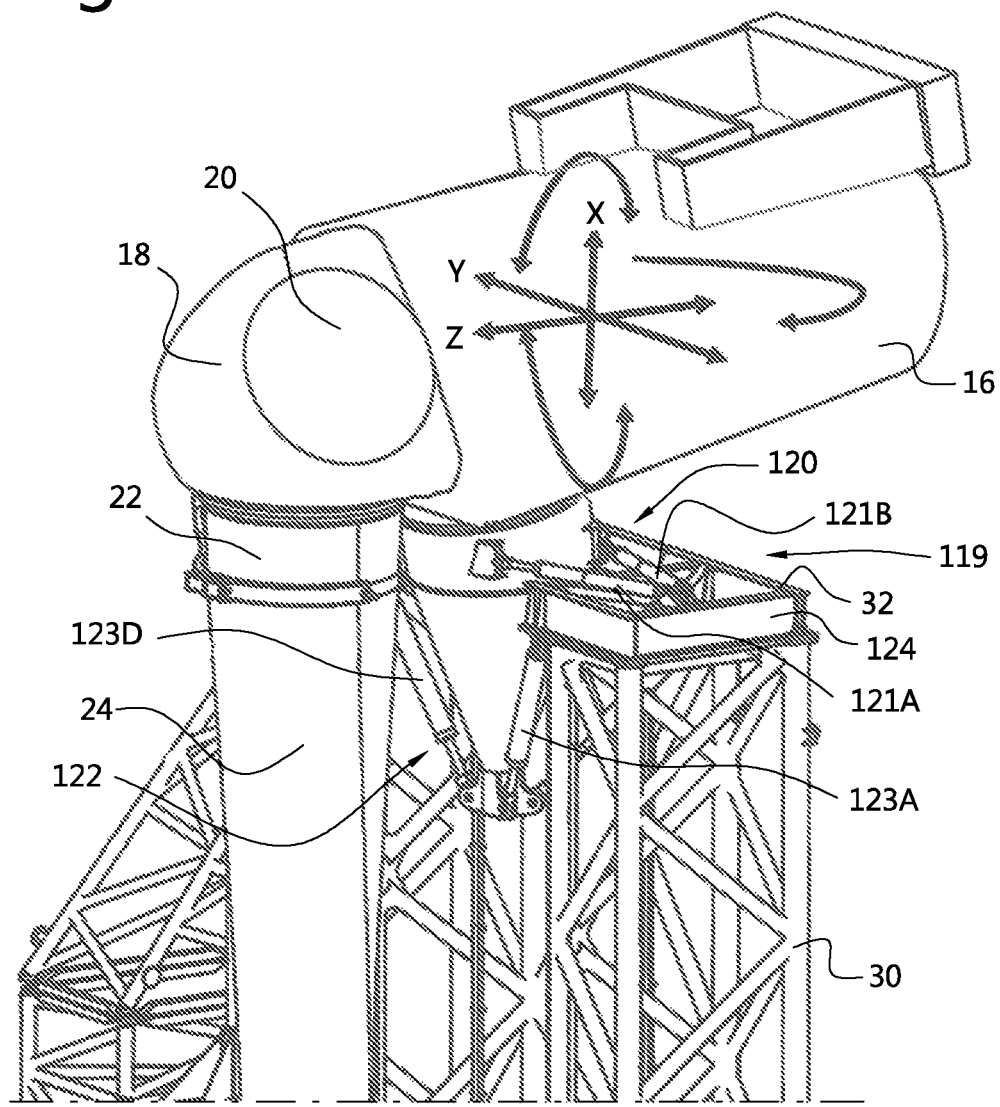

Turning to FIG. 32, in a further aspect, the installation vessel may also be a jack-up rig 10'. Even though a jack-up rig has many disadvantages over a floating installation vessel several of the advantages of the present invention may also be achieved with a jack-up rig. With RNA assembly on a jack-up rig, wind conditions may still cause unpredictable motions of the blades 24 during the installation, and the embodiments for the blade moving system disclosed herein may improve the RNA assembling operations. Furthermore, the simultaneous installation of the foundation 80 and mast 81 with the assembly of the RNA may increase the overall speed and reduce the costs.

The jack-up rig may comprise a single crane or 2 cranes 34, 35 as shown. The cranes 34,35 may be aligned with two of the jack-up legs 150, 151.

According to the method, the foundation 80 and mast 81 may be installed simultaneously with the assembly of the RNA. In this case the assembly of the RNA takes place as disclosed in FIGS. 14-20 but any of the other embodiments for assembling the RNA is also possible on a jack-up rig 10', for instance the upending method of FIGS. 1A-13, the partial upending method of FIG. 21, the pivoting loader arm 70 of FIGS. 22-25 or 27-29, the method of 26 or the blade lift of FIGS. 30-31.

The simultaneous installation of the foundation 80, mast 81 and the assembly of the RNA with the same jack-up rig provides a significant increase in speed and a reduction of costs. This even the case if the jack-up rig only comprises a single crane.

Turning to FIGS. 33-37 in another embodiment, the support platform comprises a nacelle moving system 119 which comprises actuators for moving the nacelle 16 and the hub 18 in at least a Y and Z-direction relative to the blade 24 for aligning the root end connector with the root end of the blade, and in particular aligning the multiple threaded ends with the corresponding holes in the root end connector. In the shown embodiment, the actuators are configured to move the nacelle 16 and hub 18 in the X, Y and Z-direction, and to rotate the nacelle and hub about the X-Y and Z-axis. The axial system is defined relative to the blade 24, wherein the X-direction corresponds with the longitudinal direction of the blade. Naturally, a different axial system may be defined.

The support platform 32 comprises a stationary part 124 and a mount 125 to which the nacelle 16 and hub 18 are mounted. The mount 125 is connected via a first set 120 of actuators and a second set 122 of actuators to the stationary part 124 of the support platform 32. The first set 120 is located at a distance above the second set 122.

The first set 120 of actuators 121A-121D may be hydraulic cylinders, for instance four hydraulic cylinders. Cylinders 121A, 121B form a pair on one side and cylinders 121C, 121D form a pair on the opposite side.

The second set 122 of actuators 123A-123D may (also) be hydraulic cylinders, for instance four hydraulic cylinders. Cylinders 123A, 123B form a pair on one side and cylinders 123C,123D form a pair on the opposite side.

Together, the first and second set 120,122 may provide six degrees of freedom. In some instances fewer than six degrees may suffice. For instance if the blade moving system The skilled person will understand that a combination of the blade moving system 40 and the nacelle moving system 119 allows the moving of either the blade 24 or the nacelle an hub, or both, to align the root end 22 with the root end connector 20.

It will be clear that the description above is intended to illustrate the operation of preferred embodiments of the invention, and not to reduce the scope of protection of the invention. Starting from the above description, many embodiments will be conceivable to the skilled person within the inventive concept and scope of protection of the present invention.

The present disclosure relates to the following clauses:
 1. Method for installing an offshore wind turbine (100) at a target location (11) at sea with an installation vessel (10), in particular a floating installation vessel, the installation vessel comprising:

a nacelle support structure (14) for temporarily supporting a nacelle (16) comprising a hub having a plurality of root end connectors (22) to which the root ends (20) of the blades (24) are to be connected, the nacelle support structure comprising:
a support tower (30) extending upwardly from a deck of the installation vessel
a support platform (32) connected to the support tower, the support platform being configured to temporarily support the nacelle during the connecting of one or more blades thereto,
one or more lifting devices (34,35) configured for:
lifting the nacelle (16) onto the support platform,
lifting a nacelle assembly (36) including the blades (24) onto a wind turbine mast (81) located adjacent the vessel,
wherein the method comprises:
a) lifting the nacelle onto the support platform, and securing the nacelle to the support platform,
b) orienting a root end connector (20) of the hub of the nacelle in a direction facing a guide path of the blade moving system,
c) connecting the root end (22) of the first blade to the corresponding first root end connector of the hub,
d) repeating steps b) and c) for subsequent blades and root end connectors until all blades are connected to the hub of the nacelle, thereby providing a RNA (36),
e) lifting the RNA from the nacelle support structure and positioning the RNA onto a wind turbine mast (81) located adjacent the vessel.

2. Method according to clause 1, wherein during the installation of the blades onto the hub the one or more lifting devices simultaneously installs the foundation (80) onto the seabed and lifts the wind turbine mast (81) or parts thereof onto the foundation.

3. Method according to clause 1 or 2, wherein the installation vessel comprises a blade moving system (40) configured for moving a blade from a pickup location to an installation position in which the root end is positioned at the root end connector, the blade moving system comprising at least one movable blade support (44) configured for supporting the blade and a drive system (45) for moving the movable blade support, the method comprising between steps b) and c):
supporting the root end of a blade with the movable blade support,
moving the root end of the first blade (24A) along the guide path to the root end connector (20) on the hub by moving the movable blade support with the drive system, aligning the root end with the root end connector, and engaging the root end of the blade with the root end connector on the hub.

4. Method according to clause 3, wherein the blade moving system comprises:
a loading rail (46) which is connected, in particular fixed, to the nacelle support structure, the loading rail having a first end located at the support platform and a opposite second end located further away from the support platform than the first end, the loading rail defining the loading path, and
a trolley (60) which rolls or slides along the loading rail between an installation position at the support platform and a remote position which is further away from the support platform than the installation position, wherein at least one blade support (44) is directly or indirectly connected to the trolley and is moved by the trolley,
wherein the method comprises:
engaging at least a part of the blade, in particular the root end, with the blade support (44) when the trolley is in the remote position and supporting said part of the blade with the blade support,
moving the trolley from the remote position toward the installation position at the support platform along the loading rail, thereby moving the root end of the blade toward the root end connector of the hub.

5. Method according to clause 4, wherein the loading rail (46) extends over a vertical distance along the support tower, and wherein the remote position is a lower position and the installation position is an upper position of the trolley, wherein the trolley moves the root end upward along the support tower toward the nacelle.

6. Method according to clause 5, wherein during the upward movement the blade is pivoted between a pickup orientation in which the blade extends at a pickup angle to the vertical and an installation orientation in which the blade extends at an installation angle to the vertical, wherein the installation angle is smaller than the pickup angle.

7. Method according to any of the preceding clauses 3-6, wherein the blade moving system comprises a loader arm (70) to which a plurality of blade supports (44A, 44B, 44C) are connected for holding the blade at multiple positions spaced along a length of the blade, the loader arm having a length which is at least half the length of the blade, wherein the loader arm is:
a) pivotably connected to the trolley (60) via a trolley hinge (71), or
b) pivotably connected to the deck or to the support tower via at least one hinge (77), wherein the hinge is located at a base of the tower or located at a distance from the tower,
wherein the loader arm is pivotable about the hinge and movable between the pickup orientation in which the loader arm extends at a pickup angle to the vertical for picking up the blade and an installation orientation in which the loader arm extends at an installation angle to the vertical, wherein the installation angle is smaller than the pickup angle,
the method comprising:
connecting the blade to the loader arm via the blade supports when the blade is in the pickup orientation, and
pivoting the blade to the installation orientation with the loader arm.

8. Method according to clause 7, wherein the loader arm is pivotably connected to the trolley (60) via the trolley hinge (71), the method comprising:
holding the blade with the loader arm via the blade supports, wherein the root end of the blade is directed toward the trolley and the free end is directed away from the trolley,
moving the trolley upward along the support tower, thereby moving the root end of the blade upward along the support tower toward the nacelle and pivoting the blade to the installation orientation.

9. Method according to clause 7, wherein the loader arm is pivotably connected to the deck or to the support tower via at least one hinge (77), wherein:
a) the hinge (77) is located at a base of the tower wherein the opposite end (79) of the loader arm follows the path of a part of a circle, wherein the blade is held by the loader arm with the root end (22)

of the blade directed away from the hinge and the free end of the blade directed toward the hinge, wherein the blade remains substantially aligned with the support tower during the upward movement,
b) wherein the hinge (77) is located at a base of the tower wherein the opposite end (79) of the loader arm follows the path of a part of a circle, wherein a blade support (44) is pivotably connected to the opposite end (79), wherein the blade is pivoted relative to the loader arm during the upward movement toward the hub on the support platform, or
c) wherein the hinge (77) is located at a distance (103) from the base of the tower, wherein the blade is held by the loader arm with the free end (25) of the blade directed toward the hinge, wherein the blade remains substantially aligned with the support tower during the upward movement,
the method comprising:
pivoting the loader arm upward, thereby moving the root end of the blade toward the nacelle.
10. Method according to any of the preceding clauses 3-9, wherein the blade moving system (40) is configured to lift the root end of each blade to the level of the support platform while a free end (25) of the blade remains at the deck level or at least is not raised to the same level before connecting the root end to the hub, wherein during the lifting of the root end (22) the blade is pivoted and the free end is moved toward the support tower.
11. Method according to any of the preceding clauses 3-10, wherein the blade is picked up with the at least one blade support while the blade is substantially horizontal.
12. Method according to any of the preceding clauses, wherein the blade is pivoted to an installation orientation, in particular a vertical orientation, which is substantially aligned with the support tower.
13. Method according to any of the preceding clauses 3-12, wherein the blade moving system comprises actuators (68,69) for aligning of the root end (22) relative to the root end connector (20) in a Y and Z direction which are orthogonal to a longitudinal direction of the blade, the longitudinal direction being the X-direction, wherein the actuators (68,69) move at least one blade support (44) in the Y and Z direction relative to the trolley (60) or loader arm (70) to which the blade support (44) is connected, wherein the actuators in particular align the multiple threaded ends of the root end with associated multiple holes in the root end connector.
14. Method according to any of clauses 1-13 except clause 12, wherein the blade is pivoted to an installation orientation which is at an angle of 0-70 degrees, preferably 40-80 degrees, more preferably 50-70 degrees to the vertical.
15. Method according to any of the preceding clauses, wherein the main rotation axis (19) of the hub is oriented parallel or orthogonal to a longitudinal direction of the vessel.
16. Method according to any of the preceding clauses, wherein the support tower and the pickup location of the blades are positioned at a side of the installation vessel, and wherein the pickup location (41) extends parallel to a longitudinal direction of the installation vessel.
17. Method according to any of the preceding clauses, wherein the support tower has a height to the water surface which is at least 50 percent, in particular at least 75 percent, more in particular at least 100 percent of a length of the blade.
18. Method according to any of clauses 3, and 16-17, wherein the loading rail (46) extends over a horizontal distance away from the support platform and the trolley rolls or slides along the loading rail toward said support platform over said horizontal distance from the remote position to the installation position, wherein a blade support (44) is provided on the trolley.
19. Method according to the preceding clause, wherein the one or more lifting devices comprises a crane, wherein the blade is lifted from the deck with the crane and wherein the root end of the blade is positioned on the blade support on the trolley, and wherein the blade is supported by both the trolley and the crane during the movement of the trolley toward the nacelle.
20. Method according to any of the two preceding clauses, wherein the loading rail (46) extends horizontally.
21. Method according to any of clauses 18-19, wherein the loading rail extends at an angle of 0-70 degrees, preferably 40-80 degrees, more preferably 50-70 degrees to the vertical and wherein the blade is connected to the root end connector at an angle of 0-70 degrees, preferably 40-80 degrees, more preferably 50-70 degrees to the vertical.
22. Method according to any of the preceding clauses, comprising at least a first lifting device (34) and a second lifting device (35), wherein the first lifting device is a first crane having an associated first deck area on the deck of the vessel, in particular on the starboard side and the second lifting device is a second crane having an associated second deck area on the deck of the vessel, in particular on the port side, wherein the first and second deck areas are different, dedicated deck areas, wherein the first crane is used to install the foundation onto the seabed while the second crane simultaneously performs lifting operations for the assembly of the nacelle, each crane using its associated dedicated deck area.
23. Method according to any of the preceding clauses, wherein the foundation and the wind turbine mast or mast segments are installed from a first side of the installation vessel by the first crane, and the nacelle is assembled on a second, different side of the vessel, and wherein during the installation of the foundation and the connecting of the blades to the hub the installation vessel is positioned with the first side at the target location, and wherein after the installation of the foundation and the wind turbine mast, the vessel is repositioned with the second side at the target location in order to transfer the RNA (36) from the vessel onto the wind turbine mast.
24. Method according to the preceding clause, wherein the installation vessel is repositioned during the installation of the blades on the hub.
25. Method according to any of the preceding clauses, wherein the RNA (36) is installed on the foundation (80) and mast (81) which were installed simultaneously with the assembly of said the RNA (36), or wherein the RNA (36) is installed onto a different foundation and mast than the foundation (80) and mast (81) which were installed simultaneously with the assembly of the RNA (36).
26. Method according to any of clauses 1-25, wherein the individual blades are installed on the hub in an inclined orientation, the root end of the blade being located higher than the free end of the blade.

27. Installation vessel (10; 10') configured for offshore installation of wind turbines (100) at a target location, the vessel comprising:
    a nacelle support structure (14) for temporarily supporting a nacelle comprising a hub having a plurality of root end connectors (20) to which the root ends (22) of the blades (24) are to be connected, the nacelle support structure comprising:
        a support tower (30) extending upwardly from a deck of the installation vessel
        a support platform (32) connected to the support tower, the support platform being configured to temporarily support the nacelle during the connecting of one or more blades thereto,
    one or more lifting devices (34,35) configured for:
        lifting the nacelle (16) onto the support platform,
        lifting a completed nacelle assembly (36) onto a wind turbine mast (81) located adjacent the vessel.
28. Installation vessel according to clause 27, comprising a blade moving system (40) configured for moving a blade from a pickup location to an installation position in which the root end (22) is positioned at the root end connector (22), the blade moving system comprising at least one movable blade support (44) configured for supporting the blade and a drive system (45) for moving the movable blade support.
29. Installation vessel according to clause 28, wherein the blade moving system comprises:
    a loading rail (46) which is connected, in particular fixed, to the nacelle support structure, the loading rail having a first end located at the support platform and a opposite second end located further away from the support platform than the first end, the loading rail defining a loading path, and
    a trolley (60) which rolls or slides along the loading rail between an installation position at the support platform and a remote position which is further away from the support platform than the installation position, wherein at least one blade support is directly or indirectly connected to the trolley and is moved by the trolley.
30. Installation vessel according to clause 29, wherein the loading rail extends over a vertical distance along the support tower, and wherein the remote position is a lower position and the installation position is an upper position of the trolley, wherein the trolley is configured to move the root end upward along the support tower toward the nacelle.
31. Installation vessel according to clause 29 or 30, wherein the blade moving system comprises a loader arm (70) to which a plurality of blade supports (44A, 44B,44C) are connected for holding the blade at multiple positions spaced along a length of the blade, wherein the loader arm is:
    a) pivotably connected to the trolley (60) via a trolley hinge (71), or
    b) pivotably connected to the deck or to the support tower via at least one hinge (77), wherein the hinge is located at a base of the tower or located at a distance from the base of the tower,
    wherein the loader arm is pivotable about the hinge and movable between the pickup orientation in which the loader arm extends at a pickup angle to the vertical for picking up the blade and an installation orientation in which the loader arm extends at an installation angle to the vertical, wherein the installation angle is smaller than the pickup angle.
32. Installation vessel according to the preceding clause, wherein one end of the loader arm is pivotably connected to the trolley via the trolley hinge, and wherein an opposite end (55) of the loader arm is supported by a deck trolley (48) which is movable over a deck rail (49) which extends between a first location on deck and a second location on deck, the second location being closer to a base of the support tower then the first location, wherein the blade moving system (40) is configured to lift the root end of each blade to the level of the support platform while a free end (25) of the blade is not raised to the same level before connecting the root end to the hub, wherein during the lifting of the root end the blade is pivoted over an angle and the free end is moved over a horizontal distance toward the support tower.
33. Installation vessel according to clause 31, wherein the loader arm is pivotably connected to the deck or to the support tower via at least one hinge (77), wherein:
    a) the hinge (77) is located at a base of the tower, wherein the opposite end (79) of the loader arm follows the path of a part of a circle, wherein loader arm is configured to hold the blade with the root end (22) of the blade directed away from the hinge and the free end of the blade directed toward the hinge, wherein the blade remains substantially aligned with the support tower during the upward movement,
    b) wherein the hinge (77) is located at a base of the tower wherein the opposite end (79) of the loader arm follows the path of a part of a circle, wherein a blade support (44) is pivotably connected to the opposite end (79), wherein the blade is pivoted relative to the loader arm during the upward movement toward the hub on the support platform, or
    c) wherein the hinge (77) is located at a distance (103) from the base of the tower, wherein the loader arm is configured to hold the blade with the free end (25) of the blade directed toward the hinge, wherein the blade remains substantially aligned with the support tower during the upward movement.
34. Installation vessel according to any of clauses 27-33, wherein the support tower is oriented substantially vertical, or at least at an angle greater than 85 degrees to the horizontal.
35. Installation vessel according to any of clauses 27-34, wherein the support platform (32) is configured to support the nacelle with the main rotation axis of the hub oriented parallel to a longitudinal direction of the vessel, or orthogonal to a longitudinal direction of the vessel.
36. Installation vessel according to any of clauses 27-35, wherein the support tower and the pickup location of the blades are positioned at a side of the installation vessel, and wherein the pickup location extends parallel to a longitudinal direction of the installation vessel.
37. Installation vessel according to any of clauses 27-36, wherein the support tower has a height to the water surface which is at least 50 percent, in particular at least 75 percent, more in particular at least 100 percent of a length of the blade.
38. Installation vessel according to any of clauses 27-37, wherein the blade moving system comprises a hoisting system comprising a traveling block, the blade support being mounted to the travelling block for hoisting the root end of the blade to the support platform while pivoting the blade upward, wherein in particular the traveling block and the trolley are integrated. 39. Installation vessel according to any of clauses 29 and 34-38, wherein the loading rail (46) extends over a horizontal distance away from the support platform, and the trolley (60) is configured to roll or slide along the loading rail toward said support platform over said horizontal distance from the remote position to the installation position, wherein the trolley supports at least one blade support (44).
40. Installation vessel according to the preceding clause, wherein the one or more lifting devices comprises a crane configured to lift the blade from the deck and to position the root end of the blade on the blade support (44) on the trolley while continuing to support the blade during the movement of the trolley toward the nacelle.
41. Installation vessel according to any of the two preceding clauses, wherein the loading rail extends horizontally.
42. Installation vessel according to any of clauses 39-40, wherein the loading rail extends at an angle of 0-70 degrees, preferably 50-70 degrees, to the vertical and wherein the blade is connected to the root end connecter at an angle of 0-70 degrees, preferably 50-70 degrees to the vertical.
43. Installation vessel according to any of clauses 27-42, comprising at least a first lifting device (34) and a second lifting device (35), wherein the first lifting device is a first crane and the second lifting device is a second crane, wherein the first and second crane extend to above the height of the support platform, wherein the first crane is configured to install the foundation onto the seabed, wherein the second crane is configured to simultaneously perform lifting operations for the assembly of the RNA.
44. Installation vessel according to clause 43, wherein the first crane is positioned on a first side of the installation vessel, and wherein the second crane is positioned on the a different, second side of the installation vessel.
45. Installation vessel according to clause 43 or 44, wherein the first crane has an associated first deck area on the deck of the vessel, in particular on the starboard side and the second lifting device is a second crane having an associated second deck area on the deck of the vessel, in particular on the port side, wherein the first and second deck areas are different, dedicated deck areas, wherein the first deck area is dedicated for the installation of the foundation and the mast and the second deck area is dedicated for the installation of the blades onto the nacelle.
46. Installation vessel according to any of clauses 27-45, wherein the blade moving system comprises actuators (68,69) for precise positioning of the root end, relative to the root end connector in a Y and Z direction which are orthogonal to a longitudinal direction of the blade, wherein the actuators are in particular configured for aligning multiple threaded ends of the root end with associated multiple holes in the root end connector.
47. Installation vessel according to the preceding clause, wherein the actuators (68,69) are constructed to move at least one blade support (44) in the Y and Z direction.
48. Installation vessel according to any of clauses 39-41, comprising a second support tower (100) positioned at a distance from the first support tower (30).
49. Installation vessel according to the preceding clause, comprising a blade lift (110) with which a blade can be raised in a horizontal orientation to the level of the support platform.
50. Installation vessel according to any of the preceding clauses 47-48, wherein the first and second support tower are interconnected via at least one support beam.
51. Installation vessel according to any of clauses 27-49 except clauses 42-44, comprising a single crane which extends to above the height of the support platform and a loader arm (70).
52. Installation vessel according to any of clauses 27-44, wherein the support platform (32) comprises a nacelle moving system (119) comprising actuators (121A-121D, 123A-123D) configured for moving the nacelle (16) including the hub (18) in at least a Y-direction and a Z-direction relative to a fixed part (124) of the platform and relative to the blade (24) which is held by the at least one blade support (44)
53. Installation vessel according to the preceding clause, wherein the actuators are configured for moving the nacelle and the hub in a X,Y and Z-direction and to pivot the nacelle and the hub about the X, Y and Z axis for aligning a root end connector (20) with a root end (22) of the blade.
54. Installation vessel according to any of the two preceding clauses, wherein the support platform comprises a mount (125) to which the nacelle can be connected, and wherein the actuators are hydraulic cylinders arranged in an first, upper set (120) of actuators (121A-121D) and a second, lower set (122) of actuators (123A-123D) provided at a distance below the first set wherein the actuators extend between the fixed portion (124) of the support platform and the mount.
55. Installation vessel according to any of clauses 27-54, wherein both cranes (34,35) are positioned at the bow or at the stern of the vessel or wherein both cranes are positioned at the starboard side or at the port side of the vessel or wherein the cranes are positioned on diagonally opposed corners of the vessel.
56. Installation vessel according to any of clauses 27-55, wherein the installation vessel is a floating vessel, in particular a semi-submersible (10).
57. Installation vessel according to any of clauses 27-56, wherein the installation vessel is a jack-up rig (10').
58. Method according to any of clauses 1-26, comprising moving the nacelle (16) and hub (18) relative to a fixed part (124) of the support platform (32) and relative to the blade (24) with a plurality of actuators, thereby aligning the root end connector (20) with the root end (22) of the blade.
59. Method according to the preceding clause, comprising moving both the blade with the blade moving system (40) and the nacelle and hub with the nacelle moving system (119) during the alignment of the root end with the root end connector.

The invention claimed is:

1. A method for installing an offshore wind turbine at a target location at sea with an installation vessel, wherein the installation vessel floats during the installation of the wind turbine, the installation vessel comprising:
   a nacelle support structure for temporarily supporting a nacelle comprising a hub having a plurality of root end connectors to which a root end of each blade is to be connected, the nacelle support structure comprising:
   a support tower extending upwardly from a deck of the installation vessel, wherein a base of the support tower remains at a fixed position relative to the deck during the installation of the wind turbine, and
a support platform connected to the support tower, the support platform being configured to temporarily support the nacelle during the connecting of one or more blades thereto,
one or more lifting devices configured for:
lifting the nacelle onto the support platform,
lifting a Rotor Nacelle Assembly (RNA) including the blades onto a wind turbine mast located adjacent the vessel,
wherein the lifting device for lifting the RNA is a crane which is separate from the support tower,
a blade moving system configured for moving a blade from a pickup location to an installation position in which the root end is positioned at the root end connector, the blade moving system comprising:
at least one movable blade support configured for supporting the blade,
a drive system for moving the movable blade support,
a loading rail which is connected to the nacelle support structure, the loading rail having a first end located at the support platform and an opposite second end located further away from the support platform than the first end, the loading rail defining the loading path, and
a trolley which rolls or slides along the loading rail between the installation position at the support platform and a remote position which is further away from the support platform than the installation position, wherein at least one blade support is directly or indirectly connected to the trolley and is moved by the trolley,
wherein the method comprises:
a) lifting the nacelle onto the support platform, and securing the nacelle to the support platform,
b) orienting a root end connector of the hub of the nacelle in a direction facing a guide path of the blade moving system,
c) engaging at least a part of the blade with the blade support when the trolley is in the remote position and supporting said part of the blade with the blade support,
d) supporting the root end of the blade with the movable blade support,
e) moving the trolley from the remote position toward the installation position at the support platform along the loading rail, thereby moving the root end of a first blade along the guide path to the root end connector on the hub by moving the movable blade support with the drive system, aligning the root end with the root end connector, and engaging the root end of the first blade with the root end connector on the hub,
f) connecting the root end of the first blade to the corresponding first root end connector of the hub,
g) repeating steps b, c), and d) for subsequent blades and root end connectors until the blades are connected to the hub of the nacelle, thereby providing the RNA,
h) suspending the RNA from the crane, lifting the RNA from the support platform of the nacelle support structure with the crane, subsequently moving the RNA with the crane away from the support platform and positioning the RNA onto a wind turbine mast located adjacent the vessel.

2. The method according to claim 1, wherein during the installation of the blades onto the hub the one or more lifting devices simultaneously installs a foundation onto a seabed and lifts the wind turbine mast or parts thereof onto the foundation.

3. The method according to claim 1, wherein the loading rail extends over a vertical distance along the support tower, and wherein the remote position is a lower position and the installation position is an upper position of the trolley, wherein the trolley moves the root end upward along the support tower toward the nacelle, and
wherein during the upward movement the blade is pivoted between a pickup orientation in which the blade extends at a pickup angle to the vertical and an installation orientation in which the blade extends at an installation angle to the vertical, wherein the installation angle is smaller than the pickup angle.

4. The method according to claim 1, wherein the blade moving system comprises actuators for aligning of the root end relative to the root end connector in a Y and Z direction which are orthogonal to a longitudinal direction of the blade, the longitudinal direction being the X-direction, wherein the actuators move at least one blade support in the Y and Z direction relative to a trolley or loader arm to which the blade support is connected, wherein the actuators align the multiple threaded ends of the root end with associated multiple holes in the root end connector.

5. The method according to claim 1, comprising moving the nacelle and hub relative to a fixed part of the support platform and relative to the blade with a plurality of actuators, thereby aligning the root end connector with the root end of the blade, or comprising moving both the blade with the blade moving system and the nacelle and hub with the nacelle moving system during aligning of the root end with the root end connector.

6. An installation vessel configured for offshore installation of wind turbines at a target location while floating, the vessel comprising:
a nacelle support structure for temporarily supporting a nacelle comprising a hub having a plurality of root end connectors to which a root end of each blade is to be connected, the nacelle support structure comprising:
a support tower extending upwardly from a deck of the installation vessel,
a support platform connected to the support tower, the support platform being configured to temporarily support the nacelle during connecting of one or more blades thereto and to temporarily support the nacelle with one blade connected to each root end connector of the plurality of root end connectors, one or more lifting devices configured for:
lifting the nacelle onto the support platform,
lifting a Rotor Nacelle Assembly (RNA) onto a wind turbine mast located adjacent the vessel, wherein the lifting device for lifting the RNA is a second crane which is separate from the support tower,
a blade moving system configured for moving a blade from a pickup location to an installation position in which the root end is positioned at the root end connector, the blade moving system comprising:
at least one movable blade support configured for supporting the blade, a drive system for moving the movable blade support,
a loading rail which is connected to the nacelle support structure, the loading rail having a first end located at the support platform and a opposite second end located further away from the support platform than the first end, the loading rail defining a loading path, and a trolley which rolls or slides along the loading rail between an installation position at the support platform and a remote position which is further away from the support platform than the installation position, wherein at least one movable blade support is directly or indirectly connected to the trolley and is moved by the trolley, wherein the blade moving system is configured for:
supporting the root end of a first blade with the movable blade support,
moving the root end of the first blade along the guide path to the root end connector on the hub by moving the movable blade support with the drive system, aligning the root end with the root end connector, and engaging the root end of the first blade with the root end connector on the hub.

7. The installation vessel according to claim 6, wherein the blade moving system comprises a loader arm to which a plurality of movable blade supports are connected for holding the blade at multiple positions spaced along a length of the blade, wherein the loader arm is:

pivotably connected to a trolley via a trolley hinge, or
pivotably connected to the deck or to the support tower via at least one lower hinge, wherein the lower hinge is located at a base of the support tower or located at a distance from the base of the support tower,
wherein the loader arm is pivotable about the lower hinge and movable between the pickup orientation in which the loader arm extends at a pickup angle to the vertical for picking up the blade and an installation orientation in which the loader arm extends at an installation angle to the vertical, wherein the installation angle is smaller than the pickup angle.

8. The installation vessel according to claim 7, wherein one end of the loader arm is pivotably connected to the trolley via the trolley hinge, and wherein an opposite end of the loader arm is supported by a deck trolley which is movable over a deck rail which extends between a first location on deck and a second location on deck, the second location being closer to a base of the support tower then the first location, wherein the blade moving system is configured to lift the root end of each blade to the level of the support platform while a free end of the blade is not raised to the same level before connecting the root end to the hub, wherein during the lifting of the root end the blade is pivoted over an angle and the free end is moved over a horizontal distance toward the support tower.

9. The installation vessel according to claim 8, wherein the loader arm is pivotably connected to the deck or to the support tower via at least one lower hinge, wherein:

the lower hinge is located at a base of the tower, wherein the opposite end of the loader arm follows a path of a part of a circle, wherein the loader arm is configured to hold the blade with the root end of the blade directed away from the hinge and the free end of the blade directed toward the hinge, wherein the blade remains substantially aligned with the loader arm during an upward movement, or
wherein the lower hinge is located at a base of the tower wherein the opposite end of the loader arm follows the path of a part of a circle, wherein the movable blade support is pivotably connected to the opposite end, wherein the blade is pivoted relative to the loader arm during the upward movement toward the hub on the support platform, or
wherein the lower hinge is located at a distance from the base of the tower, wherein the loader arm is configured to hold the blade with the free end of the blade directed toward the hinge, wherein the blade remains substantially aligned with the loader arm during the upward movement.

10. The installation vessel according to claim 6, wherein the loading rail extends over a horizontal distance away from the support platform, one end of the rail being located at the support platform and the opposite end being located remote from the support platform, and wherein the trolley is configured to roll or slide along the loading rail toward said support platform over said horizontal distance from the remote position to the installation position, wherein the trolley supports at least one movable blade support.

11. The installation vessel according to claim 10, wherein the one or more lifting devices comprises a crane configured to lift the blade from the deck and to position the root end of the blade on the movable blade support on the trolley while continuing to support the blade during the movement of the trolley toward the nacelle.

12. The installation vessel according to claim 6, wherein the one or more lifting devices comprises at least a first lifting device and a second lifting device, wherein the first lifting device is a first crane and the second lifting device is the second crane, wherein the first and second crane extend to above a height of the support platform, wherein the first crane is configured to install a foundation onto a seabed, wherein the second crane is configured to simultaneously perform lifting operations for assembly of the RNA.

13. The installation vessel according to claim 6, wherein the at least one movable blade support comprises a root end supporting member configured to engage the root end of the blade.

14. The installation vessel according to claim 6, wherein the blade moving system comprises actuators for precise positioning of the root end, relative to the root end connector in a Y and Z direction which are orthogonal to a longitudinal direction of the blade.

15. The installation device according to claim 14, wherein the actuators are configured for aligning multiple threaded ends of the root end with associated multiple holes in the root end connector.

16. The installation vessel according to claim 6, wherein the support platform comprises a nacelle moving system comprising actuators configured for moving the nacelle including the hub in at least a Y-direction and a Z-direction relative to a fixed part of the support platform and relative to the blade which is held by the at least one movable blade support.

17. The installation vessel according to claim 16, wherein the actuators are configured for moving the nacelle and the hub in a X,Y and Z-direction and to pivot the nacelle and the hub about the X, Y and Z axis for aligning a root end connector with a root end of the blade.

18. The installation vessel according to claim 16, wherein the support platform comprises a mount to which the nacelle can be connected, and wherein the actuators are hydraulic cylinders arranged in an first, upper set of actuators and a second, lower set of actuators provided at a distance below the first set, wherein the actuators extend between the fixed part of the support platform and the mount.

* * * * *